Oct. 15, 1940.   A. F. PYM   2,217,771
MACHINE FOR SHAPING UPPERS OVER LASTS
Filed April 1, 1939   26 Sheets-Sheet 5

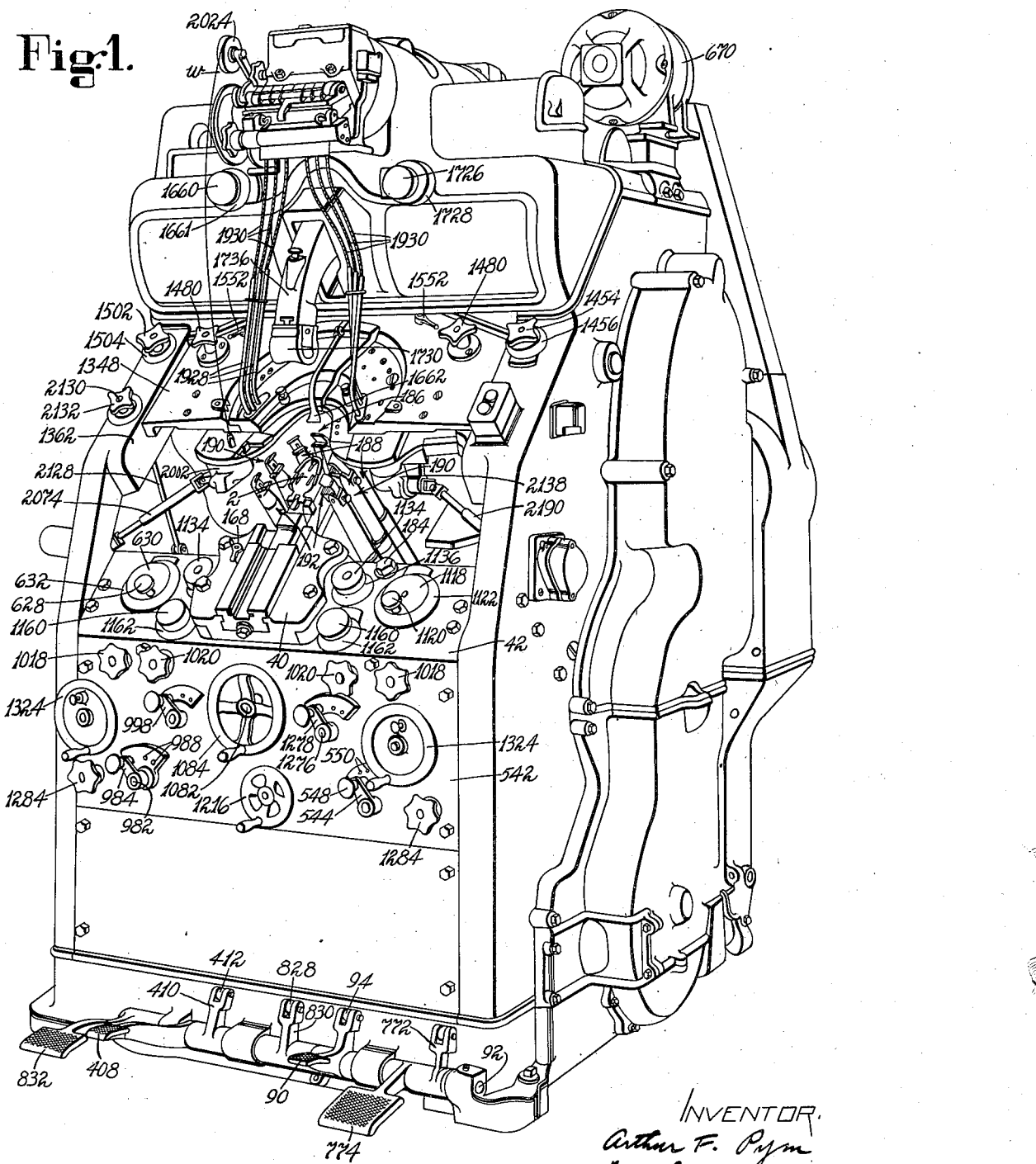

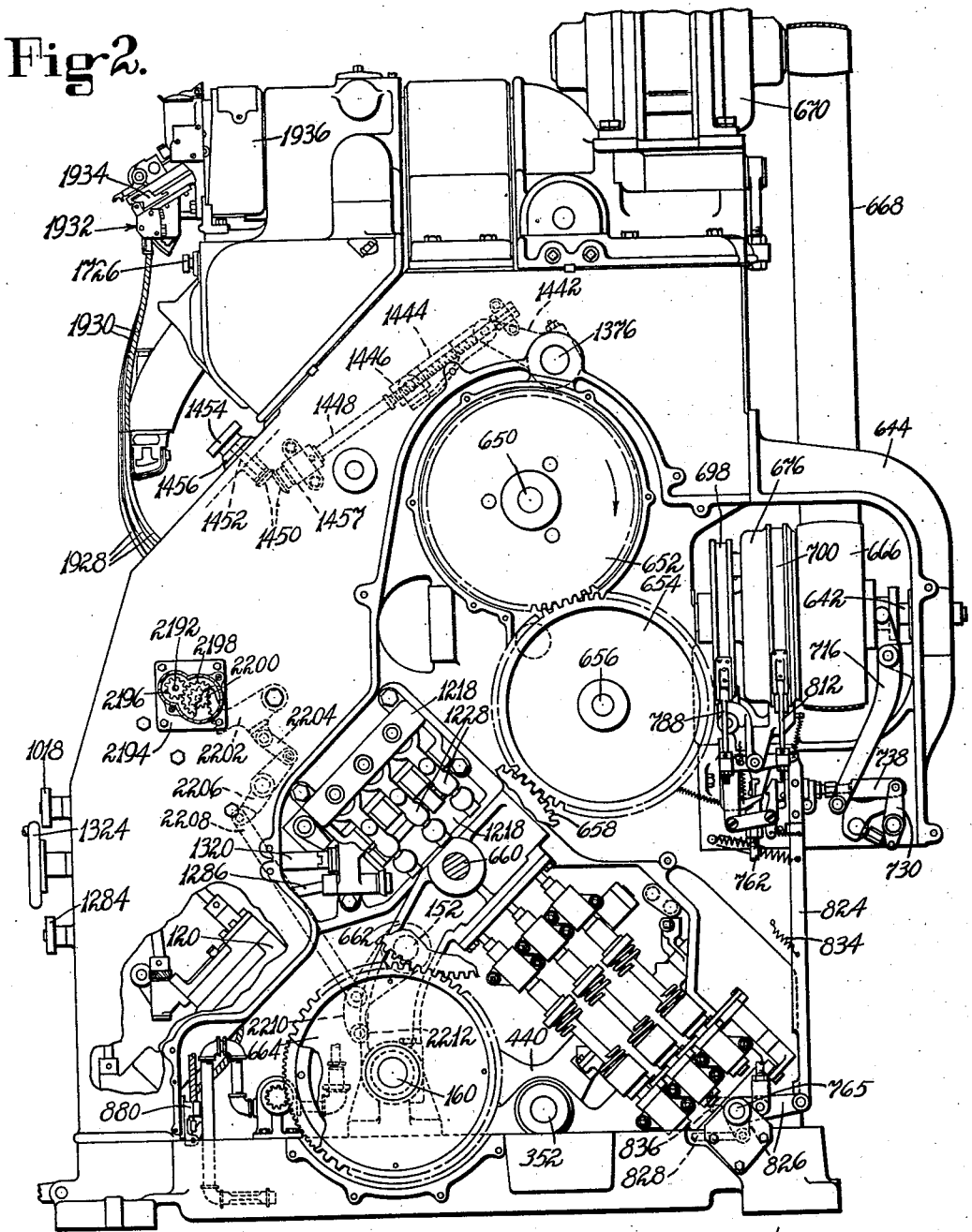

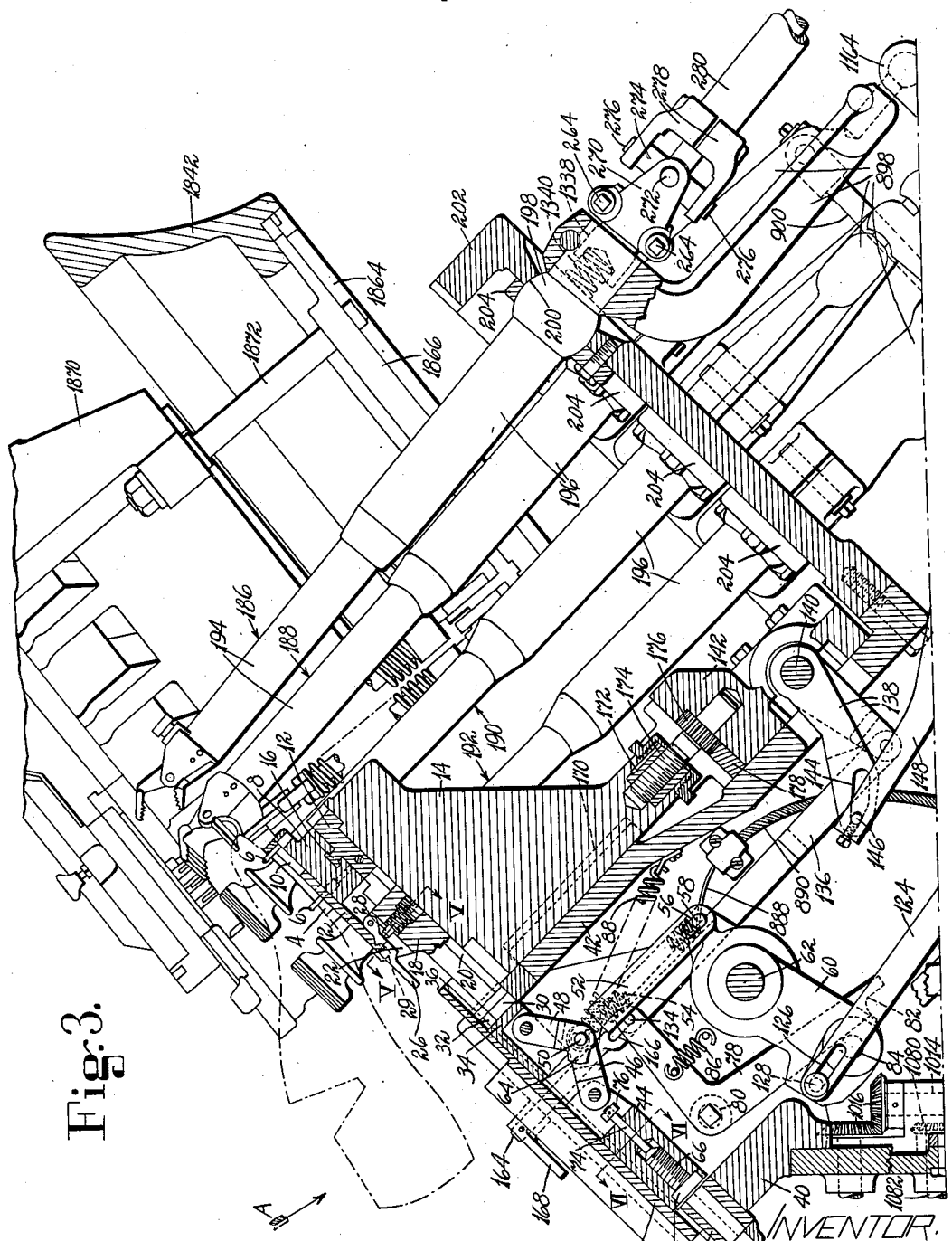

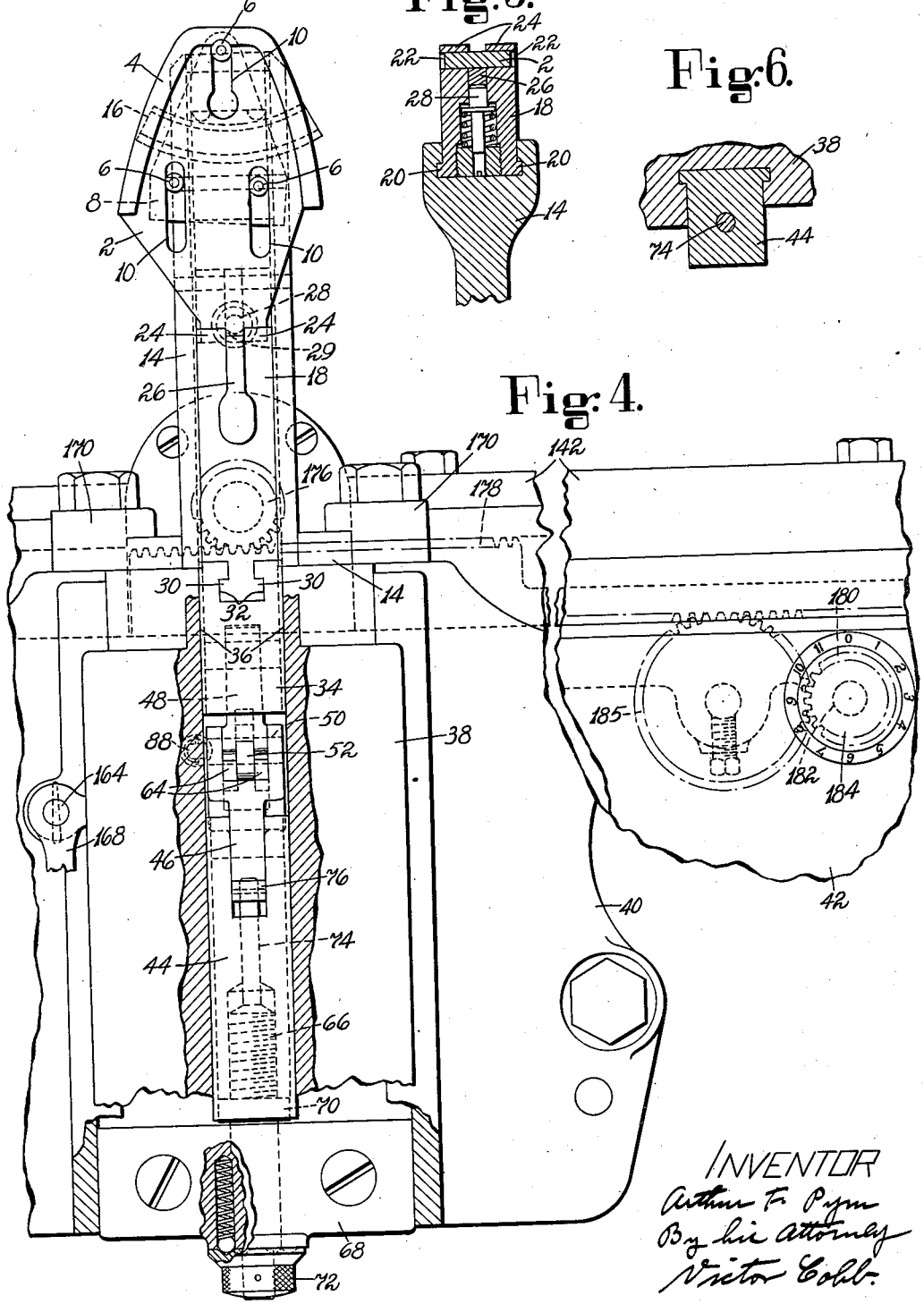

INVENTOR:
Arthur F. Pym
By his attorney
Victor Cobb

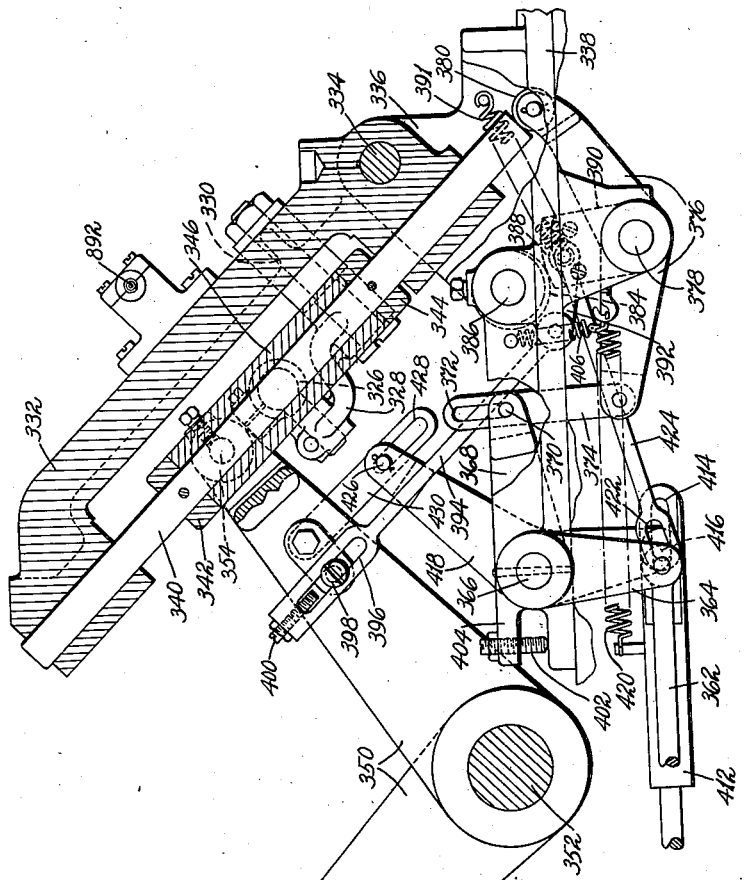
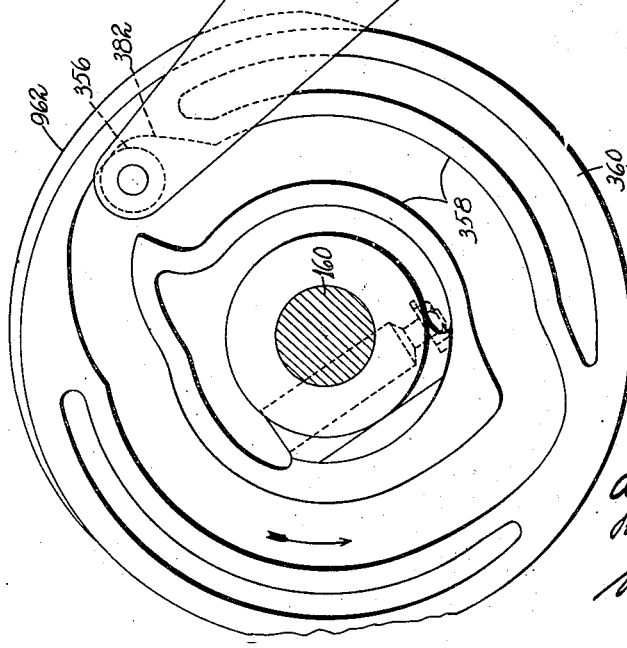
Fig. 11.

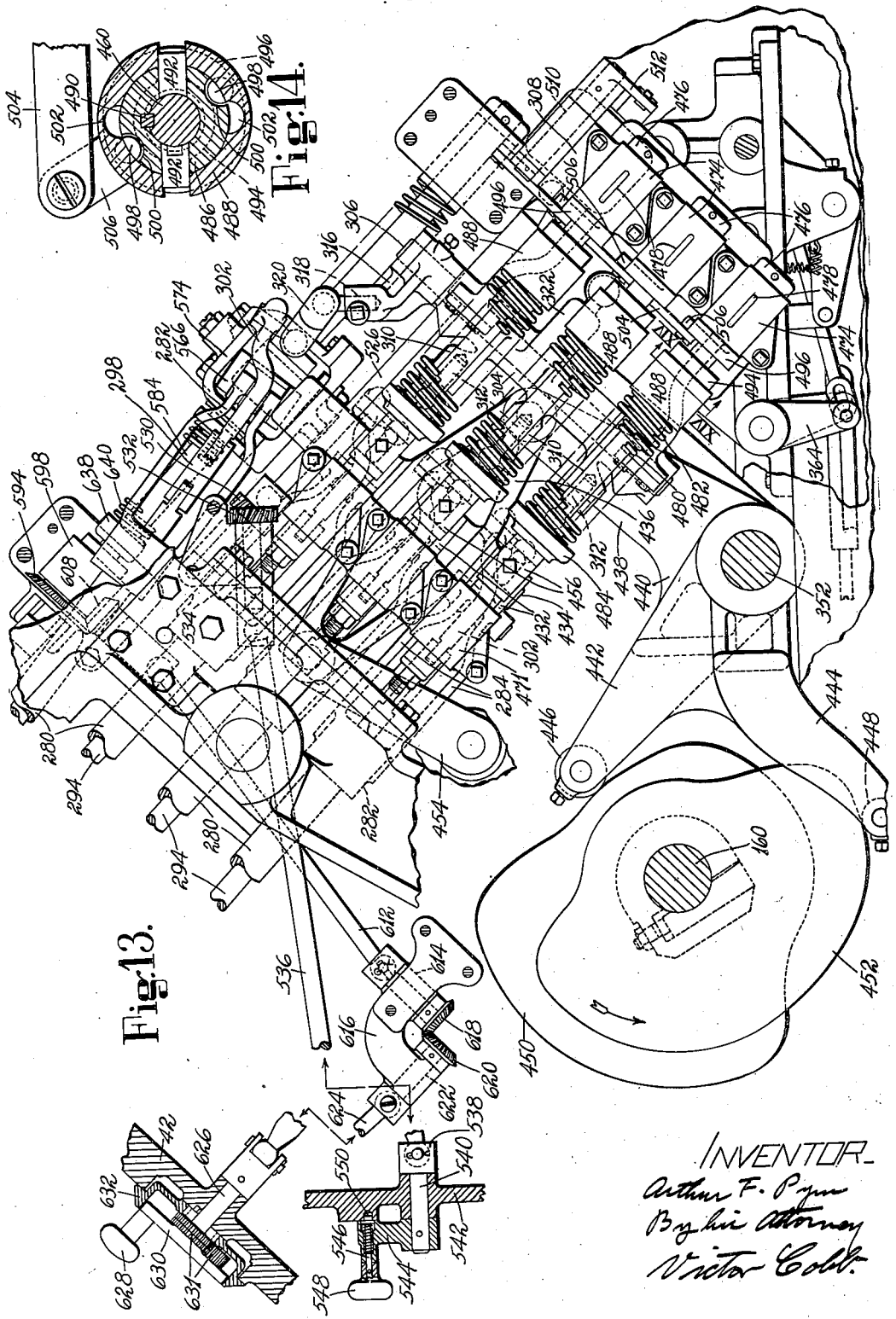

Oct. 15, 1940.   A. F. PYM   2,217,771
MACHINE FOR SHAPING UPPERS OVER LASTS
Filed April 1, 1939   26 Sheets-Sheet 9

INVENTOR
Arthur F. Pym
By his Attorney
Victor Cobb

Oct. 15, 1940. A. F. PYM 2,217,771
MACHINE FOR SHAPING UPPERS OVER LASTS
Filed April 1, 1939 26 Sheets-Sheet 12

INVENTOR
Arthur F. Pym
By his Attorney
Victor Cobb

Oct. 15, 1940.  A. F. PYM  2,217,771
MACHINE FOR SHAPING UPPERS OVER LASTS
Filed April 1, 1939  26 Sheets-Sheet 14

INVENTOR.
Arthur F. Pym
By his Attorney
Victor Cobb

Oct. 15, 1940.  A. F. PYM  2,217,771
MACHINE FOR SHAPING UPPERS OVER LASTS
Filed April 1, 1939  26 Sheets-Sheet 15
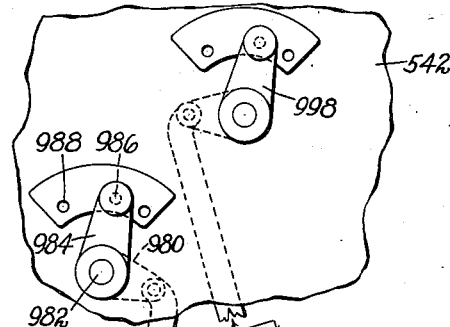
Fig. 24.
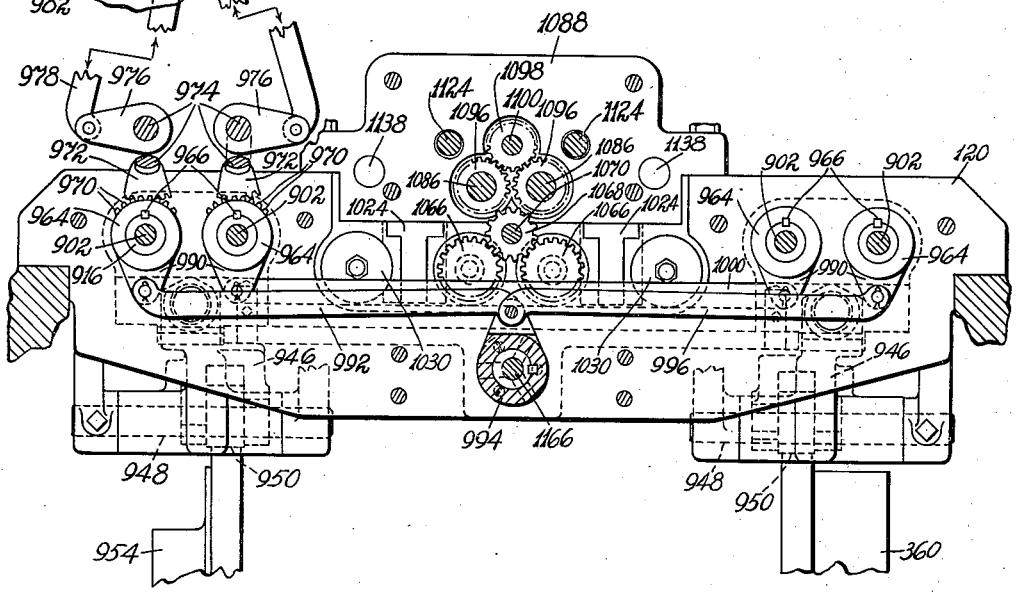
Fig. 25.
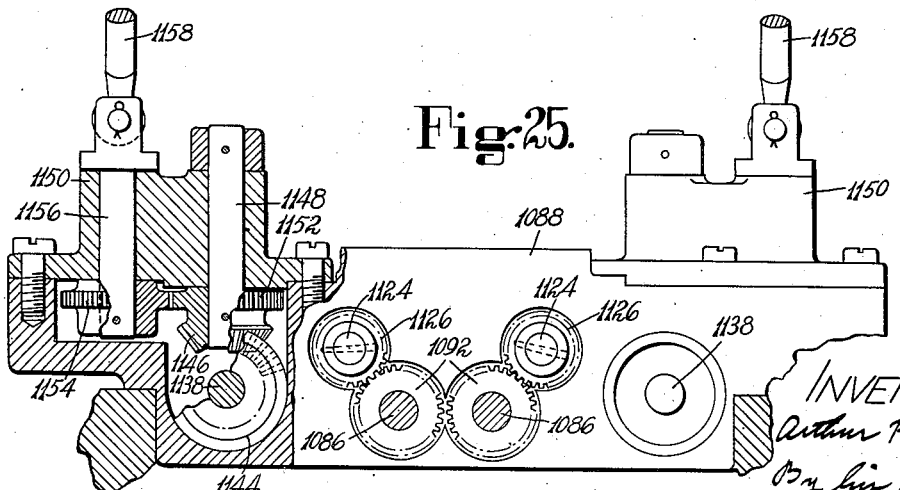
INVENTOR
Arthur F. Pym
By his Attorney
Victor Cobb Oct. 15, 1940.　　　　A. F. PYM　　　　2,217,771
MACHINE FOR SHAPING UPPERS OVER LASTS
Filed April 1, 1939　　　26 Sheets-Sheet 18

INVENTOR
Arthur F. Pym
By his attorney
Victor Coll

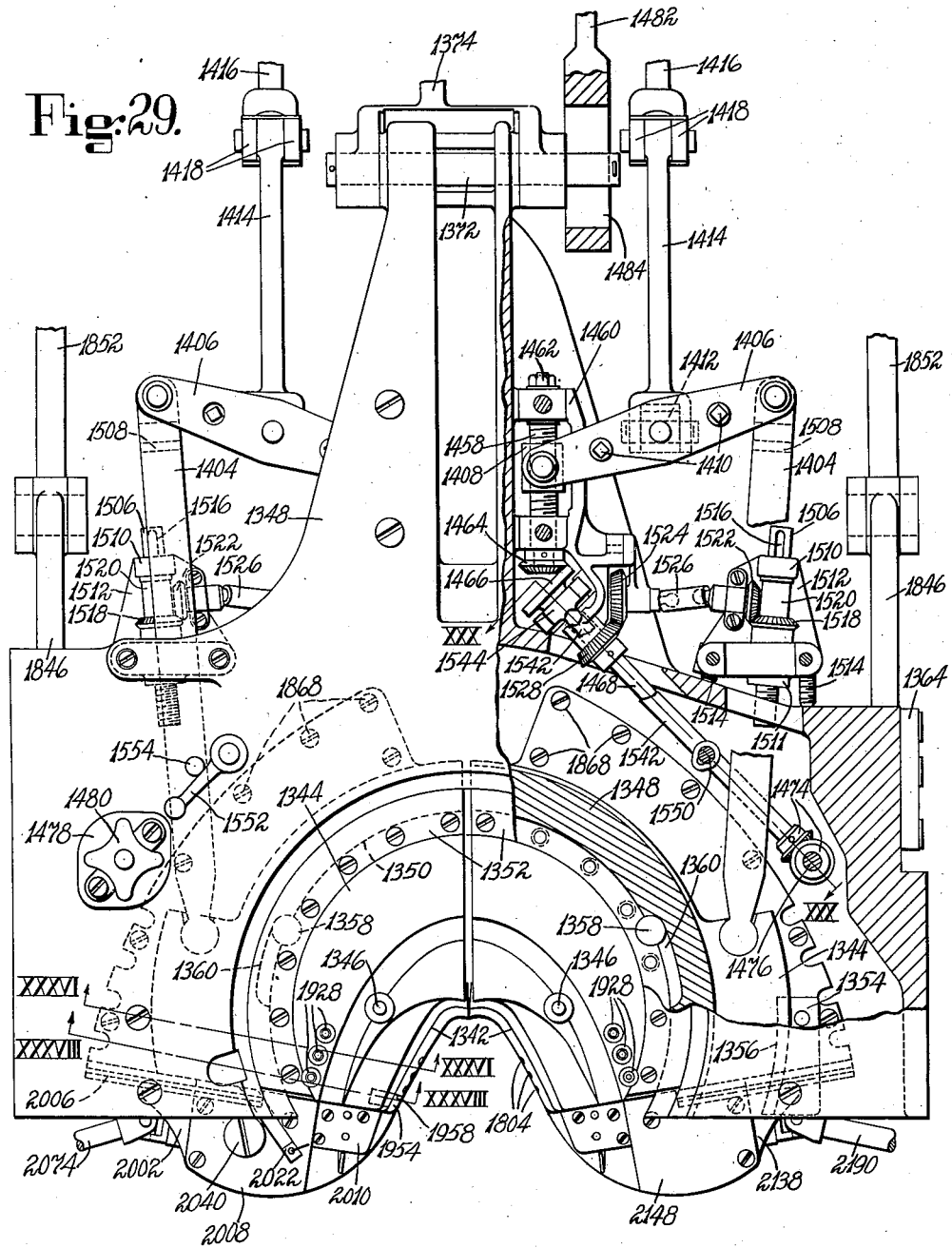

Oct. 15, 1940.   A. F. PYM   2,217,771
MACHINE FOR SHAPING UPPERS OVER LASTS
Filed April 1, 1939   26 Sheets-Sheet 20
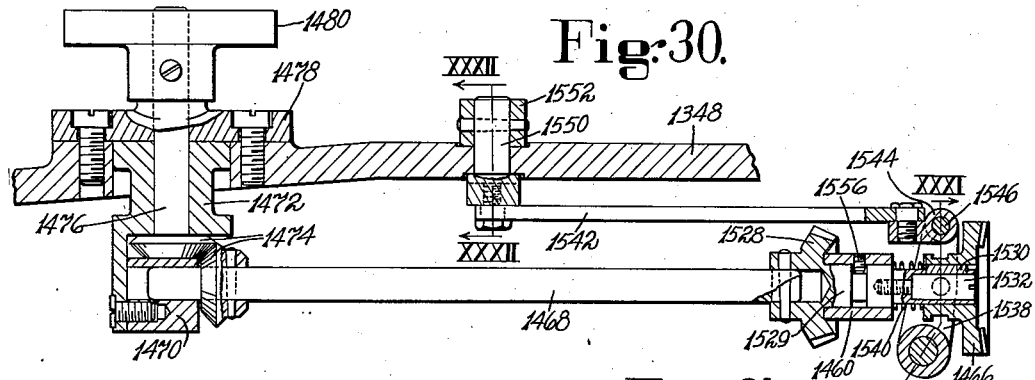
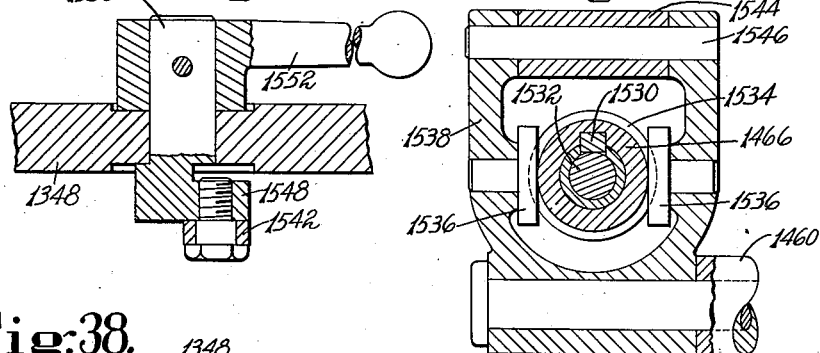
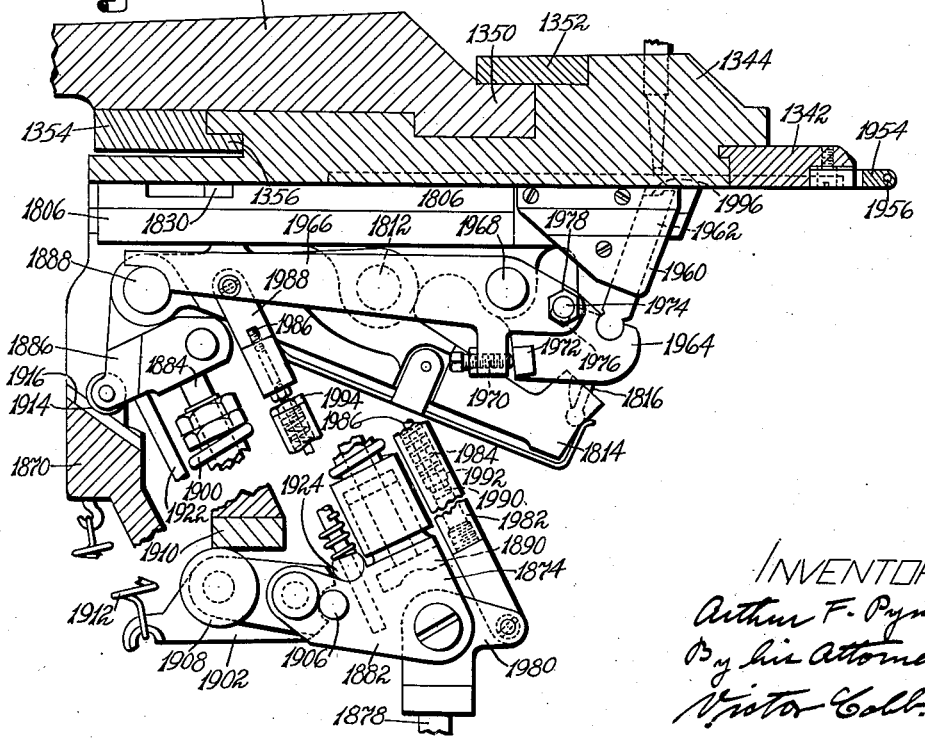
INVENTOR.
Arthur F. Pym
By his Attorney
Victor Coll

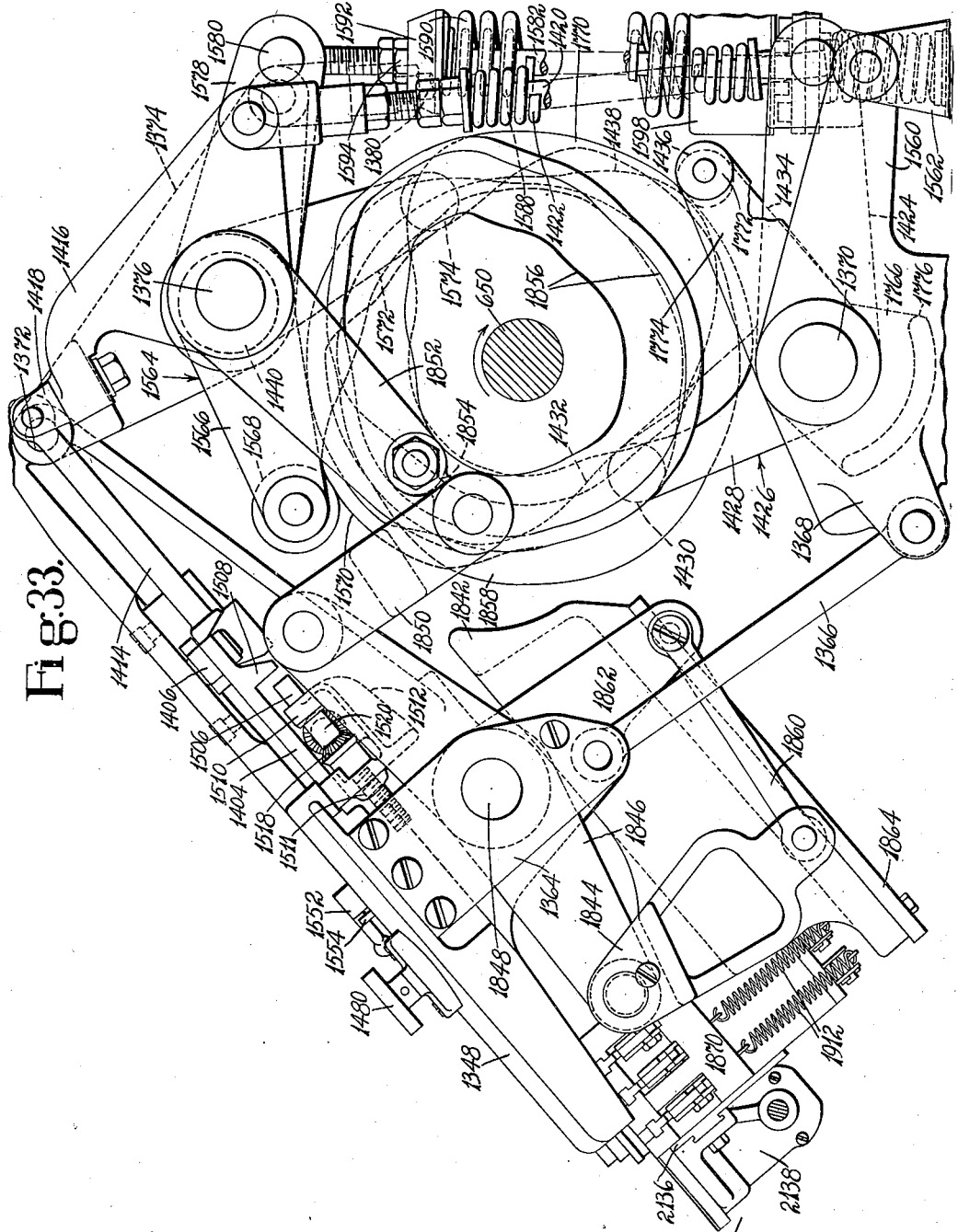

Oct. 15, 1940.   A. F. PYM   2,217,771
MACHINE FOR SHAPING UPPERS OVER LASTS
Filed April 1, 1939   26 Sheets-Sheet 22

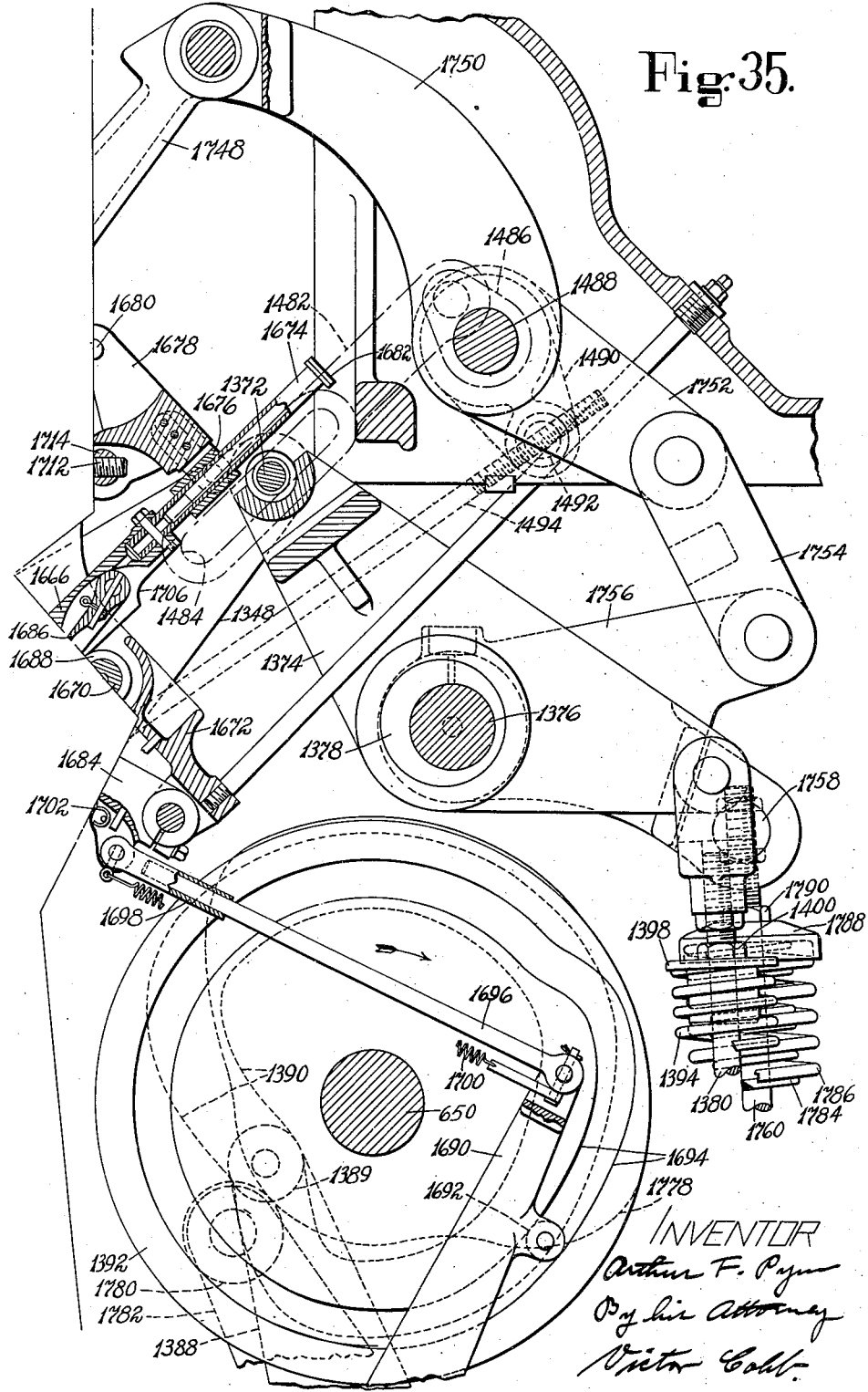

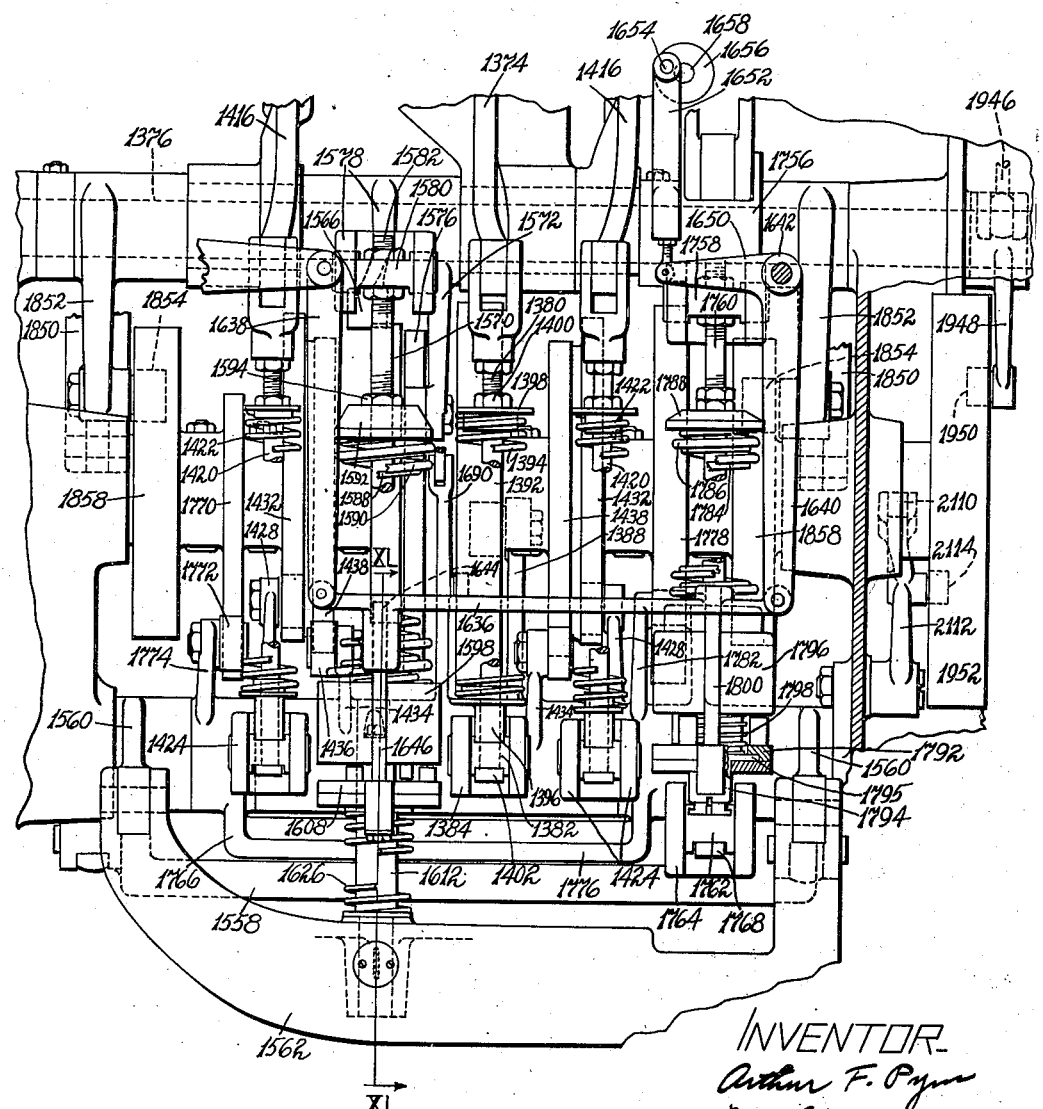

Oct. 15, 1940.  A. F. PYM  2,217,771
MACHINE FOR SHAPING UPPERS OVER LASTS
Filed April 1, 1939  26 Sheets-Sheet 25
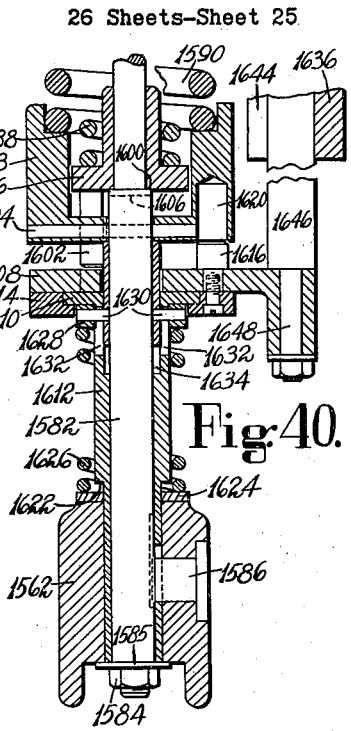
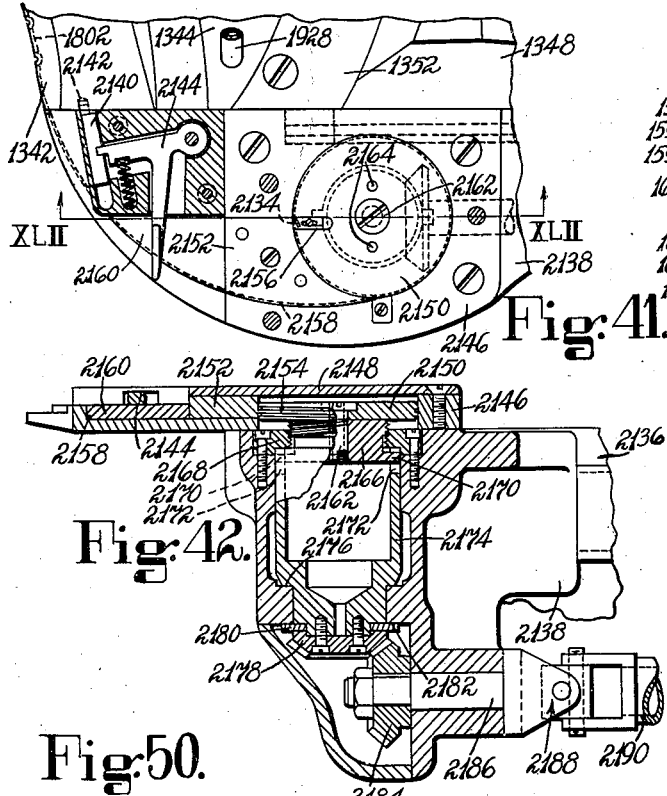
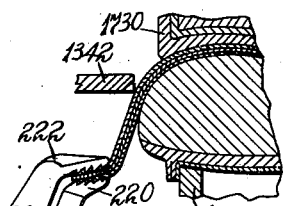
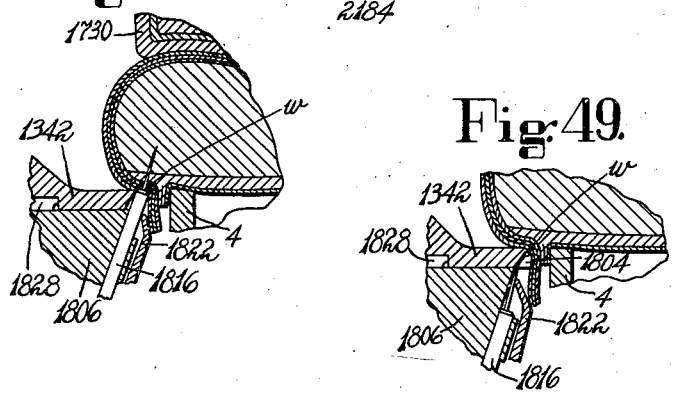
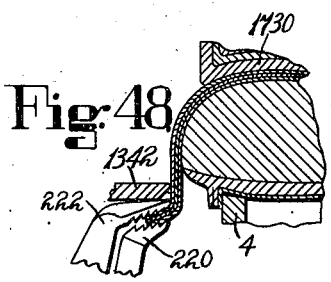
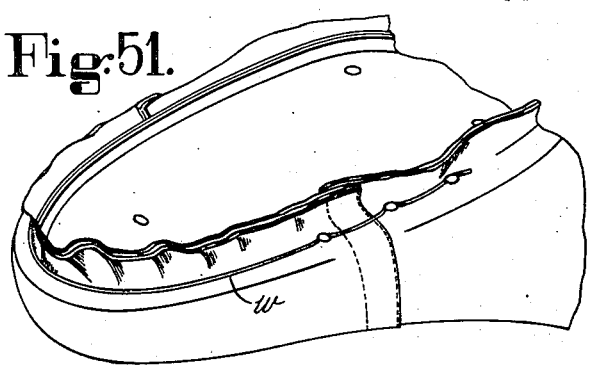
INVENTOR
Arthur F. Pym
By his attorney
Victor Cobb

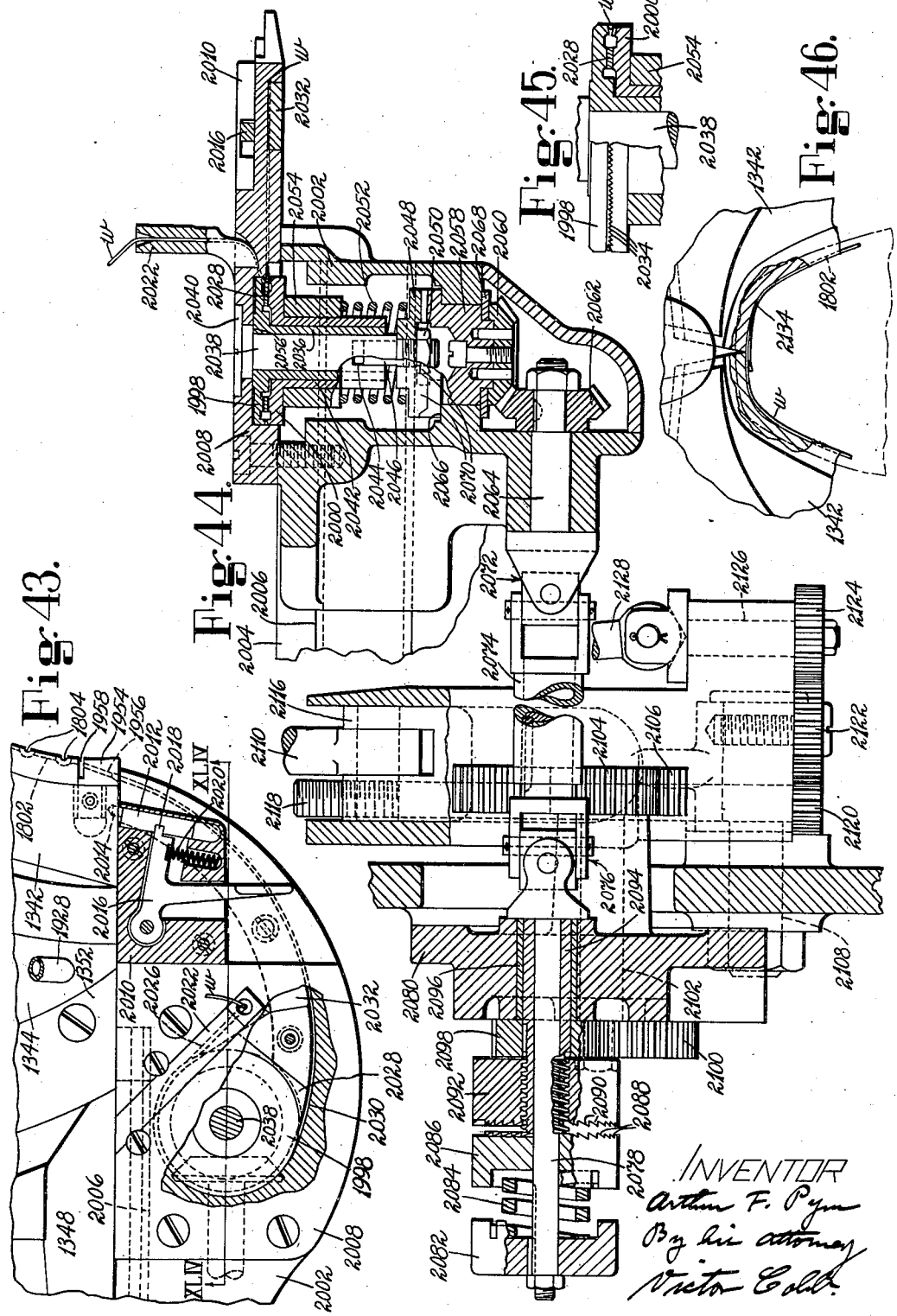

Patented Oct. 15, 1940

2,217,771

UNITED STATES PATENT OFFICE 2,217,771

MACHINE FOR SHAPING UPPERS OVER LASTS

Arthur F. Pym, Swampscott, Mass., assignor to United Shoe Machinery Corporation, Borough of Flemington, N. J., a corporation of New Jersey Application April 1, 1939, Serial No. 265,419

176 Claims. (Cl. 12—4)

This invention relates to machines for use in the manufacture of shoes, and more particularly to machines for shaping uppers over lasts, the invention being herein illustrated as embodied in a power-operated machine having means for pulling an upper over a last and means for thereafter wiping the toe-end portion of the upper into lasted position and for fastening it in that position. It is to be understood, however, that in various novel aspects the invention is not limited to a machine which performs all those operations. The machine herein shown is constructed particularly for use on shoes of the welt type in the lasting of which the marginal portion of the toe end of the upper is wiped inwardly against a lip or rib on the insole (hereinafter referred to as the lip); but it will be recognized that various features of the invention are applicable as well to machines for operating on shoes of other types.

Machines for shaping uppers over the toe ends of lasts have been provided heretofore with means for positioning and holding the last and an insole thereon in accurately determined relation to the upper-shaping means by the use of a plurality of pins extending through holes in the insole into holes in the forepart of the last, as disclosed in United States Letters Patent No. 1,674,060, granted on June 19, 1928, upon an application of mine. For use on welt shoes, however, such machines have been provided instead with a plate which positions the work by engagement with the inner face of the lip of the insole at the end and sides of the toe and with portions of the insole adjacent to the lip, this plate having the further useful function of supporting the lip against inward pressure applied thereto in the upper-shaping operation. When the work is positioned in this manner, a heel rest is required to assist in holding the last against displacement in a heelward direction, and a toe-end abutment also may be needed to assist in holding the last against displacement in the opposite direction during a portion of the upper-shaping operation.

For purposes of the present invention the machine herein shown is provided with work-positioning means comprising a plate of the above-mentioned character, which determines the position of the last heightwise by engagement with the insole and supports the lip of the insole around the toe end against inward pressure, and also pins arranged to extend through the insole into the forepart of the last to determine positively the position of the last lengthwise and laterally and to hold it against displacement, thus eliminating the need for any heel rest or toe-end abutment. To facilitate presentation of the work by the operator and to insure that the plate will be positioned in proper relation to the lip of the insole, provision is afforded for moving the plate lengthwise of the shoe relatively to the pins from an initial retracted position into supporting relation to the lip at the end of the toe after the last has been mounted on the pins. In the construction shown such movement of the plate is effected by the operator through a treadle prior to the starting of the power operation of the machine, a device being provided for retaining the plate in operative position against the force of spring means which tends to return it. Provision is further afforded for release of the plate by the operator to permit it to be returned to its initial position, in case it should be desired to remove the work and present it again before starting the machine. To guard against power operation of the machine with the plate still in its initial position, mechanism is provided for preventing the starting of the machine unless the plate is in its operative position.

In order that it may be conveniently determined, while the upper of each shoe is held under tension by the upper-pulling means, whether the tip line is in proper relation to the last, it is desirable that all shoes, whether rights or lefts, be so mounted that their heel ends occupy the same position laterally of the machine. Preferably, however, the holes provided in the forepart of each last to receive the work-positioning pins are arranged in substantially symmetrical relation to the longitudinal median line of the forepart of the last. Accordingly, in order to position all shoes in the relation to the machine above described, the pins must be shifted to different positions for right and left shoes, respectively. For this purpose, in the construction shown, a block on which the pins are mounted is shiftable in directions laterally of the shoe about an axis located substantally at the end of the toe. Since different lip-supporting plates are required to fit the insole lips of right and left shoes, respectively, and of shoes that differ substantially in size or style, the machine has means for locking each plate detachably in proper position. Conveniently, in accordance with a further characteristic of the construction shown, the proper positions of the work-positioning pins for right and left shoes are determined by the corresponding lip-supporting plates when these plates are locked in their proper positions, each plate being provided with slots through which the pins extend and which permit it to be moved lengthwise of the shoe relatively to the pins for the purpose hereinabove described.

For pulling the upper over the last the machine herein shown is provided with a plurality of grippers comprising a gripper for gripping the upper at the end of the toe, a pair of grippers for gripping it at the corners of the toe, another pair for gripping it in locations substantially at the ends of the tip line, and still another pair for gripping it in the vicinity of the ball portion of the shoe. These grippers are so constructed that their jaws are wide open initially to receive the margin of the upper materials. To enable the operator readily to determine when the margin of the upper is in proper relation to the gripper jaws, and particularly when it is in proper relation to the tip-line grippers which serve automatically, after the upper has been properly positioned therein, to pull it in such manner that the opposite ends of the tip seam are in proper relation to the last, the machine is provided with means for imparting preliminary closing movements to the grippers so as to position and maintain their jaws in close relation to the upper without any substantial grip thereon while the operator finally adjusts the margin of the upper within the jaws. In accordance with the present invention the construction is such that the preliminary closing of the grippers is effected by the operator prior to the starting of the power operation of the machine. As illustrated, there is conveniently used for this purpose the same treadle whereby the lip-supporting plate is moved along the insole into operative relation to the lip as hereinbefore described. Provision is further afforded for fully opening the grippers again, if desired; and in accordance with another feature mechanism is provided for preventing the starting of the machine unless the grippers are preliminarily closed. To insure that the gripper jaws will be positioned in proper relation to the margin of the upper for the purpose in view, as a result of the preliminary closing of the jaws, the invention further provides a construction whereby the grippers are actually closed into gripping relation to the upper and are then partially opened a predetermined amount upon release by the operator of the preliminary closing means.

Features of the invention are further to be recognized in a novel combination of gripper-operating means and gripper-closing means, an object being to provide construction in which the gripper-closing means is operatively independent of the means whereby the grippers are operated to pull the upper and in which the closing of the grippers may be effected and their jaws may be maintained in closed relation with a minimum of power and of wear on the parts. For the purpose in view, in the construction herein shown, jaw-closing mechanisms included in the grippers are arranged to be operated through levers which are movable bodily with the grippers heightwise of the last in the pulling of the upper and are operated through link connections by other levers to effect the relative closing movements of the jaws. As illustrated, the jaw-closing levers are arranged to extend generally heightwise of the last and act through links to operate the jaw-closing mechanisms in the grippers, the levers being fulcrumed on devices through which the grippers are operated to pull the upper and relatively to which the grippers are mounted to swing in the course of the upper-pulling operation.

For operating the grippers to pull the upper heightwise of the last the machine is provided with means which embodies various novel features. As illustrated, all the grippers are thus operated by levers extending widthwise of the last and connected to the grippers at their inner ends, the levers being fulcrumed at their outer ends and operated by force applied thereto between their opposite ends. To cause the upper to be pulled yieldingly, the fulcrum of the levers are yieldingly movable in response to resistance of the upper to the force of the pull, and in the construction shown the fulcrums of the levers associated with the grippers at the corners of the toe and the sides of the forepart are controlled by spring mechanisms which are adjustable to vary the force of the pull by a member common to all of them. More particularly, as illustrated, each of these spring mechanisms comprises a pair of springs, one stronger than the other, with provision for rendering either of the springs or both combined effective in the upper-pulling operation. To assist in positioning the tip line accurately at the proper distance from the end of the toe, it is desirable to limit in a predetermined manner the pulling movement of the toe-end gripper heightwise of the last, this object being attained in the construction shown by mechanism for positively but adjustably limiting the yielding movement of the fulcrum of the lever associated with this gripper. In accordance with a further feature, the gripper-operating means is specially constructed to avoid danger of breakage of parts under any conditions in case the grippers, after their pull on the upper, are engaged and forced farther in the direction of the pull by toe-lasting wipers with which the machine is provided as these wipers wipe the upper heightwise of the last.

Novel features are further embodied in means provided for imparting to the grippers foredrawing movements to pull the upper lengthwise of the last in a toeward direction, means for limiting such movements with respect to certain of the grippers, and means for adjusting the grippers lengthwise of the last. As compared, for example, with the construction disclosed in United States Letters Patent No. 2,039,448, granted on May 5, 1936, upon an application of mine, objects are to provide for greater independence as between different grippers with respect to their foredrawing movements, with respect to adjustments of the grippers and with respect to precision in variably limiting the foredrawing movements of the grippers which grip the upper at the ends of the tip line. In the construction shown there is associated with each gripper foredrawing mechanism comprising a rectilinearly movable member, a link through which swinging movement is imparted to the gripper by this member, and spring means through which force is applied to swing the gripper. With respect to the toe-end gripper, the corner toe grippers and the ball grippers, the foredrawing mechanism in each instance includes provision for readily varying the force applied to the gripper, each mechanism comprising a pair of springs, one stronger than the other, and means for rendering either spring alone or both combined effective in the foredrawing operation. Through each of the foredrawing mechanisms associated with these grippers also the gripper operated thereby may be adjusted lengthwise of the last independently of the other grippers. To render the tip-line grippers effective automatically to determine the distance between the ends of the tip line and the toe-end face of the last, there is associated with each of the foredrawing mechanisms connected to these grippers, in the construction herein shown, a device which acts as a stop to limit the foredrawing movement of the gripper, with provision for adjusting the two stop devices either simultaneously in the same direction or independently of each other. There is also provided means whereby the tip-line grippers may be adjusted simultaneously in the same direction lengthwise of the last to vary their initial positions. In order to counteract such tendency as the toe wipers may have to displace the ends of the tip seam lengthwise of the last in wiping the margin of the upper inwardly over the insole, it is desirable to impart also to these grippers secondary foredrawing movements, preferably after the upper has been clamped against the last at the top of the toe as hereinafter described, and for this purpose the machine herein shown is provided with additional foredrawing mechanisms associated with these grippers and additional stop devices for limiting in an adjustable manner the secondary foredrawing movements.

Control of the corner toe grippers, the tip-line grippers and the ball grippers with respect to movements widthwise of the last is afforded by novel means, hereinafter referred to as gripper-spreading mechanisms, the construction provided being such as to permit the grippers to be moved inwardly toward the last against readily variable yielding resistance by the pull of the margin of the upper thereon as the wipers wipe the upper heightwise of the last and also to permit convenient adjustments of the different grippers to position them properly for operating on right and left shoes and shoes of different widths. As illustrated, there is associated with each of these grippers a lever connected at one end to the gripper and controlled at the other end by spring mechanism yieldable to permit the above-mentioned inward movement of the gripper, these spring mechanisms being adjustable to vary their resistance to the inward movements of the grippers by a member common to all of them. In the construction shown each spring mechanism comprises a pair of springs, one stronger than the other, and means for rendering either spring alone or both combined effective to control the gripper. As further herein illustrated, adjustments of the grippers widthwise of the last are effected by shifting the fulcrums of the above-mentioned levers, provision being afforded for adjusting each corner toe gripper independently by a member associated with it and for adjusting each tip-line gripper either independently or in unison with the ball gripper at the same side of the last.

With respect to the wiper-operating means, the invention provides various novel features. The wipers are supported by a member, herein termed a wiper carrier, which is movable to advance them bodily lengthwise of the last, the wiper carrier being provided with wiper holders mounted thereon for swinging movements to close the wipers widthwise of the last. In the construction shown such swinging movements are imparted to the wiper holders by wiper-closing mechanisms which are operated independently of the movement of the wiper carrier, each of these mechanisms including, however, a lever fulcrumed on the wiper carrier. Adjustment of the wipers preliminarily widthwise of the last is effected, in the construction shown, by shifting the fulcrums of these levers relatively to the wiper carrier. For correspondingly adjusting the wipers lengthwise of the last provision is afforded for shifting the fulcrum of a lever whereby the wiper carrier is operated, the construction being such that as this lever is adjusted compensating adjustments of the wiper-closing mechanisms also are effected to prevent altering the relation of the wipers to each other as they are adjusted lengthwise of the last. By such preliminary adjustments of the wipers they are so positioned that when they have been advanced and closed preparatory to the wiping of the upper heightwise of the last their edges will be in proper relation to the end and side faces of the last to render them properly effective in that operation on the upper. To cause the wipers to act uniformly on all shoes of the same size and style to wipe the upper materials inwardly against the lip of the insole with the required pressure, the invention further provides devices arranged to act as stops to limit respectively, in an adjustable manner, the movements of the wipers lengthwise and widthwise of the last. For thus limiting the movements of the wipers widthwise of the last there is associated with each of the wiper-closing mechanisms a stop device adjustable independently to vary the limit of movement of the wiper operated by that mechanism, the construction shown being further such that a member used to adjust that device may also be connected at will to means for effecting an adjustment of the fulcrum of the corresponding wiper-closing lever to vary at the same time the initial position of the wiper.

The invention also provides, in combination with the wipers, novel fastening-inserting means for fastening the upper in lasted position. As herein illustrated, the fastening-inserting means is so constructed as to drive three tacks at each side of the forepart, not only to fasten the upper directly in these locations, but also to fasten to the shoe a binder wire applied around the toe by the wipers to hold the upper. More particularly, the wiper holders have mounted thereon fastening-inserting devices which are accordingly movable with the wipers in the wiping operation, these devices being also movable relatively to the wipers inwardly toward their wiping edges from tack-receiving positions into positions to drive the tacks. For imparting such positioning movements to these devices and for also operating their drivers to drive the tacks, the machine is provided with novel means comprising an operating member movable heightwise of the last and mechanisms associated respectively with the several devices for first moving them inwardly into their tack-inserting positions and for then operating the tack drivers in response to movement of the operating member in a direction away from the last. More particularly, these mechanisms comprise levers which are swung by springs to impart the inward movements to the devices, as permitted by the above-mentioned movement of the operating member, and are thereafter moved bodily by further movement of that member to impart operative movements to driver-operating levers with which the devices are provided. The fastening-inserting devices further include novel means cooperating with the wiper holders and the wipers to limit the inward and outward movements of the devices and for controlling tack-guiding fingers with which the devices are provided so as to permit tacks to be delivered in positions to be driven by the drivers. It is to be understood that with respect to novel features of this portion of the machine the invention is not limited to a machine in which the fastenings are used to fasten a binder wire to the shoe nor limited as to the number of fastening-inserting devices used in combination with the wipers.

In the machine herein shown the above-mentioned binder wire is fed along a groove in the edges of the wipers by wire-feeding mechanism mounted on the left-hand wiper holder at the time in the operation of the machine when the wipers are wiping the marginal portion of the upper inwardly over the feather of the insole. In order to avoid any possibility that in operating on shoes of certain shapes the end of the binder wire, after passing along an abruptly curved portion of the edges of the wipers at the end or a corner of the toe, will curl inwardly in such manner as to catch in the upper and thereby interfere with further feeding of the wire, the invention further provides novel wire-guiding means, the construction shown comprising mechanism mounted on the right-hand wiper holder for feeding a guide wire in the opposite direction along the groove in the wipers slightly more than half way along the groove, so that the end of the guide wire, which also tends to curl inwardly under the above-mentioned conditions, will act as a shield for the end of the binder wire to prevent the latter from catching in the upper. In time relation to the further feeding movement of the binder wire after it meets the guide wire the latter is withdrawn prior to the driving of the fastening tacks.

The above and other features of the invention, including also novel features of gripper construction, novel means for varying the pressure applied to the upper heightwise of the shoe by the wipers and for correspondingly varying the pressure applied by a shoe holder at the top of the forepart of the shoe, and various novel details of construction and combinations of parts will now be more particularly described with reference to the accompanying drawings and thereafter pointed out in the claims.

In the drawings,

Fig. 1 is a perspective front and side view of a machine in which the invention is embodied;

Fig. 2 is a view of the machine in right-hand side elevation, with parts broken away;

Fig. 3 shows a portion of the machine mainly in vertical section in a plane extending centrally from the front toward the rear;

Fig. 4 shows a portion of the machine as viewed in the direction of the arrow A on Fig. 3, with parts broken away;

Fig. 5 is a section on the line V—V of Fig. 3;

Fig. 6 is a section on the line VI—VI of Fig. 3;

Fig. 11 is a view partly in right-hand side elevation and partly in section of a portion of the gripper-closing mechanism;

Fig. 13 is a view in right-hand side elevation of parts shown in Fig. 12 and other parts associated therewith;

Fig. 14 is a section on the line XIV—XIV of Fig. 13, on an enlarged scale;

Fig. 24 is mainly a front end view in an upwardly inclined direction of the foredrawing means, with certain parts removed and others in section, the upper portion of the figure showing also certain parts as they appear in front elevation;

Fig. 25 is a rear end view of a portion of the foredrawing means, with parts broken away and parts in section;

Fig. 29 shows the wipers and portions of their supporting and operating mechanisms as viewed from above in a rearwardly inclined direction, with parts broken away;

Fig. 30 is a sectional view on an enlarged scale on the line XXX—XXX of Fig. 29;

Fig. 31 is a section on an enlarged scale on the line XXXI—XXXI of Fig. 30;

Fig. 32 is a section on an enlarged scale on the line XXXII—XXXII of Fig. 30;

Fig. 33 is a view in right-hand side elevation of the wiper-supporting and operating mechanisms and parts associated therewith, with certain parts broken away;

Fig. 35 is a view of the same character as Fig. 34 of portions of the structure which adjoin toward the rear of the machine the parts shown in Fig. 34;

Fig. 38 is a section on the line XXXVIII—XXXVIII of Fig. 29, with parts broken away;

Fig. 39 is a view in rear elevation of a portion of the machine;

Fig. 40 is a section on the line XL—XL of Fig. 39;

Fig. 41 is a plan view of a portion of the right-hand wiper and its supporting means and of mechanism associated therewith for feeding and retracting the guide wire along the groove in the wipers, with parts broken away;

Fig. 42 is mainly a section on the line XLII—XLII of Fig. 41;

Fig. 43 is a plan view of a portion of the left-hand wiper and its supporting means and of mechanism associated therewith for feeding the binder wire along the groove in the wipers, with parts broken away;

Fig. 44 is mainly a section on the line XLIV—XLIV of Fig. 43, showing also in section parts located farther to the left than the structure shown in Fig. 43;

Fig. 45 shows partly in elevation and partly in section, on an enlarged scale, the feed wheels shown in Fig. 44 for feeding the binder wire;

Fig. 46 is a plan view of portions of the wipers, with parts broken away, illustrating the relation of the guide wire to the binder wire at a certain time in the feeding of the binder wire, the position of the shoe being indicated diagrammatically by a broken line;

Figs. 47, 48, 49 and 50 are sectional views illustrating with reference to parts at one side of the shoe the positions of the grippers, wipers and tackers at different times in the cycle of operations; and Fig. 51 is a perspective view of the forepart of a shoe as it appears after having been operated upon by the machine.

Figure 7:
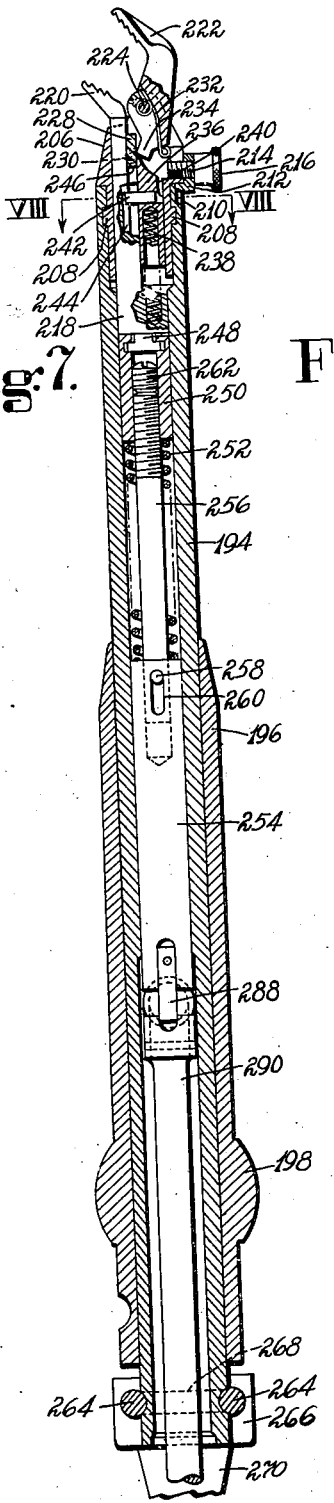
Fig. 7 is a sectional view of one of the grippers and parts associated therewith.

The shoe on its last is supported in the machine bottom downward in an inclined position with its toe end pointing rearwardly and somewhat upwardly, as illustrated diagrammatically by broken lines in Fig. 3, so that the operator may conveniently view the top of the forepart of the upper. For thus supporting a shoe of the welt type the machine is provided with a plate 2 (Figs. 3 and 4) having an upraised rim 4 formed substantially to fit the inner face of the lip of the insole around the toe and also the bottom face of the insole adjacent to the lip. The plate thus serves to support the lip against the inward pressure of the lasting wipers hereinafter described, and it also determines the position of the last heightwise during the operation of the machine. The position of the work in other respects is determined, in the construction shown, by three pins 6 mounted in fixed relation to one another on a block 8 and extending upwardly through slots 10 in the plate 2, these pins being arranged to enter corresponding holes provided in the insole and last in accordance with the disclosure of the previously mentioned Letters Patent No. 1,674,060. In order, however, to permit the shoe to rest on the plate 2 as above described, the holes in the last are of such depths that the pins do not extend to the bottoms of the holes and accordingly their end faces do not have any work-positioning function such as disclosed in the above-mentioned Letters Patent, this function being assumed by the rim 4 of the plate. An important reason for thus providing the pins 6 in addition to the plate 2, instead of depending upon the plate 2 alone to position the work, is that the pins serve as effective means to hold the last against any forward or rearward lengthwise movement during the operation of the machine and therefore eliminate the necessity for any toe-end abutment or heel rest such as provided heretofore, for example, in the machine disclosed in the previously mentioned Letters Patent No. 2,039,448.

The plate 2 rests on the top of the block 8, and by means hereinafter described it is held detachably in a predetermined position in the machine. Since the tip line of a shoe upper, when the upper is in proper relation to the last, extends laterally of the shoe at the top thereof in substantially perpendicular relation to the longitudinal median line of the whole shoe, as distinguished from the longitudinal median line of the forepart only, it is desirable, in order that it may be conveniently determined when the forepart of each upper is in proper relation to the last, that all shoes, whether rights or lefts, be positioned with their heel ends in the same location laterally of the machine, so that the tip lines of both right and left shoes will extend in the same angular relation to the machine. It will be understood that different plates 2 are required for right and left shoes, respectively, and each plate is properly formed to fit the insole lip of the corresponding right or left shoe positioned as above described when the plate is in its predetermined position in the machine. The holes in the insole and last which receive the pins 6 are, however, located in symmetrical relation to the longitudinal median line of the forepart only, so that the two holes more remote from the end of the toe are substantially equidistant from this line. It will be evident, therefore, that in order to position right and left shoes with their heel ends centrally located laterally of the machine as above described, the block 8 which supports the pins 6 must be differently positioned for a right shoe than for a left shoe. The block is accordingly so mounted as to permit it to be shifted in one direction or the other widthwise of the machine about an axis located substantially at the toe-end face of the shoe. The block is supported on a plate 12 which is fast on a block 14 mounted as hereinafter described, and the plate 12 is provided with a T-shaped tongue 16 curved about the abovementioned axis and lying in a correspondingly shaped slot in the block 8. The proper position of the block 8 for a right or a left shoe is determined by the corresponding plate 2 which, as above suggested, is held in a predetermined position laterally of the machine, the slots 10 in the plate being of the same width as portions of the pins 6 which lie in these slots. It will accordingly be understood that the plate interlocks with the pins to determine the proper position of the block 8 which supports the pins.

It is desirable that when the work is first mounted on the pins 6 the rim 4 of the plate 2 be retracted somewhat lengthwise of the shoe from the lip of the insole at the end of the toe, to insure proper clearance between the rim and the lip, and accordingly the slots 10 in the plate are so elongated as to permit movements of the plate lengthwise of the shoe relatively to the pins 6 and the block 8. For imparting such movements to the plate there is mounted on the block 14 a slide 18 having laterally extending flanges 20 (Fig. 5) which lie in guideways in the block. At its front end the plate 2 enters recesses 22 in the slide 18 so that the plate is prevented from moving upward relatively to the slide by lips 24 on the slide. To hold the plate in fixed relation to the slide 18 with respect to movements lengthwise of the shoe there is provided a latch 26 pivotally mounted on the slide and arranged to interlock with the plate in the manner illustrated in Fig. 3, the latch being pressed upwardly by a spring-controlled pin 28 in the slide. The latch enters a notch 29 in the plate to lock the plate against lateral movement and to determine its position laterally of the machine. It will be understood that all that is required to release the plate and permit its removal is to depress the latch 26 and then to slide the plate rearwardly from under the lips 24, whereupon it may be lifted off the block 8.

At its front end the slide 18 is provided with laterally extending flanges 30 which lie in upwardly and downwardly extending guideways 32 formed in the rear end of another slide 34 having flanges movable along guideways 36 formed in a plate 38 which is fast on a casting 40 secured to a bracket 42 fast on the frame of the machine. Adjustably movable also along the guideways 36 is an abutment 44, and pivoted respectively to this abutment and to the slide 34 are toggle links 46 and 48 which are pivoted together by a pin 50. Pivotally mounted also on this pin is the upper end of a hollow link 52 in which is mounted a spring 54. Extending into a slot 56 in the lower end portion of the link 52 under the spring 54 is a pin 58 mounted on one arm of a lever 60 which is fulcrumed between its ends on a rod 62 supported by the casting 40. It will thus be seen that when the lever 60 is swung in a counterclockwise direction (Fig. 3) the pin 58 acts through the spring 54 to straighten the toggle 46, 48 and thus to move the slides 34 and 18 in a rearward direction to carry the rim 4 of the plate 2 into engagement with the lip of the insole at the end of the toe and to seat it firmly against the lip. Lugs 64 on the toggle link 48 are arranged to engage the plate 38 to limit the movement of the toggle. It will be understood that after the toggle has thus been straightened the plate 2 is held positively thereby against any reverse movement in response to inward pressure against the lip of the insole in the lasting operation. The amount of pressure which the plate applies to the inner face of the lip at the end of the toe may be varied by adjusting the abutment 44 along its guideways on the plate 38. For this purpose there is threaded in this abutment one end of a rod 66 which is rotatably mounted in a plate 68 fast on the casting 40 and is held against lengthwise movement by a flange 70 formed thereon at one side of the plate and a knob 72 fast thereon at the other side of the plate. By means of this knob the rod may be turned. A stem 74 extends from the inner end of the rod through a hole in the abutment 44 and has fast thereon a collar 76 to limit adjustment of the abutment in one direction.

It will be understood that the spring 54 is yieldable to permit further movement of the lever 60 after the toggle 46, 48 has been straightened as above described. The lever is thus moved to a position where it is locked against reverse movement by a latch 78 comprising a bell-crank lever mounted on a rod 80 on the casting 40 and having at the end of one of its arms a shoulder 82 arranged to engage a pin 84 on the lever 60. A spring 86 swings the latch 78 into such locking relation to the pin as soon as permitted by the swinging of the lever 60. This prevents the toggle 46, 48 from being broken by a spring 88 which is connected to the pin 50 and to the bracket 42 and serves near the end of the cycle of operations, when permitted by the latch 78, to retract the plate 2 by breaking the toggle.

For swinging the lever 60 into the position where it is held by the latch 78 there is provided a treadle 90 (Fig. 19) mounted to swing about a rod 92 at the base of the front of the machine and connected to the front end of a link 94 the rear end of which is connected to a slide 96 movable along a guideway 98 on the frame. Formed on this slide is a cam face 100 arranged to engage a roll 102 mounted on an arm 104 which is fast on a shaft 106 rotatable in bearings on the frame, and also fast on this shaft is an arm 108 connected by a link 110 to an arm 112 fast on a shaft 114 which is mounted on brackets 116 and 118 supported by a casting 120 which is fast on the frame. Also fast on the shaft 114 is an arm 122 connected to the rear end of a link 124 the front end of which (Fig. 3) is provided with a slot 126 through which extends a pin 128 carried by the lever 60. It will thus be seen that in response to depression of the treadle 90 the cam face 100 acts to swing the arm 104 in a clockwise direction (Fig. 19) and that in response to this movement of the arm the link 124 is moved rearwardly to swing the lever 60 into the position where the latch 78 snaps over the pin 84 and thus locks the lever against reverse movement. Upon release of the treadle 90 by the operator the slide 96 is returned rearwardly by a spring 130 (Fig. 19) connected at one end to the slide and at the other end to a pin 132 on the frame. It will be understood that return movement of the arm 104 is effected ultimately through the mechanism connecting this arm to the link 124 when this link is returned by the lever 60 in response to the action of the spring 88.

For operating the latch 78 to release the lever 60 there is connected to one arm of the latch, by a pin 134, the upper end of a link 136 the lower end of which is connected to one arm of a bell-crank lever 138 mounted to turn about a rod 140 supported by a casting 142 fast on the bracket 42. In the other arm of this bell-crank lever is a slot 144 into which extends a pin 146 mounted in the front end of a link 148 the rear end of which is connected to a lever 150 (Fig. 19) mounted between its ends to swing about a shaft 152 on the frame and provided with a roll 154 engaged by a path cam 156 formed in one side of a cam wheel 158 fast on a cam shaft 160. Near the end of the cycle of operations a portion 162 of the path cam 156 is arranged to swing the lever 150 in the direction to impart forward movement to the link 148 and thereby to cause the pin 146 to swing the bell-crank lever 138 in a clockwise direction (Fig. 3) by engaging the lever at the front end of the slot 144. This causes the link 136 to move upwardly and to swing the latch 78 in the direction to release the pin 84 of the lever 60. Thereafter, before the machine comes to a stop, the lever 150 is swung reversely far enough to permit the latch 78, under the influence of the spring 86, to rest against one side of the pin 84 in the manner illustrated in Fig. 3. It will be evident that, in view of this relation between the pin and the latch, a movement of the latch in a counterclockwise direction occurs in response to engagement of the pin 84 therewith when the lever 60 is swung by the treadle-operated link 124, before the pin arrives in position for the latch to snap over it, and such movement of the latch is permitted by the slot 144 in the bell-crank lever 138 to which the latch is connected.

If the operator, after presenting a shoe on the pins 6 and forcing the plate 2 into engagement with the lip of the insole, should find it advisable to remove the shoe and present it again prior to the operation of the machine thereon, the plate 2 should be returned to its initial position prior to the second presentation of the shoe. There is accordingly provided a rod 164 slidingly movable in the casting 40 and having at its lower end a slot 166 into which the pin 134 extends. By means of a handle 168 fast on the upper end of the rod the operator may lift the rod and thereby swing the latch 78 into position to release the lever 60 to cause the plate 2 to be returned by the spring 88. In order to prevent the possibility of any such release of the lever 60 by this manually operated means at the time in the cycle of operations of the machine when the wipers are pressing the margin of the upper inwardly against the lip of the insole, the path cam 156 (Fig. 19) is so formed as to swing the lever 150 in a clockwise direction far enough to carry the pin 146 to the rear end of the slot 144 in the bell-crank lever 138 so as to prevent any upward movement of the link 136 by the handle 168 at that time.

It will be evident that the shoe, positioned and controlled by the pins 6 and the plate 2, is supported by the block 14 (Fig. 3). This block is mounted on the bracket 42 for upward and downward movements in directions perpendicular to the plate 2 along guideways provided by gibs 170 (Fig. 4) on the bracket, and by adjusting the block along these guideways the position of the shoe heightwise relatively to the wipers may be varied. For this purpose there is threaded in a bushing 172 fast in the block a rod 174 the lower end of which is rotatable in the previously mentioned casting 142, and fast on the rod is a pinion 176 engaged by a rack bar 178 which is slidingly movable in directions widthwise of the machine on the casting 142. This rack bar is adjusted by another pinion 180 (Fig. 4) fast on a rod 182 which is rotatable in the bracket 42 and has fast on its upper end a knob 184 for turning it, the pinion 180 being connected to the rack bar through another pinion 185. It will be evident that the previously described connection between the two slides 18 and 34 permits the slide 18 to move upwardly or downwardly with the block 14 relatively to the slide 34.

Figure 8:
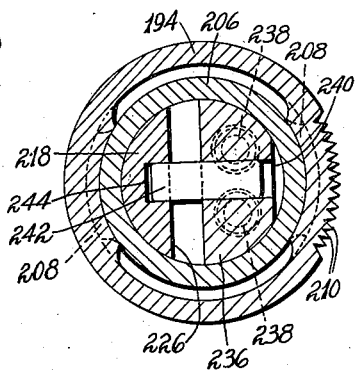
Fig. 8 is a section on the line VIII—VIII of Fig. 7, on an enlarged scale.

For pulling the upper over the last there are provided three toe grippers and two grippers for each side of the forepart. The three toe grippers comprise a toe-end gripper 186 (Fig. 3) for pulling the upper at the end of the toe and two grippers 188 with their jaws in angular relation to the toe-end gripper jaws for pulling the upper at the corners of the toe. The two side grippers at each side comprise a gripper 190 arranged to pull the upper in the vicinity of the tip line and a gripper 192 for pulling the upper at the ball portion of the shoe. The grippers 190 and 192 will therefore be referred to, respectively, for purposes of designation, as tip-line grippers and ball grippers. The several grippers are all substantially alike, and accordingly a description of one will suffice for all. Each gripper (Figs. 7 and 8) comprises a tubular casing 194 slidingly mounted in a sleeve member 196 provided with a spherical boss 198 which is mounted on a correspondingly curved seat 200 (Fig. 3) formed on a bracket 202, this bracket being fast on the frame and on the bracket 42. A cap 204 embraces the boss 198 and has an inner face curved similarly to the boss, the cap being secured to the bracket 202. It will thus be seen that the sleeve 196 is held against lengthwise movement relatively to the bracket, but is permitted to swing in any direction with the gripper casing 194 which is mounted within it. The sleeves 196 associated with all the grippers are mounted in this manner on the bracket 202 and are controlled by means hereinafter described.

Mounted on the upper end of the tubular casing 194 is a jaw holder 206 a portion of which extends into the casing and is provided with flanges 208 (Fig. 8) arranged to enter curved slots in the casing to lock the holder against outward movement after it has been inserted and turned part way around. Formed on the casing 194 are teeth 210 arranged to be engaged by teeth formed on a plate 212 which is mounted on a stud 214 threaded in the jaw holder 206, the plate being engaged by a knob 216 on the stud. It will be understood that the plate is normally clamped against the holder 206 by the knob 216, with its teeth interlocking with the teeth 210 on the casing. In this manner the holder is held against turning movement relatively to the casing. By turning the knob the plate may be released sufficiently to permit its teeth to be disengaged from the teeth 210, whereupon the holder 206 may be turned relatively to the casing to adjust the gripper jaws thereon as may be desired about an axis extending heightwise of the shoe to position them in the best relation to a shoe of any given style or size, the holder then being locked in adjusted position by turning the knob 216 again to clamp the plate 212.

Figure 9:
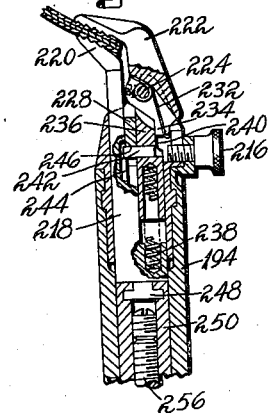
Fig. 9 is a view similar to Fig. 7 of the upper portion of the gripper, showing the jaws in gripping relation to an upper.

Mounted for upward and downward sliding movements in the holder 206 is the shank portion 218 of a gripper jaw 220 arranged to cooperate with another gripper jaw 222 pivotally mounted on a pin 224 on the holder. The jaw 220 will be hereinafter referred to as the inner jaw, since it engages the inner face of the upper materials, and the jaw 222 will be referred to as the outer jaw. In order to provide a wide space between the jaws to receive the margin of the upper materials, and yet to afford provision for a quick gripping of the upper by the jaws and a quick release thereof with a minimum amount of movement of the jaw-controlling means hereinafter described, both the jaws have closing and opening movements, the shank 218 of the jaw 220 moving rectilinearly upward and downward in the holder 206 and the casing 194 and the jaw 222 swinging about the pin 224. The shank 218 is curved to fit the inner face of the holder 206 and the casing 194, but it extends only part way across the opening in the holder and has near the upper end of the latter a flat face 226 (Fig. 8) which is engaged by a small plate 228 (Fig. 7) inserted in slots (not shown) in the holder and held fast therein by a screw 230. A guideway is thus provided for the upper portion of the shank 218 between this plate and the opposite curved wall of the holder 206. The pivoted jaw 222 is held normally in open position by a torsion spring 232 which extends around the pin 224 and at its lower end engages the holder 206, the opening movement of this jaw being limited by engagement of a lug 234 thereon with one side of the plate 228. For imparting closing movement to the jaw 222 there is mounted between this side of the plate 228 and the curved inner wall of the holder 206 a slide 236 having a wedge-shaped upper end arranged to engage the lug 234 on the jaw 222. The lower portion of the slide 236 lies in a recess between the shank 216 of the jaw 220 and the wall of the holder 206 and is bored to receive two springs 238 the lower ends of which rest in sockets in the shank 218. It will thus be seen that as upward movement is imparted to the jaw 220 the slide 236 is moved upward through the springs 238 and its wedge-shaped upper end acts on the lug 234 to swing the jaw 222 toward the jaw 220, the plate 228 preventing any lateral thrust of the slide 236 against the shank of the jaw 220 so that this jaw may be readily moved to release the upper at the required time. Such swinging movement of the jaw 222 is completed before the jaw 220 completes its upward movement, whereupon the slide 236 slips past the edge of the lug 234 and a flat face 240 on the slide engages the side of the lug to hold the jaw 222 stationary during further movement of the jaw 220, as illustrated in Fig. 9. The final gripping of the margin of the upper is therefore effected by rectilinear movement of the jaw 220 alone, and the upper also is later released by movement of this jaw before the jaw 222 starts to open, which is advantageous in case opening movement of the jaw 222 should be interferred with by reason of the proximity of the wipers thereto. The slide 236 carries a pin 242 which extends into a slot 244 in the shank 218 and engages a shoulder 246 (Fig. 9) on the plate 228 to limit upward movement of the slide. As the shank 218 of the jaw 220 is moved downwardly, a shoulder thereon at the upper end of the slot 244 engages the pin 242 to impart return movement to the slide 236 and thus permit the opening of the jaw 222 by the spring 232. An advantage in the provision of the springs 238 for controlling the jaw-closing slide 236 is that if one of the operator's fingers should lie between the jaws at the time of the jaw-closing operation these springs will yield and thus prevent injury to the operator.

At its lower end the shank 218 of the jaw 220 has a projection 248 which interlocks with a tubular member 250 in the casing 194 in substantially the same manner that the holder 206 interlocks with this casing. Below the member 250 is a spring 252 which abuts at its lower end against a jaw-closing slide 254 in the casing 194, so that closing movement is imparted through the spring to the jaw 220 by upward movement of the slide 254. Threaded in the member 250 is the upper end of a rod 256 the lower end of which extends into a bore in the slide 254 and carries a pin 258 extending into slots 260 in the slide. It will thus be seen that this pin-and-slot arrangement permits compression of the spring 252 by further movement of the slide 254 after the jaws have been closed on the upper, and that when return movement is imparted to the slide 254 the slide acts positively through the pin 258 and the rod 256 to impart opening movement to the jaw 220. It will be evident that the amount of initial compression of the spring 252 depends upon how far the rod 256 is screwed into the member 250, and after the proper adjustment a screw 262 threaded in this member may be tightened against the end of the rod to hold the member and the rod in adjusted relation.

Figure 10:
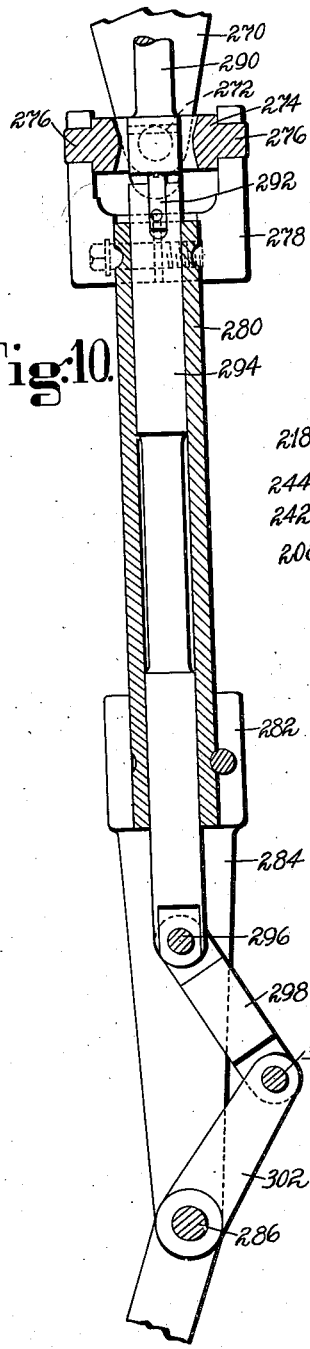
Fig. 10 is a view partly in elevation and partly in section of mechanism connected to the lower end of the gripper shown in Fig. 7.

While the jaws of each gripper are held closed on the upper by mechanism connected to the closing slide 254 as hereinafter described, upper-pulling movement is imparted to the gripper by moving the casing 194 downwardly in the sleeve 196. For this purpose there is fastened by bolts 264 to the lower end of the casing a two-part clamp 266, the bolts lying in a groove 268 in the casing to assist in locking the clamp firmly to the casing. This clamp is provided with a pair of downwardly extending ears 270, and extending into holes in the lower ends of these ears (Fig. 10) are studs 272 projecting from diametrically opposite sides of a ring 274. Projecting also from this ring at right angles to the studs 272 are studs 276 which lie in holes provided in upwardly extending ears of a two-part clamp 278 secured on the upper end of a tubular casing 280. It will thus be seen that the casing 280 is connected to the casing 194 by a universal joint which permits the gripper to be swung to different positions without affecting the operative relation between the casing 194 and the means which operates it. Secured to the lower end of the casing 280 is a sleeve 282 having two downwardly extending arms 284, and mounted in the lower ends of these arms is a pin 286 which connects the arms to operating mechanism hereinafter described. It will be understood that the pulling of the upper results from downward movement of the casing 280 effected by this operating mechanism, this casing imparting a corresponding downward movement to the casing 194 through the universal joint connection between the two casings.

For operating and controlling the closing slide 254 of each gripper there is connected to the lower end of this slide, by a universal joint 288, a rod 290 of smaller diameter than the portion of the casing 194 in which it is positioned, and the lower end of this rod extends into the opening in the ring 274 and is connected by a universal joint 292 to the upper end of a rod 294 slidingly movable in the casing 280. At its lower end the rod 294 is pivotally connected by a pin 296 to a link 298 connected by a pin 300 to the upper arm of a lever 302 mounted to swing on the previously mentioned pin 286 and arranged to extend generally heightwise of the last. This arm of the lever and the link 298 are arranged in the manner of a toggle and are swung toward parallel relation to each other to operate the jaw-closing slide 254.

For operating the appropriate levers 302 to close the jaws of the two side grippers 190 and 192 and the corner toe gripper 188 at each side of the machine, there is provided, at each side of the machine, a lever 304 (Figs. 12 and 13) fast on a shaft 306 which is mounted to rock in bearings in a fixed bracket 308. Each lever 304 is mounted to swing in directions widthwise of the last and has three upwardly extending arms 310 in which are mounted pins 312 having ball-shaped ends connected to the outer ends of links 314 the inner ends of which are pivotally connected to the lower ends of the respective levers 302. Fast on that shaft 306 which is at the right-hand side of the machine is also an arm 316 which carries a ball-ended pin 318 connected by a link 320 to that lever 302 which is associated with the toe-end gripper, so that the jaws of this gripper also are closed by the turning of that shaft. Each of the two levers 304 is provided with a downwardly extending arm 322 provided with a ball-ended pin 324 which is connected by a link 326 to one arm of a bell-crank lever 328 pivotally mounted on a pin 330 supported in a casting 332. This casting is mounted at its lower end (Figs. 11 and 12) on a pin 334 supported in upstanding ears 336 formed on a bracket 338 which is fast on the base of the machine, so that the casting 332 may swing about the pin. Slidingly mounted in bearings in the casting 332 is a rod 340 on which is mounted, between collars 342 and 344 fast on the rod, a member 346. This member carries two rolls 348 engaged by the forked lower arms of the bell-crank levers 328, so that in response to upward movement of the member the bell-crank levers are operated to impart closing movements to the jaws of all the grippers through the connections hereinbefore described. For imparting such upward movement to the member 346 in the power operation of the machine there is provided a bell-crank lever 350 mounted to swing about a rod 352, the rear arm of this lever being forked and provided with two pins 354 which extend into holes in opposite sides of the member 346. The other arm of the bell-crank lever 350 carries a roll 356 engaged by a path cam 358 formed in one side of a cam wheel 360 fast on the cam shaft 160. The provision for swinging movement of the casting 332 about the pin 334 permits the casting to accommodate itself to the different positions assumed by the bell-crank lever 350.

The jaws of the several grippers in their initial positions are widely open to facilitate the insertion of the margin of the upper materials between them, and in order that the operator may readily determine when the margin of the upper is in proper relation to the jaws, and especially when the ends of the tip seam are in proper relation to the tip-line grippers, it is desirable that the outer jaws 222 be swung into close relation to the upper prior to the gripping and pulling of the upper. The machine is accordingly provided with means for imparting preliminary closing movements to the gripper jaws, so as to position and maintain the outer jaws in close relation to the upper without any substantial grip thereon prior to the starting of the power operation of the machine. This means is operated by the same treadle 90 which is used as hereinbefore described to move the plate 2 into supporting relation to the lip of the insole. For the purpose in view the treadle-operated slide 96 (Fig. 19) is connected by a link 362 to an arm 364 which is fast on a rock shaft 366 on the bracket 338, and also fast on this rock shaft is an arm 368 (Fig. 11) having a forked end which carries a pin 370 extending through a slot 372 in a link 374. This link is connected at its lower end to a forwardly extending arm of a bell-crank lever 376 mounted to turn on a rod 378 supported on the bracket 338, this bell-crank lever having a rearwardly extending arm which carries a roll 380 arranged to engage the lower end face of the rod 340. When the parts are in their initial positions the pin 370 is at the lower end of the slot 372, and it will therefore be evident that in response to depression of the treadle 90 the arm 368 acts through the link 374 to swing the bell-crank lever 376 in a counterclockwise direction (Fig. 11) and thus to impart upward movement to the rod 340, so that closing movements are imparted to the gripper jaws through the same mechanism which is later operated by the bell-crank lever 350 in the power operation of the machine. To permit the movement of the bell-crank lever 350 which occurs in response to the depression of the treadle 90, that portion of the path cam 358 in which the roll 356 is located at this time is much wider than the roll, as indicated at 382.

When the operator thus depresses the treadle 90 there is nothing in the construction of the machine other than the cam 358 to limit the closing movements of the gripper jaws, and accordingly the treadle is normally depressed until the jaws actually grip the upper materials, after which, when the operator releases the treadle, the jaws again open a short distance so as not to interfere with any necessary adjustment of the margin of the upper relatively to the jaws. For limiting such opening of the jaws and for maintaining the outer jaws thereafter in close relation to the upper, there is provided an eccentric 384 (Fig. 11) mounted to turn about a rod 386 on the bracket 338 and arranged to engage the peripheral face of a segmental plate 388 which is fast on an arm 390 integral with the bell-crank lever 376, the peripheral face of the plate 388 being concentric with the axis of the rod 378 about which the bell-crank lever swings. A spring 391 connected to the bracket 338 and to an arm 392 which is integral with the eccentric 384 holds the eccentric normally in contact with the plate 334, the arrangement being such that the eccentric does not interfere with the swinging of the bell-crank lever 376 in a counterclockwise direction (Fig. 11), but when in engagement with the plate 388 prevents swinging of the lever in a clockwise direction. Pivotally connected to the arm 392 is a link 394 having in its upper end a slot 396 through which extends a stud 398 threaded in one arm of the bell-crank lever 350, and adjustably mounted in the upper end of the link is a screw 400 one end of which is initially spaced somewhat from the stud 398 but is arranged to be engaged by the latter in response to the swinging of the bell-crank lever 350 which accompanies the closing of the gripper jaws by the treadle 90. Accordingly, near the end of the closing movements of the jaws effected by the treadle the link 394 is operated by the bell-crank lever 350 to swing the eccentric 384 somewhat away from the plate 388. When the operator releases the treadle reverse movement of the jaw-closing mechanism, resulting partly from expansion of the springs 252 in the grippers and partly from the weight of the member 346, causes the stud 398 to release the link 394 and permit the eccentric 384 to be swung by the spring 391 into engagement with the plate 388. Such engagement of the eccentric with the plate occurs before the jaws have opened to any great extent, so that the outer jaws are then maintained in close relation to the upper to facilitate proper adjustment of the margin of the upper. Upon release of the treadle by the operator the slide 96 connected thereto is returned by the spring 130, as hereinbefore explained, and consequently return movement is imparted to the arms 364 and 368 by reason of the connection of the arm 364 to the slide 96 by the link 362. It will be understood that the slot 372 in the link 374 permits such return movement without return of the bell-crank lever 376. For limiting such return movement of the parts under the influence of the spring 130 there is provided a stop screw 402 threaded in an ear 404 which is integral with the arm 368, this screw being arranged to engage the bracket 338. When the bell-crank lever 350 is operated by the cam 358 in the power operation of the machine the gripper jaws are closed firmly on the upper, and in this operation the link 394 is again operated by engagement of the stud 398 with the screw 400 to withdraw the eccentric 384 from the plate 388, thus releasing the bell-crank lever 376 which is then immediately returned to its normal position by the action of a spring 406 connected to the bracket 338 and to one arm of the bell-crank lever. It will be understood that such return movement of the bell-crank lever is limited by engagement of the pin 370 with the link 374 at the lower end of the slot 372.

If the operator, after having imparted preliminary closing movements to the gripper jaws as above described, should desire for any reason to open them again, the machine is so constructed that this may be readily done. For this purpose there is provided a treadle 408 (Fig. 1) mounted to swing about the rod 92 and provided with an arm 410 pivotally connected to the front end of a link 412 which, at its rear end, is provided with a slot 414 (Fig. 11) to receive a pin 416 fast in a downwardly extending arm of a bell-crank lever 418 mounted to swing about the shaft 366. A spring 420 connected to the link 412 and to the bracket 338 holds the link and the treadle 408 initially in positions determined by engagement of the arm 410 with the frame of the machine. The pin 416 also extends through a slot 422 formed in the front end of a link 424 the rear end of which is pivotally connected to the arm 392 which is integral with the eccentric 384. Upon depression of the treadle 408 the link 412 is moved forwardly until the pin 416 is engaged by the link at the rear end of the slot 414 and then farther forwardly to operate the link 424 and thereby swing the eccentric 384 away from the plate 388. This serves to release the bell-crank lever 376 and permit it to be returned to its starting position by the spring 406. It will be evident that by its action on the pin 416 the link 412 also serves to swing the bell-crank lever 418 in a clockwise direction (Fig. 11). Mounted in an upwardly extending arm of this bell-crank lever is a pin 426 which lies in a slot 428 formed in a link 430 pivotally connected to one arm of the bell-crank lever 350. As the bell-crank lever 418 is swung by the link 412 it therefore acts through the link 430 on the bell-crank 350 to insure the prompt return of the gripper jaws to their fully open positions. It will be understood that the slot 428 permits the bell-crank lever 350 to move relatively to the lever 418 in the closing of the jaws and that the slot 422 permits the link 424 to move relatively to the pin 416 when the eccentric 384 is operated by the link 394.

The operating means hereinbefore referred to as connected to the pins 286 for imparting upper-pulling movements heightwise of the last to the several grippers comprises, at each side of the machine, three levers 432 (Figs. 12 and 13) connected at their inner ends respectively to the pins 286 which are associated with the two side grippers 190 and 192 and the corner toe gripper 188 at that side of the machine, these levers being mounted between their opposite ends on a rod 434 which is carried by a yoke 436. At its lower end each yoke is pivotally connected to one arm 438 of a three-armed lever 440 mounted to swing about the rod 352, this lever being provided with two other arms 442 and 444 on which are mounted respectively rolls 446 and 448 engaged by cams 450 and 452 on the cam shaft 160. The cam 450 is thus arranged to impart downward upper-pulling movement to the yoke 436 and the cam 452 to impart reverse upward movement to the yoke. It will be understood that these cams are duplicated at the opposite sides of the machine, so that one pair of cams controls the three above-mentioned grippers at one side of the shoe and the other pair of cams controls the corresponding grippers at the other side of the shoe. Each yoke 436 is controlled at its upper end by a link 454 which is pivotally connected at one end to the yoke and at its other end to the frame, this link and the arm 438 of the lever 440 being arranged in substantially parallel relation to each other. In order to render the levers 432 effective to apply upper-pulling movements yieldingly to the respective grippers, each lever is controlled at its outer end by mechanism which provides a fulcrum for the lever, the fulcrum being yieldable in response to resistance of the upper to the force of the pull of the gripper when this force exceeds a predetermined amount. This mechanism comprises a block 456 fastened by a set screw 458 to a rod 460, the block having two arms 462 between which lies a roll 464 mounted on a member 466 which is supported as hereinafter described on the lever 432 and, as far as the normal pulling of the upper is concerned, may be regarded as a fixed extension of the lever. Extending upwardly from the block 456 is a sleeve 468 confined by a nut 470 threaded on a reduced upper end of the rod 460, this sleeve being slidingly movable with the rod in a bearing member 471 fast on a bracket 472 on the frame. At its lower end the rod 460 is movable in a bearing member 474 fast on the previously mentioned bracket 308, the rod having fast on its lower end a collar 476 to limit its upward movement. Turning of the rod is prevented by a key 478 in the member 474, this key lying in an elongated slot in the rod to permit lengthwise movement of the rod.

To resist yieldingly downward movement of each rod 460 there are provided two springs 480 and 482, one stronger than the other, engaged at their upper ends by a cap 484 abutting against the block 456 and resting at their lower ends respectively on rings 486 and 488. The inner ring 486 is prevented from turning relatively to the rod 460 by a key 490 (Fig. 14), and extending upwardly into slots in both rings are fingers 492 formed on a collar 494 which rests on a shoulder provided by an enlarged lower end portion of the rod 460. The fingers 492 accordingly serve to prevent turning of the outer ring 488 relatively to the inner ring 486 and also to support both rings in such manner as to prevent any downward movement thereof relatively to the rod 460. Supported on the upper end of the lower bearing member 474 is a plate 496 which has fast therein two upwardly extending pins 498 the upper ends of which are just below the lower ends of the rings 486 and 488 when the parts are in their initial positions, the pins being so arranged that their upper end faces may lie partly under one ring and partly under the other. Formed in the inner ring 486 are two substantially semi-cylindrical recesses 500, and formed in the outer ring 488 are two similar recesses 502. As the parts are shown in Fig. 14 the pins 498 are in position to register with the recesses 500 in the inner ring, but not with the recesses 502 in the outer ring. Accordingly, if downward movement is imparted to the fulcrum block 456 and the rod 460 by the action of the lever 432 thereon in the upper-pulling operation, the spring 482 alone opposes such movement, since the pins 498 prevent the outer ring 488 from moving downwardly with the rod but do not prevent the inner ring 486 from moving downwardly. If, on the other hand, the pins 498 are so positioned as to register only with the recesses 502 in the outer ring, the spring 480 alone resists downward movement of the fulcrum block. The pins may be moved to these different positions, to vary the force of the pull applied by the gripper to the upper, by turning the plate 496 which carries the pins, and the plate may, moreover, be turned to such a position that the pins do not register with the recesses in either of the rings, in which event both the springs combined oppose the movement of the fulcrum block. This spring mechanism is of the same general character as disclosed and claimed in United States Letters Patent No. 2,143,030, granted on January 10, 1939 on a joint application of mine and P. E. Burby's.

Figure 12:
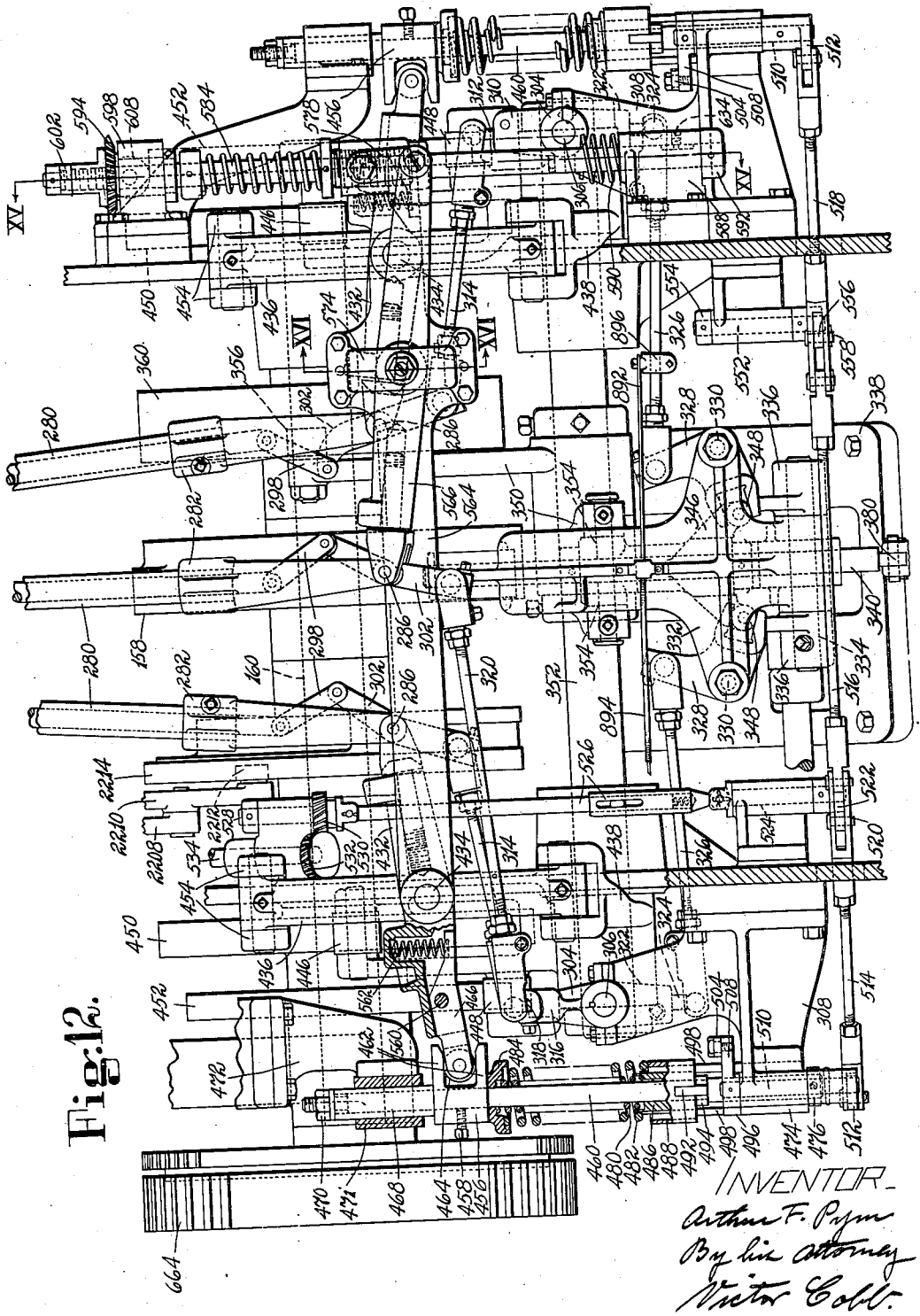
Fig. 12 shows mainly portions of the gripper-closing and gripper-operating mechanisms as viewed from the rear of the machine in a downwardly inclined direction.

The three pin-supporting plates 496 at the right-hand side of the machine are all connected together for adjustment in unison by a link 504 pivotally connected to crank arms 506 on the plates, and this link is connected at its rear end to a crank arm 508 (Fig. 12) fast on a short shaft 510 mounted in a bearing on the bracket 308. At its lower end this shaft carries a crank arm 512 connected by a link 514 to another link 516, and this link is connected to still another link 518 which is connected to a crank arm 512 at the left-hand side of the machine corresponding to the arm designated by the same reference character at the right-hand side. Parts which are substantially duplicates of those at the right-hand side of the machine, and which are designated by the same reference characters, connect the crank arm 512 at the left-hand side to the pin-supporting plates 496 at that side, and it will accordingly be seen that by a single adjustment the spring mechanisms controlling the three gripper-operating levers 432 at the right-hand side of the machine and those at the left-hand side of the machine may be set to cause the springs 480 alone, the springs 482 alone, or the springs 480 and 482 combined, to resist movement of the fulcrums of the levers. For effecting such an adjustment there is pivotally connected to a pin 520 mounted in a forked portion of the link 514 a crank arm 522 which is fast on the lower end of a shaft 524 mounted in a bracket on the frame, this shaft being connected at its upper end by a universal joint to one end of a telescopic shaft 526 extending upwardly and forwardly (Figs. 12 and 13). This shaft is connected at its other end by a universal joint to a shaft 528 mounted in a bracket on the frame and carrying a spiral gear 530 engaged by another spiral gear 532 fast on a shaft 534 rotable in the same bracket. This shaft is connected by a universal joint to a shaft 536 which is similarly connected to the head 538 of a short shaft 540 mounted in a plate 542 fast on the frame at the front of the machine. The shaft 540 carries a crank 544 by which it may be turned to effect the adjustment through the connections described. A spring-pressed pin 546 controlled by a knob 548 on its front end is arranged to enter selectively three holes 550 (Fig. 1) in the plate 542 to maintain the pins 498 in the different adjusted positions hereinabove described. To assist in supporting the links 516 and 518 (Fig. 12) there is mounted in a bracket on the frame a short shaft 552 held by a collar 554 from downward movement and provided on its lower end with a crank arm 556 extending into a forked portion of the link 518 and connected to a pin 558 in the link.

The member 466 which has been referred to as mounted on the outer end of each gripper-operating lever 432 is actually pivoted between its opposite ends on a pin 560 in a recess in the lever and is controlled by a spring 562 which normally holds it with its outer end portion pressed up against a wall of the lever. Accordingly, since the fulcrum block 456 exerts force in an upward direction during the pulling of the upper, the member 466 acts at this time virtually as a fixed extension of the lever 432. The springs 562 are provided in order to avoid any possibility of breakage of parts of the machine in case any one of the grippers should be engaged and forced downwardly a substantial distance by the wipers as the latter wipe the upper heightwise of the last in the manner hereinafter described. If, in that case, the swinging movement of the corresponding lever 432 should be sufficient to cause the fulcrum block 456 to return to its initial position, the member 466 will yield in response to any further such movement of the lever. By reason of this construction the shoe support may, if desired, be so adjusted, that the grippers will grip the upper initially in locations considerably higher than the edge of the insole.

Figure 15:
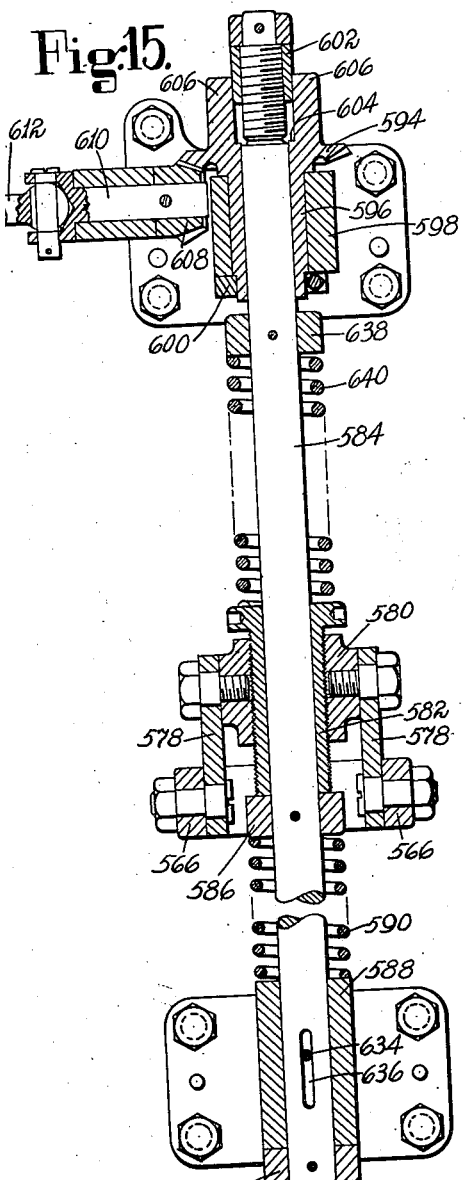
Fig. 15 is a section on the line XV—XV of Fig. 12, on an enlarged scale.
Figure 16:
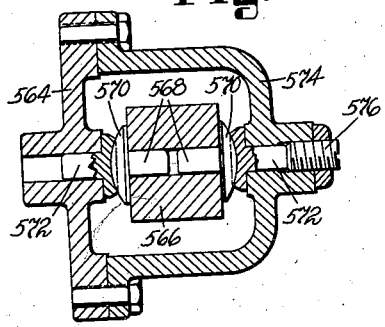
Fig. 16 is a section on the line XVI—XVI of Fig. 12, on an enlarged scale.

For imparting upper-pulling movement heightwise of the last to the toe-end gripper there is provided mechanism which differs somewhat from that provided for operating the other grippers, this mechanism being operated by both the yokes 436 combined. Extending across from one yoke to the other (Fig. 12) is a bar 564 mounted at its opposite ends on the two rods 434 which support the levers 432 on the yokes, and supported on this bar is a lever 566 which extends laterally of the shoe and the inner end of which is connected to the pin 286 associated with the toe-end gripper. The manner in which the lever 566 is supported on the bar 564 is illustrated in Fig. 16. Mounted in a bore in the lever are two pins 568 provided with heads 570 having spherically curved faces which are seated in corresponding depressions formed in the heads of two pins 572 mounted respectively in a bore in the bar 564 and in a bore formed in a cap 574 fast on the bar. A screw 576 in the cap bears against one of the pins 572 for adjusting it. At its outer end the lever 566 is forked (Fig. 15) and is fulcrumed on two links 578 depending from a block 580 threaded on a sleeve 582 movably mounted on a rod 584. This sleeve bears at its lower end on a collar 586 fast on the rod, and between this collar and a fixed bearing member 588 in which the rod 584 is vertically movable is a spring 590 which holds the rod initially upraised in a position determined by engagement of a collar 592 fast on its lower end with the member 588. At its upper end the rod 584 extends through a beveled gear 594 and a downwardly extending sleeve portion 596 thereof which is rotatably mounted in a fixed bearing member 598, a collar 600 fast on the lower end of the sleeve preventing upward movement of the gear. It will be evident that in the upper-pulling operation resistance of the upper to the force of the pull of the toe-end gripper tends to cause the outer end of the lever 566 to swing downwardly and thus to compress the spring 590 by imparting downward movement to the rod 584. To assist in insuring that the tip line of the upper will be located at a predetermined distance from the toe-end face of the last, it is desirable to limit positively the upper-pulling movement imparted to the toe-end gripper. The spring 590 is accordingly of such strength as to yield in the pulling of each upper, so that the rod 584 may be moved downwardly, and such movement of the rod is limited positively by a block 602 which is threaded on the upper end of the rod and is arranged to engage a shoulder 604 on the gear 594. Accordingly there is a positive limit to the yielding movement of the fulcrum links 578. It will be evident that after the block 602 engages this shoulder and stops the downward movement of the rod, the gripper may be moved farther downwardly by the lever 566, but the result nevertheless is to determine positively the limit of movement of the gripper. This limit may be varied as required by different styles or sizes of shoes by adjusting the block 602 along the threaded end of the rod 584. For this purpose the block is flattened on its opposite sides and its flat sides are engaged by lugs 606 on the gear 594, so that the block may be adjusted by turning the gear. The gear is turned relatively to the rod 584 by a pinion 608 fast on a short shaft 610 connected by a universal joint to one end of a shaft 612. The other end of the shaft 612 is connected by a universal joint (Fig. 13) to a shaft 614 mounted in a bracket 616 and having a beveled gear 618 engaging a gear 620 fast on a shaft 622 which is rotatable in this bracket. This shaft is connected through another shaft 624 to a shaft 626 which is rotatable in the previously mentioned bracket 42 and is arranged to be turned by a handle 628 (Fig. 1) fast on a rotatable disk 630. By means of gearing 631 (Fig. 13) the shaft 626 is turned by this disk at a slower speed than the disk, and comparatively slow turning movement also is imparted to a dial plate 632 a portion of which encircles the disk, this dial plate having figures thereon arranged to register with a mark on the bracket 42 to indicate the adjusted position of the block 602. The mechanism for turning the shaft 626 and the dial plate 632 by rotation of the disk 630 will not be described in detail, since its construction is substantially the same as disclosed in Figs. 9 and 10 of United States Letters Patent No. 2,160,846, granted on June 6, 1939, on an application of mine and F. C. Eastman's. To prevent turning the shaft 584 when the gear 594 is turned, a stud 634 (Figs. 12 and 15) is threaded in the bearing member 588 and extends into a slot 636 in the rod. Between a head on the sleeve 582 and a collar 638 fast on the rod 584 is a spring 640 which serves the same purpose with respect to prevention of breakage of parts as the springs 562 carried by the gripper-operating levers 432. In this case the fulcrum links 578, together with the block 580 and the sleeve 582, may be moved upwardly beyond their normal positions against the resistance of the spring 640 if the toe-end gripper is forced downwardly by the wipers. It will be evident that by turning the sleeve 582 in the threaded block 580 the lever 566 may be adjusted to vary the initial height of the toe-end gripper.

For operating the cam shaft 160 to cause the grippers to grip and pull the upper as hereinabove described, and for operating also other parts of the machine hereinafter described, there is provided a power shaft 642 (Figs. 2 and 18) which is driven through a clutch so constructed and controlled that the machine comes automatically to a stop to permit inspection of the upper while the grippers are holding it under tension and may then, if desired, be reversed to cause the grippers to return to their starting positions and to release the upper. The power shaft 642 is mounted in bearings in the frame and in a bracket 644 fast on the frame and carries a worm 646 in engagement with a worm gear 648 which is fast on a second cam shaft 650 having cams thereon for operating parts hereinafter described. The shaft 650 carries a gear 652 in mesh with a gear 654 which is mounted to turn about a rod 656 supported by the frame, and the gear 654 is in mesh with an idle gear 658 rotatable about a rod 660 supported on a bracket 662. The gear 658 is in mesh with a gear 664 fast on the cam shaft 160 for rotating this cam shaft.

Mounted to turn on the shaft 642 is a pulley 666 which in the construction herein shown is driven continuously by a belt 668 from an electric motor 670 on the top of the machine. The pulley 666 is formed to serve as one of the members of a friction clutch and is movable lengthwise of the shaft 642 into or out of driving engagement with a cooperating clutch member 672 which is sleeved on a hub of the pulley and is secured by a plurality of bolts, one of which is shown at 674, to a drum 676 which serves as a housing for planetary gearing. This planetary gearing comprises a pinion 678 rotatably mounted on a pin 680 which is fast in the clutch member 672 and in the drum 676 and is in mesh with a pinion 682 formed on the hub of the pulley 666. Mounted on the hub of the pinion 678 and held in fixed relation to this pinion by a pin 684 is a sprocket wheel 686 connected by a chain 688 to another sprocket wheel 690 formed on a sleeve 692 which is secured to the shaft 642 by a pin 694. Secured also to the shaft by this pin is a brake wheel 696 mounted in a groove in the periphery of which is a brake band 698, controlled as hereinafter described, for stopping rotation of the shaft 642 and for holding it stationary when the machine is idle. When the machine is thus idle the clutch member 672 and the drum 676 are rotated in the same direction as the pulley 666 but at lower speed by the action of the pinion 682 on the pinion 678, since the sprocket wheel 690 to which the pinion 678 is connected through the chain 688 is held stationary. Turning of the shaft 642 in the normal direction to operate the machine results from frictional engagement of the pulley 666 with the clutch member 672, under which conditions the pinions 678 and 682 are maintained in fixed relation to each other and the shaft is driven in the same direction as the pulley by the action of the chain 688 on the sprocket wheel 690 as the pinion 678 is carried bodily about the axis of the shaft, the brake wheel 696 having been released. To cause the machine, if desired, to be driven reversely after it has come to a stop with the upper under tension, the drum 676 is brought to a stop and is held stationary by a brake band 700 which lies in a peripheral groove in the drum and is controlled as hereinafter described. When the drum is thus held stationary, and the brake wheel 696 also is released, the rotation of the pinion 682 causes the pinion 678 to drive the chain 688 in the direction to turn the shaft 642 reversely and thus to return the parts of the machine to their starting positions.

Figure 17:
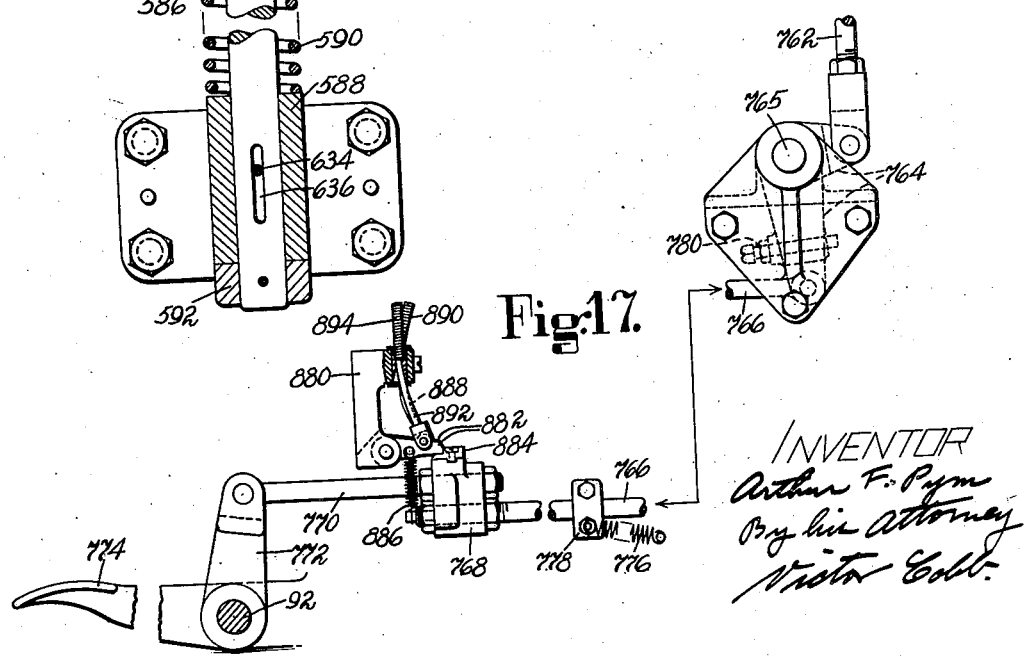
Fig. 17 shows mainly in right-hand side elevation certain parts for controlling the starting of the power operation of the machine.
Figure 18:
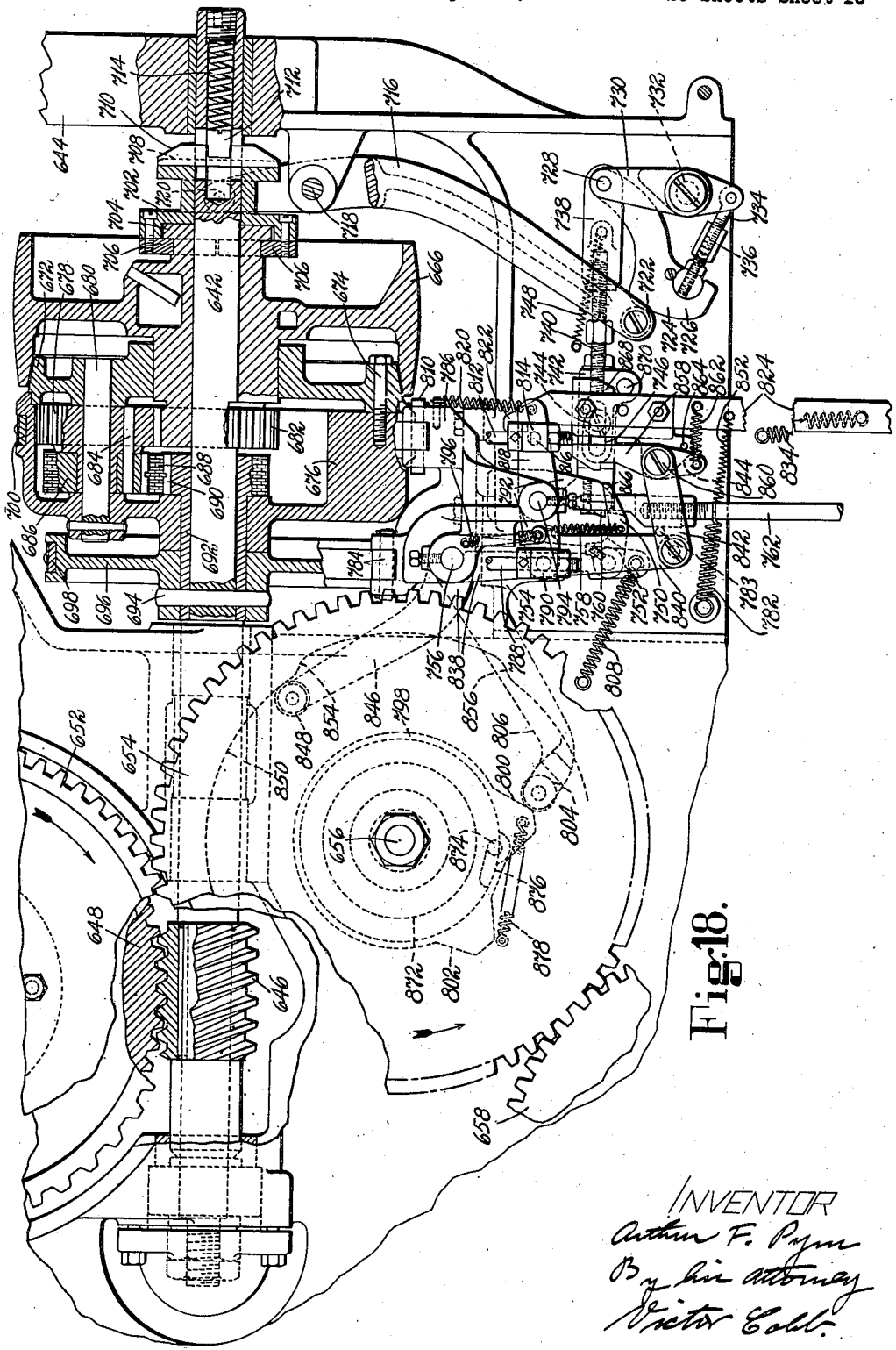
Fig. 18 is a view partly in right-hand side elevation and partly in section of the power-driving means and of means for starting, stopping and reversing the operation of the machine.

For moving the pulley 666 into and out of driving engagement with the clutch member 672 there is slidingly mounted on the shaft 642 a spool 702 connected at one end to a flange 704 on the hub of the pulley by two plates 706 which are fast on the spool. Mounted in a transverse groove 708 in the other end of the spool is a key 710 which extends through a slot in the shaft 642 and is provided midway between its ends with a recess into which extends a button 712 slidingly mounted in a bore in the shaft and engaged by a spring 714 in the shaft. This spring accordingly serves, when permitted, to force the pulley 666 into driving engagement with the clutch member 672. For maintaining the pulley normally out of such engagement and for releasing it to start the machine, there is provided a lever 716 mounted on a pin 718 on the bracket 644 and having a forked upper end provided with a pair of rolls 720 which lie in a groove in the spool 702. At its lower end the lever 716 carries a roll 722 engaged by a cam face 724 formed on an arm 726 which is pivotally mounted at its upper end on a pin 728 carried by the upper end of a lever 730, this lever being pivotally mounted between its upper and lower ends on a stud 732 on the bracket 644. The lower arm of the lever 730 is connected by a link 734 to the lower end of the arm 726, this link comprising threaded portions connected by a turnbuckle 736 for adjusting the arm 726 relatively to the lever 730. Also mounted on the pin 728 is a block 738 adjustably connected by a threaded rod 740 to another block 742 which is supported and guided by a stud 744 threaded in the bracket 644 and extending through a slot 746 in the block. A spring 748 connected to the block 738 and to the frame of the machine tends to move this block and the block 742 toward the left (Fig. 18). Initially, however, such movement is prevented by a latch 750 arranged to engage the end face of the block 742, this latch being pivotally mounted on a downwardly extending arm 752 of a bell-crank lever 754 which is mounted on a pin 756 on the frame. A spring 758 connected to the latch 750 normally holds it up in a position determined by engagement of a shoulder thereon with a shoulder on the arm 752, in which position the latch prevents movement of the block 742 by the spring 748. The latch 750 is swung downwardly to release the block 742 by a hook 760 which is fast on the upper end of a rod 762 connected at its lower end (Fig. 17) to one arm of a bell-crank lever 764 mounted to swing about a pin 765 on a bracket on the frame. The other arm of this bell-crank lever is connected by a rod 766 to a block 768 which is fast on another rod 770 pivotally connected to a crank arm 772 mounted to swing about the rod 92 and integral with a starting treadle 774 (Fig. 1). A spring 776 connected to a collar 778 fast on the rod 766 holds this rod and the parts connected thereto initially in positions determined by engagement of a stop screw 780 carried by one arm of the bell-crank lever 764 with a shoulder on the bracket on which this bell-crank lever is mounted. A spring 182 (Fig. 18) connected to the rod 762 holds the rod against a fixed pin 783 with the hook member 760 in proper relation to the latch 750. It will be understood that in response to depression of the starting treadle 774 the rod 762 is moved downwardly to swing the latch 750 out of engagement with the end of the block 742, thus permitting the lever 730 and the arm 726 to be swung by the spring 748 far enough to carry the cam face 724 of the arm to a position where it permits the pulley 666 to be forced into driving engagement with the clutch member 672 by the spring 714. Such movement of the lever 730 is limited by engagement of the stud 744 with the block 742 at one end of the slot 746 in the block. The latch 750 is arranged to control not only the pulley 666, but also the brake band 698. This brake band is anchored at one end by a pin 784 to a fixed bracket 786, and at its other end it is connected by a link 788 to a trunnion block 790 mounted on one arm of a bell-crank lever 792 which is pivotally mounted on a pin 794 on the bracket 786. The other arm of this bell-crank lever extends downwardly to a position where it is normally engaged by a portion of the latch 750 to hold the brake band 698 tightly applied to the brake wheel 696. Upon the release of the bell-crank lever by the latch, which occurs slightly before the release of the block 742, a spring 796 connected to the bell-crank lever swings it in the direction to insure proper release of the brake.

In order to stop the machine after it has been started as above described, the latch 750 must be moved toward the left (Fig. 18) until it can snap upwardly into operative relation to the block 742 and the downwardly extending arm of the bell-crank lever 792 and must then be moved to the right to impart to the block its clutch-releasing movement and to apply the brake. For this purpose the bell-crank lever 754 which carries the latch is controlled by a cam member 798 mounted to turn with the gear wheel 654 and provided with two cams 800 and 802 arranged to act on a roll 804 carried by an arm 806 of the bell-crank lever. Shortly after the starting of the machine the cam 800 moves past the roll 804 and permits the bell-crank lever 754 to be swung in a clockwise direction by a spring 808 connected to the arm 752 of the lever. By such movement of the bell-crank lever the latch 750 is carried away from the hook 760 to a position beyond the block 742 and the lower arm of the bell-crank lever 792, so that it can snap upwardly again to its normal position on the arm 752. Thereafter the cam 802 imparts reverse movement to the bell-crank lever 754 to stop the machine in the manner above described, the machine being stopped at this time at that point in the cycle when the grippers are holding the upper under tension after having applied a pull thereto. In the same manner the cam 800 acts, after the machine has again been started, to bring it to a stop at the end of the cycle. It will be understood that the operation of the lever 716 to disconnect the pulley 666 from the clutch member 672 is effected by the cam face 724 of the arm 726 as this arm is swung by the lever 730.

If it should be desired, after the machine has been stopped by the cam 802, to reverse it so that the parts will return to their starting positions, it is necessary, as previously stated, to apply the band 700 tightly to the drum 676 and thus stop the rotation of the drum, and also to release the brake band 698, while maintaining the pulley 666 out of driving engagement with the clutch member 672. The band 700 is anchored at one end to a fixed pin 810 on the bracket 786 and is connected at its other end by a link 812 to a trunnion block 814 having a pin 816 whereby it is mounted on the forked end of an arm 818 which is movable about the pin 794. A spring 820 connected to the arm 818 normally upholds it to maintain the band 700 in a loosened condition. For swinging the arm downwardly to tighten the band and thus cause the shaft 642 to be driven reversely, there is provided a hook member 822 lying between the forks of the arm 818 and arranged to extend over the pin 816, this member being fast on the upper end of a bar 824 which extends downwardly and is pivotally connected at its lower end (Fig. 2) to one arm of the bell-crank lever 826 mounted to swing about the previously mentioned pin 765. The other arm of this bell-crank lever is connected by a link 828 to an arm 830 (Fig. 1) fast on the rod 92 at the front of the machine, this rod being mounted for turning movement and having also fast thereon a reversing treadle 832. A spring 834 connected to the bar 824 normally holds the bar upraised in a position determined by engagement of a stop screw 836 on one arm of the bell-crank lever 826 with a shoulder on the bracket which supports the lever. In order to avoid danger of breaking the machine, the bar 824 is so controlled that depression of the reversing treadle 832 when the parts are in their initial positions will have no effect on the band 700. For this purpose there is provided a bell-crank lever 838 (Fig. 18) mounted to swing about the pin 756 and having a downwardly extending arm 840 connected by a link 842 to an ear 844 on the hook member 822. The other arm 846 of the bell-crank lever 838 carries a roll 848 arranged to engage an internal cam face 850 formed on the gear wheel 654. A spring 852 connected to the bar 824 tends to swing the bar toward the left (Fig. 18), but when the parts are in their initial positions the bar is held far enough to the right by the action of the cam face 850 on the bell-crank lever 838 to prevent the hook member 822 from engaging the pin 816 if the reversing treadle is depressed. Immediately after the starting of the machine, however, a portion 854 of the cam face 850 permits the bar to be swung by the spring 852 into such a position that if it is moved downwardly it will engage the pin 816 and thereby tighten the band 700 on the drum 676, and the parts are in this relation when the machine is brought to a stop by the cam 802. If the machine should not be reversed at this time, but should be started again to cause it to complete its cycle, a portion 856 of the cam face 850 serves to swing the hook member 822 again from over the pin 816 shortly after such starting of the machine. Having depressed the reversing treadle, the operator holds it depressed until the hook member 822 is disconnected from the pin 816 by the action of the portion 854 of the cam face 850 on the bell-crank lever 838, which action occurs just as the parts of the machine arrive in their starting positions.

In order to release the brake when the machine is reversed, there is provided a hook member 858 pivotally mounted on a stud 860 which connects the previously mentioned link 842 to the ear 844 on the hook member 822. The hook member 858 is held normally by a spring 862 in a position determined by its engagement with a pin 864 on the ear 844. When the bar 824 is swung by the spring 852 to carry the hook member 822 to a position over the pin 816, the hook member 858 is carried thereby to a position over an extension 866 of the latch 750, and accordingly when the bar 824 is operated by the reversing treadle the latch 750 is swung downwardly to release the bell-crank lever 792 which controls the brake band 698. In order to prevent the pulley 666 from being moved into driving engagement with the clutch member 672 in response to such downward movement of the latch 750, a plate 868 fast on the hook member 822 is arranged to engage a pin 870 on the block 742, and thus prevent the lever 730 from being moved by the spring 748 into position to release the clutch-controlling lever 716.

It will be understood that as the machine starts its reversing movement the cam 802 permits the bell-crank lever 754 to be swung by the spring 808 to carry the latch 750 into position again to connect with the bell-crank lever 792, the extension 866 of the latch being carried out from under the hook member 858. Accordingly the cam 800 becomes effective, by its action on the arm 806 of the bell-crank lever 754, to apply the brake when the parts arrive in their starting positions. It will be evident, however, that if this cam were in fixed relation to the gear wheel 654 it would apply the brake too soon, since the roll 804 is not engaged at this time by the same side of the cam which acts thereon to apply the brake normally at the end of the cycle. Accordingly, the cam member 798 on which the cams 800 and 802 are formed is mounted to turn about a boss 872 on the gear wheel 654 between limits determined by a pin 874 on the gear wheel and a slot 876 in the cam member. A spring 878 connected to this member and to the gear wheel holds the member normally in the position illustrated in Fig. 18, but is yieldable to permit the cam member to be held from turning, by engagement of the roll 804 with the cam 800, until the pin 874 travels the length of the slot 876 and engages the member at the other end of the slot. The cam 800 then acts to apply the brake at the proper time, and as soon as the roll 804 arrives at the top of the cam 800 the cam member 798 is returned to its normal position relatively to the gear wheel by the spring 878, the parts thus assuming the relative positions illustrated in Fig. 18.

In order to insure that prior to the starting of the power operation of the machine the treadle 90 will have been depressed to move the plate 2 into supporting relation to the lip of the insole and to impart preliminary closing movements to the gripper jaws, there are pivotally mounted on a bracket 880 (Figs. 2 and 17) a pair of pawls 882 arranged to engage a plate 884 fast on the block 768 to prevent depression of the starting treadle 774, these pawls being normally held in operative positions by springs one of which is shown at 886. One of these pawls is connected by a wire cable 888, which extends through a flexible conduit 890, to the previously mentioned pin 58 (Fig. 3) on the lever 60 which, as hereinbefore described, is operated by the treadle 90 to move the plate 2 into its operative position. By such movement of the lever 60 a pull is applied to the cable 888 to lift the pawl connected to the cable out of engagement with the plate 884. The other pawl 882 is connected by a wire cable 892, which extends through a flexible conduit 894, to a block 896 (Fig. 12) fast on one of the gripper-closing links 326. Accordingly, in the preliminary closing of the gripper jaws a pull is applied to the cable 892 to lift the other pawl 882 out of engagement with the plate 884. The block 768 is therefore released to permit the starting of the machine by depression of the starting treadle 774. In case the operator, by depression of the treadle 408, should cause the gripper jaws again to open prior to the starting of the machine, that one of the pawls 882 which is connected to the cable 892 is returned to its operative position and prevents the starting of the machine until after the operator has again depressed the treadle 90 to impart preliminary closing movements to the gripper jaws.

To assist in stretching the upper properly lengthwise of the last and in locating the tip seam at the proper distance from the toe-end face of the last, the machine is provided with means for imparting to all the grippers in the upper-pulling operation foredrawing movements, i. e., movements lengthwise of the last to pull the upper forwardly toward the end of the toe. The grippers are thus operated by swinging the sleeve members 196 (Fig. 3), in which the gripper casings 194 are slidingly mounted, about their seats on the bracket 202. For this purpose there is fast on the lower end of each sleeve member, below the bracket 202, a downwardly and rearwardly extending arm 898. The mechanisms for imparting the foredrawing movements to the grippers are connected to these arms and are supported on the previously mentioned casting 120 (Fig. 19) which extends substantially across the lower front portion of the machine from side to side and is inclined upwardly in a rearward direction. The arm 898 for controlling the corner toe gripper 188 at each side of the machine is connected by a ball-and-socket joint to one end of a link 900 (Fig. 20) the other end of which is connected by a ball-and-socket joint to one end of a rod 902, one of these rods being shown in full in Fig. 22. The arm 898 for controlling the ball gripper at each side of the machine is connected by a ball-and-socket joint to one end of a link 904 the other end of which is connected by a ball-and-socket joint to another rod 902 of the same construction as the above-mentioned rod. Each link 900 comprises two telescoping parts between which, in a socket in one of the parts, is a compression spring 906 for a purpose hereinafter described. One of the parts is provided with a lug 908 which extends into a slot 910 in the other part, so that when a pull is applied to the link by the rod 902 to impart foredrawing movement to the gripper, force is transmitted positively from the rod to the gripper. Except for dimensions of parts, the links 904 are substantially identical in construction with the links 900 and include similar springs 906. It will thus be seen that at each side of the machine there are two rods 902 connected respectively by links to the corner toe gripper and the ball gripper at that side of the machine.

Figure 22:
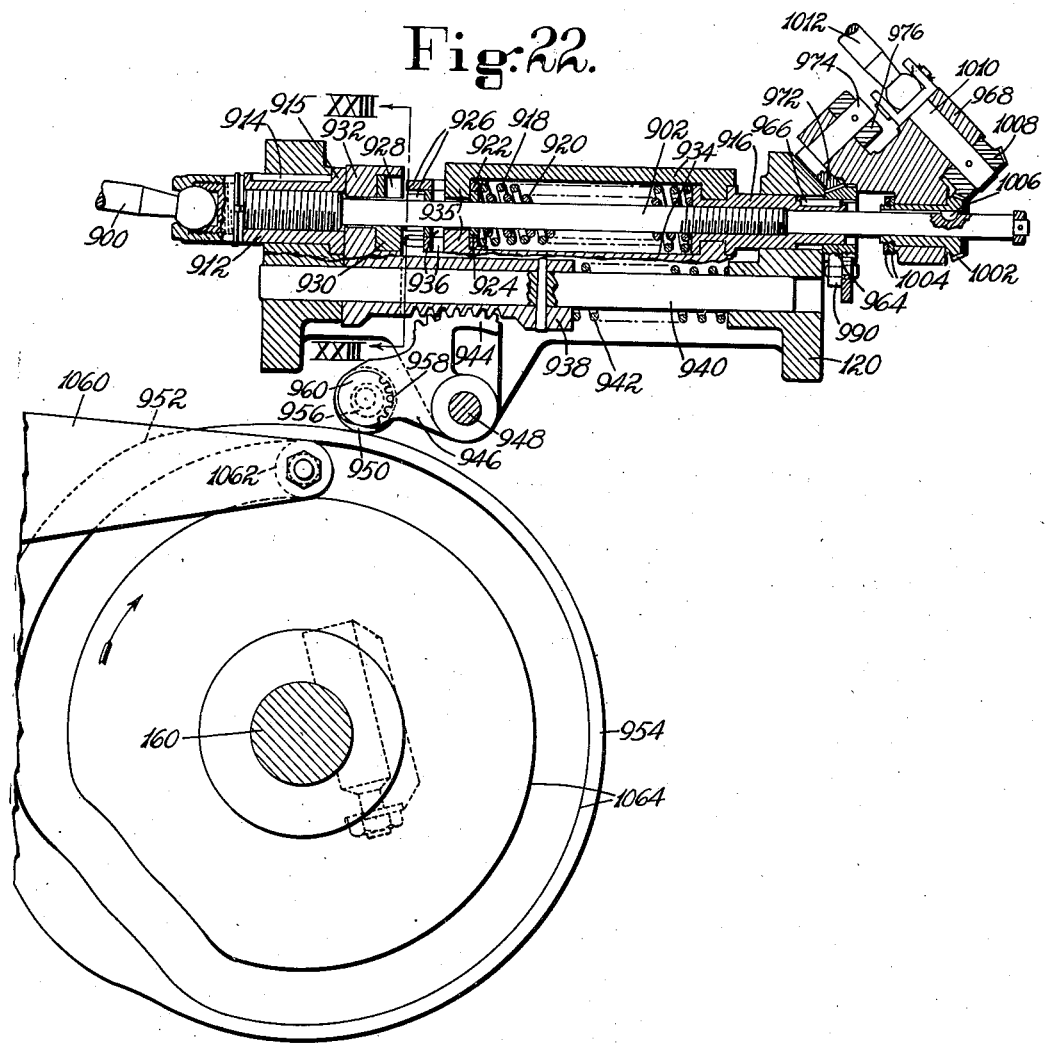
Fig. 22 is mainly a section on the line XXII—XIII of Fig. 20.

The mechanisms for operating and controlling all the rods 902 are substantially identical in construction, one of these mechanisms being shown in detail in Fig. 22. The rod 902 is threaded at one end in a sleeve 912 which is held from turning by a key 914 but is movable lengthwise with the rod in a bearing in the casting 120, the sleeve having a flange 915 for engaging the casting to limit movement of the sleeve and the rod in one direction. A portion of the rod is also threaded in another sleeve 916 slidingly movable with the rod in the casting 120. Operative movement is imparted to the rod 902 by force applied to the sleeve 916 through one or the other, or both, of two springs 918 and 920 which bear at one end against the sleeve and at their opposite ends are engaged respectively by rings 922 and 924. Formed on each of these rings are three fingers 926 which may or may not aline with three slots 928 (Fig. 23) formed in a block 930 fast in a socket in a member 932. Fastened to the sleeve 916 are two bars 934 provided with lugs 935 which extend into slots 936 in the rings 922 and 924 to hold these rings from turning relatively to each other and to limit expansion of the springs 918 and 920. The member 932 is the operating member for imparting movement to the rod 902 through the springs, and it will be understood that if the fingers 926 of the outer ring 922 are in alinement with the slots 928, while the fingers of the inner ring are out of alinement with the slots, the rod 902 will be operated through the inner spring 920 alone upon movement of the member 932 toward the right (Fig. 22). On the other hand, if the fingers of the inner ring 924 only are in alinement with the slots, the inner spring will remain idle and force will be transmitted only through the spring 918. The two bars 934 serve as means for adjustably turning the rings in response to turning movement of the sleeve 916 effected by mechanism hereinafter described, provision being afforded for three different settings of the rings so that the rod 902 is operated through either of the two springs alone or, when all the fingers 926 are out of alinement with the slots 928, through both the springs combined.

Figure 20:
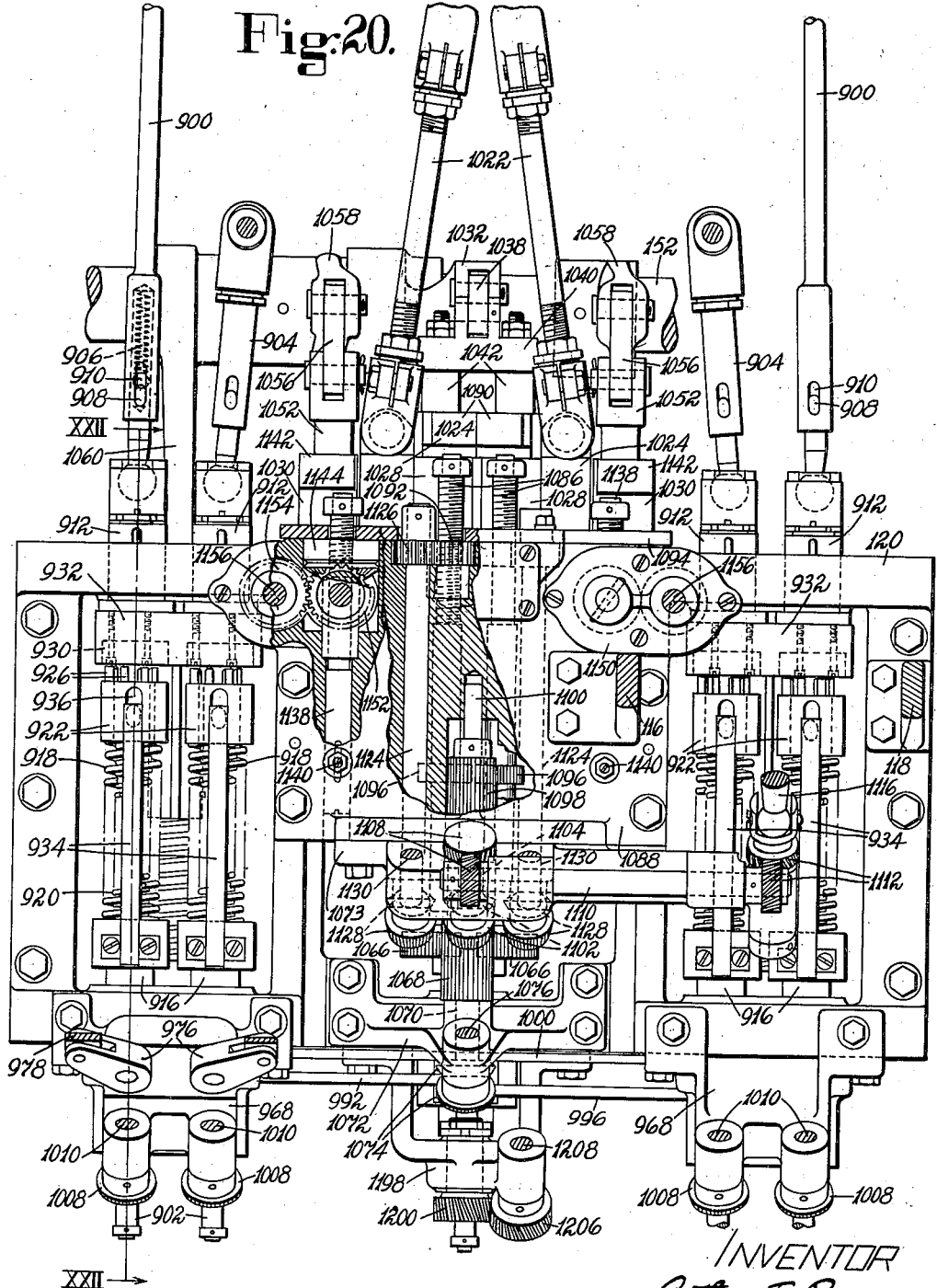
Fig. 20 is a view of the foredrawing means in the direction of the arrow B on Fig. 19, with parts broken away.
Figure 23:
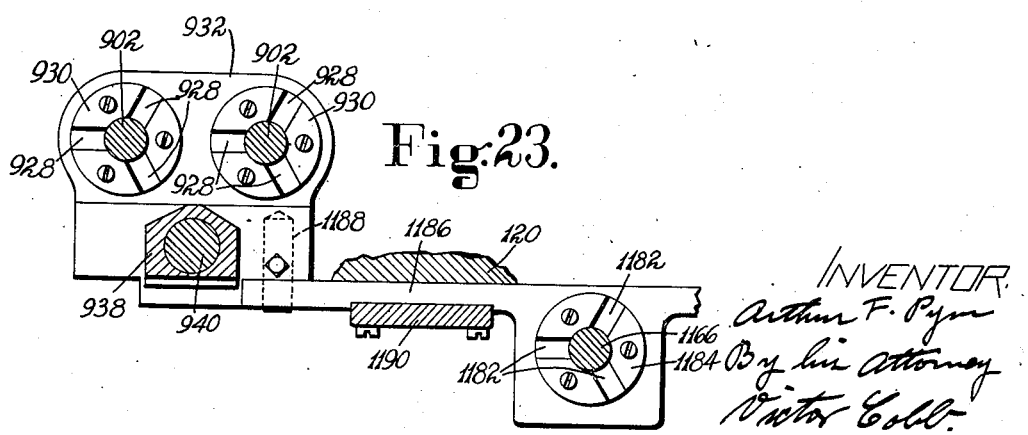
Fig. 23 is a section on the line XXIII—XXIII of Fig. 22.

By reference to Figs. 20 and 23 it will be evident that the member 932 at the left-hand side of the machine serves to operate both rods 902 at that side of the machine, and the corresponding member 932 at the right-hand side of the machine operates both rods 902 at that side. Each of these members is provided with a shank portion 938 (Fig. 22) which is fast on a rod 940 slidingly mounted in the casting 120, and between the shank portion 938 and a boss on the casting is a spring 942 which serves as means for returning the member 932 to starting position. Formed on the shank portion 938 are rack teeth engaged by a gear sector 944 formed on a lever 946 which is mounted to swing about a rod 948 on the casting 120 and carries a roll 950, this roll at the left-hand side of the machine being arranged to be engaged by a peripheral cam 952 formed on a cam wheel 954 fast on the cam shaft 160. The roll 950 is mounted on an eccentric 956 which may be turned to adjust the roll properly in setting up the machine or to compensate for wear, the eccentric being held in adjusted position by a pin 958 inserted in the lever 946 and arranged to engage teeth formed on a disk 960 which turns with the eccentric. It will be understood that by the cam 952 the lever 946 is operated to move the member 932 in the direction to operate the rods 902, and that the member 932 is returned by the spring 942 when permitted by the cam. In such return movement of the member 932 it acts on the sleeves 912 to return the grippers. It will be understood also that, corresponding to the cam 952 at the left-hand side of the machine, there is another cam for operating the member 932 at the right-hand side of the machine, this cam being the peripheral cam 962 (Fig. 11) which is formed on the previously mentioned cam wheel 360.

In order to prevent the grippers controlled by the links 900 and 904 from being impelled suddenly farther forward by the springs through which the links are operated at the time when the grippers release the upper, the cams for operating the members 932 are so formed as to permit reverse movements of these members far enough to relieve the links from the force of the springs by the time the grippers are opened. In the event that the release of the upper by any one of these grippers should be delayed longer than usual by reason, for example, of the thickness of the upper materials, the previously mentioned springs 906, which are comparatively light springs, are provided in the links 900 and 904, so that by reason of the yield of this spring in any one of the links any substantial reverse pull lengthwise of the last on the margin of the upper by the corresponding gripper, by reason of return of the rod 902 by the member 932, will be avoided.

Reference has been made to the fact that either of the two springs 918, 920 alone, or both combined, may be rendered effective to transmit movement from the member 932 to the corresponding rod 902 by turning the sleeve 916 about the rod. For this purpose there is associated with each sleeve 916 a sleeve 964 (Fig. 22) mounted on the end thereof and connected thereto by a key 966 so that the sleeve 916 may be turned by the sleeve 964 but may move lengthwise relatively to the latter, the sleeve 964 being held against movement in directions lengthwise of the rod 902 by engagement with the casting 120 and with a bracket 968 on the casting. Formed on each sleeve 964 at the left-hand side of the machine are gear teeth 970 (Fig. 24) engaged by a gear sector 972 fast on a shaft 974 which is rotatable in the bracket 968 (Fig. 22). Also fast on each shaft 974 is a crank arm 976. That crank arm 976 which is associated with the mechanism for operating the left-hand corner toe gripper is connected by a link 978 to another crank arm 980 fast on a shaft 982 rotatable in the previously mentioned front frame plate 542 (Fig. 1). The shaft 982 carries a crank arm 984 in which is a spring-pressed pin 986 arranged to enter any one of three holes 988 in the plate 542 to determine the proper adjustment of the parts for the selective use of the springs in the manner described. Each of the four sleeves 964 has an arm 990 extending downwardly therefrom, and the arm 990 associated with the mechanism for operating the left-hand corner toe gripper is connected by a link 992 to a member 994 rotatably mounted for a purpose hereinafter described, this member being connected by another link 996 to that arm 990 which is associated with the mechanism for operating the right-hand corner toe gripper. Accordingly the crank arm 984 serves to adjust simultaneously the selective spring mechanism associated with both corner toe grippers to cause both grippers to be operated through these mechanisms with substantially the same amount of force variably determined by the adjustment. The selective spring mechanisms associated with the two ball grippers are similarly adjusted by a crank arm 998 (Figs. 1 and 24) connected to the arm 976 which is associated with the mechanism for operating the left-hand ball gripper by means of the same character as that which connects the crank arm 984 to the corresponding arm 976. To cause both these spring mechanisms to be adjusted simultaneously by the crank arm 998, the two depending arms 990 associated with the mechanisms for operating the ball grippers are connected together by a link 1000.

Figure 19:
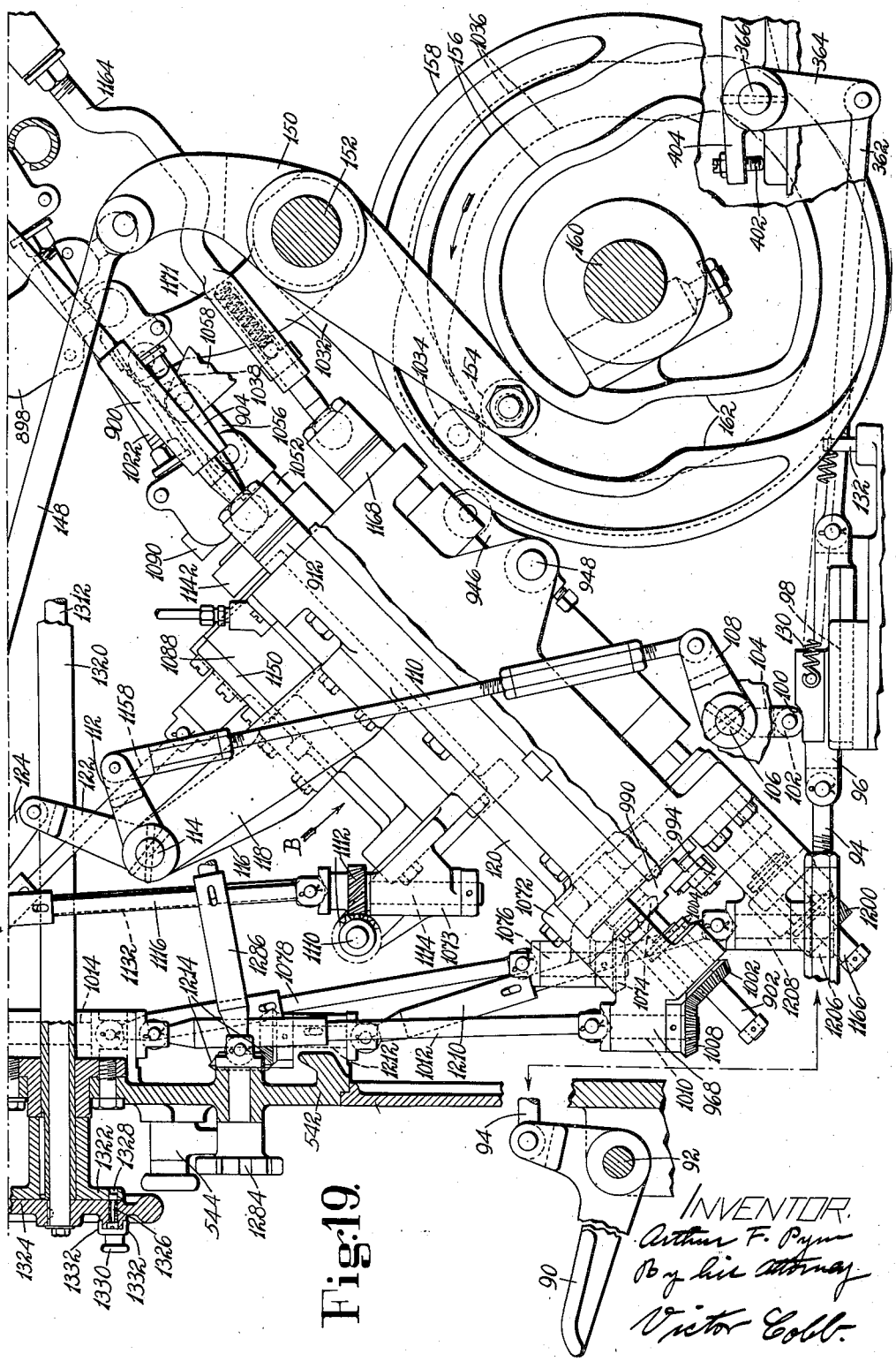
Fig. 19 shows mainly in right-hand side elevation the foredrawing means associated with the grippers.

As hereinbefore described, each rod 902 is threaded in the two sleeves 912 and 916 associated therewith, and accordingly by turning movement of each rod the corresponding gripper may be adjusted in directions lengthwise of the last. For this purpose there is mounted on each rod, as illustrated in Fig. 22, a beveled gear 1002 the hub of which is rotatable in a bearing in the bracket 968 and is confined in the bearing by nuts 1004. A key 1006 connects the gear to the rod while permitting the rod to move lengthwise relatively to the gear. In engagement with each gear 1002 is another beveled gear 1008 fast on a shaft 1010 mounted in a bearing in the bracket 968, and this shaft is connected by a universal joint to an upwardly extending shaft 1012. That shaft 1012 which is associated with the mechanism for operating the right-hand corner toe gripper is shown in Fig. 19, the shaft being a telescopic shaft connected at its upper end by a universal joint to another shaft 1014 mounted in a bearing on the front frame plate 542. The shaft 1014 is connected by beveled gearing 1016 (Fig. 3) to a shaft provided with a hand wheel 1018 (Fig. 1) at the front of the machine, so that adjustment of the right-hand corner toe gripper is effected by turning this hand wheel. By mechanisms of the same character connected to the other shafts 1010 the left-hand corner toe gripper is adjustable lengthwise of the shoe by another hand wheel 1018 at the left-hand side of the front frame plate and the two ball grippers are similarly adjustable each independently of the other by other hand wheels 1020.

Figure 21:
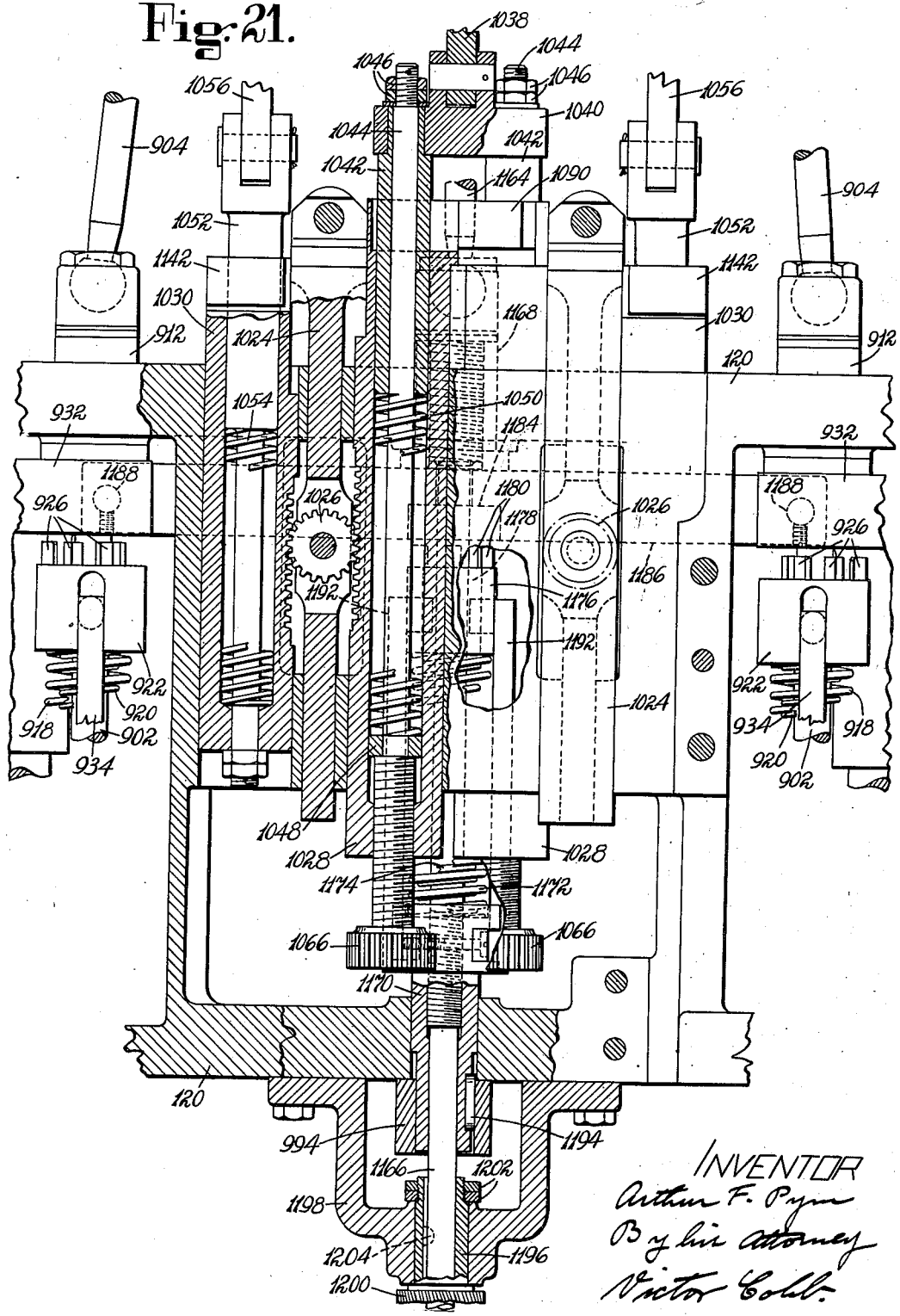
Fig. 21 is a view similar to Fig. 20, on a larger scale, of a portion of the foredrawing means, showing in greater detail parts which lie below some of the structure shown in Fig. 20.

For imparting foredrawing movements to the tip-line grippers 190 the lower ends of the corresponding arms 898 are connected by links 1022 (Fig. 20) to bars 1024 (Figs. 21 and 24) mounted in guideways in the casting 120, and each of these bars carries a pinion 1026 which is in mesh at one side with rack teeth formed on a tubular member 1028 and at the opposite side with rack teeth on a tubular member 1030, these members also being mounted in guideways in the casting. The members 1030 are controlled by mechanisms hereinafter described and are stationary at the time when the foredrawing movements are imparted to the tip-line grippers in company with the other grippers. Such movements are imparted to the tip-line grippers through a bell-crank lever 1032 (Fig. 19) mounted to swing about the shaft 152, one arm of this lever carrying a roll 1034 engaged by a path cam 1036 formed in one side of the previously mentioned cam wheel 158. The other arm of the bell-crank lever is connected by a link 1038 to a crosshead 1040 mounted on the reduced ends of sleeves 1042 which are slidingly movable on rods 1044, the crosshead and the sleeves being confined by nuts 1046 on the rods. Enlarged portions of the rods 1044 at their front ends are threaded in the tubular members 1028, and between the sleeves 1042 and washers 1048 engaging the enlarged portions of the rods are springs 1050. It will thus be seen that when operative movement is imparted by the bell-crank lever 1032 to the crosshead 1040 the sleeves 1042 act through the springs 1050 to impart movements to the rods 1044, and since these rods are threaded in the members 1028, these members are operated by the rods to impart foredrawing movements to the bars 1024 through the pinions 1026, these pinions traveling along the rack teeth on the members 1030.

It is desirable that later in the cycle of operations additional foredrawing movements be imparted to the tip-line grippers to counteract any tendency for the wipers to deflect the margin of the upper in the vicinity of the ends of the tip line in a heelward direction as they wipe it inwardly over the insole. This is accomplished in the machine shown at the time when the wipers are wiping the upper heightwise of the last by movements of the tubular members 1030 while the members 1028 are stationary, as a result of which movements the bars 1024 are operated through the pinions 1026 as the latter travel along the teeth on the members 1028. For thus operating the members 1030 there are provided plungers 1052 slidingly movable in these members and arranged to act thereon through springs 1054 which surround reduced portions of the plungers. The two plungers 1052 are connected by links 1056 to arms 1058 fast on the shaft 152, this shaft having also fast thereon an arm 1060 (Figs. 20 and 22) provided with a roll 1062 engaged by a path cam 1064 formed in one side of the previously mentioned cam wheel 954.

It will be evident that the tip-line grippers may be adjusted preliminarily in directions lengthwise of the shoe by turning the rods 1044, since these rods are threaded in the members 1028, such movements of the rods resulting in movements of the members 1028 along the rods and accordingly in movements of the bars 1024 connected to the grippers. For the purpose of this adjustment there is fast on the front end of each rod 1044 a pinion 1066 (Figs. 20, 21 and 24), and these two pinions are engaged by an elongated pinion 1068 fast on a shaft 1070 supported in a bearing in a bracket 1072 fast on the casting 120 and in another bearing in a bracket 1073 hereinafter referred to. The shaft 1070 is connected by beveled gearing 1074 (Figs. 19 and 20) to a shaft 1076 in the bracket 1072, and this shaft is connected by a telescopic shaft 1078 and beveled gearing 1080, a portion of which is visible in Fig. 3, to a shaft 1082 in the front frame plate 542, this shaft having thereon a hand wheel 1084 (Fig. 1) for turning it. It will thus be seen that by means of this hand wheel the two tip-line grippers may be adjusted simultaneously in the same direction, either forwardly or rearwardly, lengthwise of the shoe to vary their initial positions.

In order to position the ends of the tip line of the upper accurately at definite predetermined distances from the toe-end face of the last by means of the tip-line grippers, the machine is provided with means for limiting positively, though variably, the foredrawing movements imparted to these grippers during the pulling of the upper and also the secondary foredrawing movements which they receive during the operation of the wipers. For the purpose of thus limiting the first or main foredrawing movements of these grippers there are provided two stop rods 1086 (Fig. 20) supported in bearings in a block 1088 (Figs. 24 and 25) fast on the casting 120 and arranged to be engaged at their rear ends respectively by lugs 1090 formed on the tubular members 1028. It will be understood that when either of these lugs engages the end of the corresponding rod 1086, this stops the foredrawing movement of the corresponding gripper while the crosshead 1040 continues its movement far enough to cause more or less compression of the corresponding spring 1050 by movement of the sleeve 1042 along the rod 1044. The two stop rods 1086 are adjustable lengthwise, both simultaneously by a single control and also individually by separate controls, to vary as desired the limits of the foredrawing movements of the tip-line grippers. The rods 1086 are threaded in pinions 1092 (Figs. 20 and 25) which are held against movements in directions lengthwise of the rods by the block 1088 and a plate 1094 fast on the block. These pinions are not in mesh with each other, and are held normally stationary by means hereinafter described. Between their opposite ends the two rods 1086 have other pinions 1096 formed thereon (Figs. 20 and 24) and these pinions are engaged by an elongated pinion 1098 fast on a shaft 1100 which is mounted in bearings in the block 1088 and the previously mentioned bracket 1073 which is fast on this block. At its front end the shaft 1100 is connected by beveled gearing 1102 (Fig. 20), to a shaft 1104 mounted in the bracket 1073, and this shaft is connected by spiral gearing 1106 to a horizontal shaft 1110. The shaft 1110 is connected by a spiral gearing 1112 (Figs. 19 and 20) to a shaft 1114 in the bracket 1073, this shaft being connected by means including a telescopic shaft 1116 to a disk 1118 (Fig. 1) rotatable on the bracket 42 by a handle 1120. Associated with the disk 1118 is a dial plate 1122, this dial plate and the shaft 1116 being rotated by the disk through mechanism not herein shown but of the same construction as that referred to as associated with the shaft 626 (Fig. 13). It will thus be seen that by the turning of the disk 1118 the two stop rods 1086 are turned to adjust them lengthwise simultaneously in one direction or the other by reason of their threaded connections with the pinions 1092 thereon, the pinions 1096 in this adjustment traveling along the pinion 1098. This serves to vary equally the limits of the foredrawing movements of the tip-line grippers.

Adjustments of the rods 1086 separately to vary the limits of the foredrawing movements of the tip-line grippers each independently of the other are effected by turning the pinions 1092 threaded on the rods. For this purpose there is associated with each of the rods 1086 a shaft 1124 having fast thereon a pinion 1126 in mesh with the pinion 1092. Each shaft 1124 is connected by beveled gearing 1128 to a shaft 1130 connected by means including a telescopic shaft 1132 (Fig. 19) to a hand wheel 1134 (Fig. 1). It will be understood that there are two telescopic shafts 1132, one behind the other as the parts are viewed in Fig. 19, the upper ends of the shafts being connected respectively to the two hand wheels 1134. Accordingly, by turning one or the other of these hand wheels, the limit of foredrawing movement of the tip-line gripper associated therewith may be varied without affecting the limit of the corresponding movement of the other gripper. Associated with each hand wheel 1134 is a dial plate 1136 controlled by mechanism of the same character as that which controls the dial plate 632 (Fig. 13).

For variably limiting the secondary foredrawing movement of each of the tip-line grippers, there is associated with each tubular member 1030 (Figs. 20 and 21), through which this movement is imparted to the corresponding gripper, a stop rod 1138 mounted in the block 1088 and prevented from turning by a stud 1140 which is threaded in the block and extends into a slot in the rod, each of these rods being arranged to be engaged by a lug 1142 on the corresponding member 1030. It will be understood that when the member 1030 is thus stopped, the plunger 1052 will continue its movement while compressing the spring 1054, thus insuring that however the rod 1138 may be adjusted the lug 1142 will always engage the rod. Each rod 1138 may be adjusted lengthwise to vary the limit of the secondary foredrawing movement of the corresponding gripper by rotation of a beveled gear 1144 (Figs. 20 and 25) which is threaded thereon and is held against movement in directions lengthwise of the rod by the plate 1094 and by another beveled gear 1146 with which it is in mesh. The gear 1146 is fast on a shaft 1148 rotatable in a bracket 1150 on the block 1088, and integral with this beveled gear is a pinion 1152 in mesh with another pinion 1154 fast on a shaft 1156. Each shaft 1156 is connected by means including a telescopic shaft 1158 (Figs. 19 and 25) to a hand wheel 1160 (Fig. 1) associated with which is a dial plate 1162 controlled in the same manner as the dial plate 632. Accordingly, by turning either of the hand wheels 1160, the limit of the secondary foredrawing movement of the corresponding tip-line gripper may be varied as desired without affecting the limit of the main foredrawing movement of the gripper.

Foredrawing movement is imparted to the toe-end gripper 186 (Fig. 3) by mechanism of substantially the same character as that shown in Figs. 20 and 22 for imparting similar movement to each of the corner toe grippers and ball grippers. The depending arm 898 associated with the toe-end gripper is connected by a link 1164 (Figs. 3 and 19), of essentially the same construction as each of the previously described links 900, to the head of a rod 1166 (Fig. 21) threaded in two sleeves 1168 and 1170 which are slidingly movable with the rod in the casting 120, these sleeves corresponding respectively to the sleeves 912 and 916 shown in Fig. 22. The link 1164 includes a spring 1171 the purpose of which is the same as that of the spring 906 in each link 900. Foredrawing movement is imparted to the rod 1166 through one or the other or both of two springs 1172 and 1174 engaging the sleeve 1170, these springs being operated respectively through rings 1176 and 1178 having thereon fingers 1180 arranged either to aline or not to aline with slots 1182 (Fig. 23) in an operating block 1184. This block is mounted in a recess in a crossbar 1186 the opposite ends of which are connected by pins 1188 to the two cam-operated members 932 by which the foredrawing movements are imparted to the corner toe grippers and ball grippers. Accordingly these members serve also to impart the foredrawing movement to the toe-end gripper. The crossbar 1186 is guided in its movements by plates 1190 fast on the casting 120, one of these plates being shown in Fig. 23. To render one or the other or both of the springs 1172 and 1174 effective selectively, the rings 1176 and 1178 may be turned in the same manner as the corresponding rings 922 and 924 shown in Fig. 22 through bars 1192 fast on the sleeve 1170 and extending into slots in the rings, this sleeve being turned to effect the required adjustment of the rings by the previously mentioned member 994 which is mounted on the sleeve and is turned by the link 992 (Fig. 24) in response to movement of the crank arm 984. By this crank arm, therefore, the spring mechanism associated with the toe-end gripper is adjusted simultaneously with the corresponding mechanisms associated with the corner toe grippers. A key 1194 connects the member 994 to the sleeve 1170 while permitting the sleeve to move lengthwise relatively to the member.

The toe-end gripper is adjustable in directions lengthwise of the last in substantially the same manner as the corner toe grippers and ball grippers by turning the rod 1166 in the sleeves 1168 and 1170 in which it is threaded. For this purpose there is mounted on the rod a sleeve 1196 (Fig. 21) which is rotatable in a bearing in a bracket 1198 fast on the casting 120 and is held against lengthwise movement by a spiral gear 1200 formed thereon at one end and by nuts 1202 threaded thereon at the other end. A key 1204 connects the sleeve 1196 to the rod 1166 to turn therewith but permits lengthwise movement of the rod relatively to the sleeve. The spiral gear 1200 is engaged and operated by another spiral gear 1206 (Figs. 19 and 20) fast on a shaft 1208 which is connected by a telescopic shaft 1210 to a shaft 1212 rotatable in a bearing on the frame plate 542, this shaft being connected by beveled gearing 1214 to a shaft on which is a hand wheel 1216 (Fig. 1). Accordingly, the toe-end gripper may be adjusted lengthwise of the last by turning the hand wheel 1216.

Figure 26:
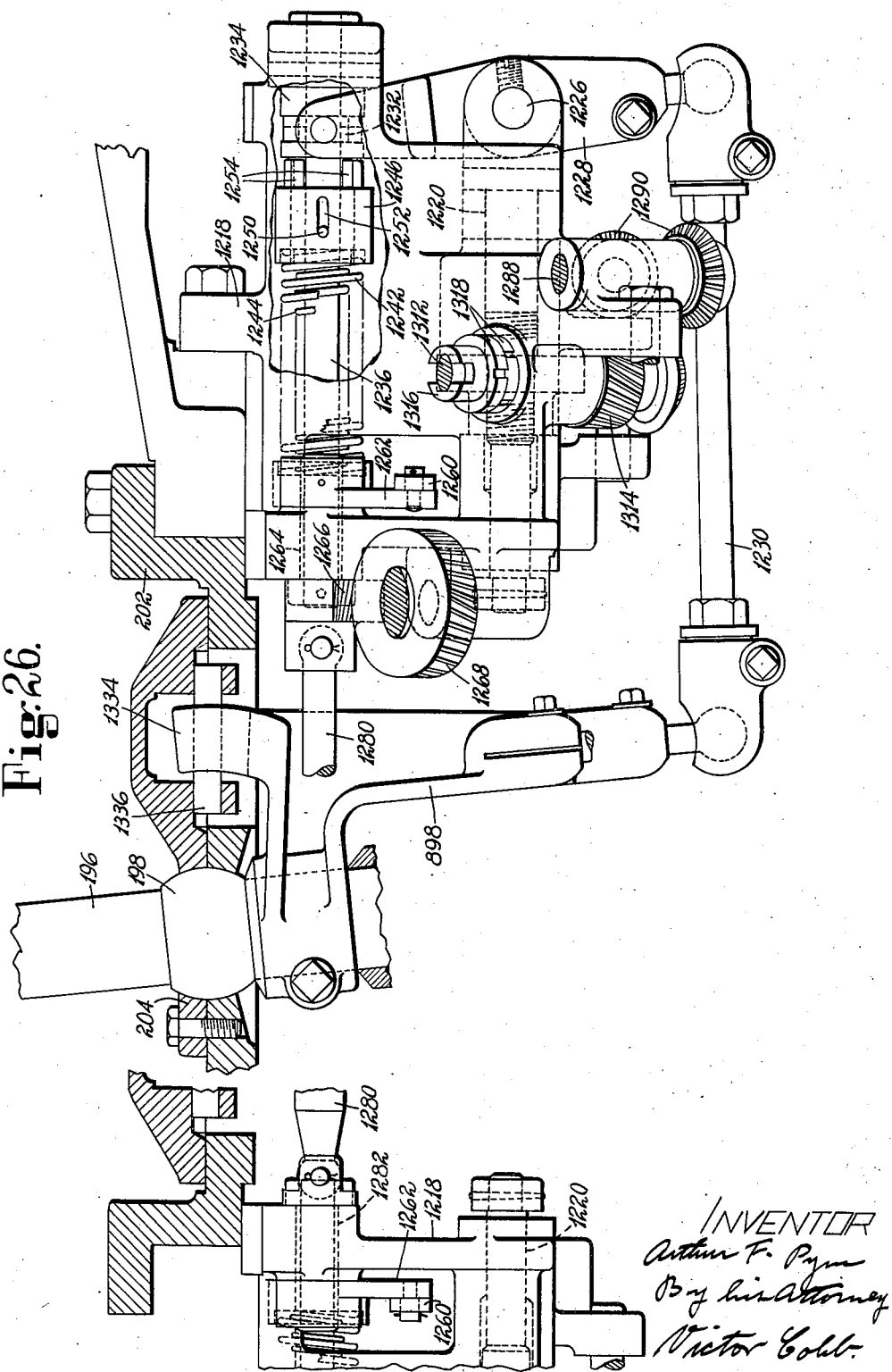
Fig. 26 shows the gripper-spreading mechanism at the right-hand side of the machine and a portion of the corresponding mechanism at the left-hand side, as viewed from the front in an upwardly inclined direction, parts being broken away or sectioned.
Figure 27:
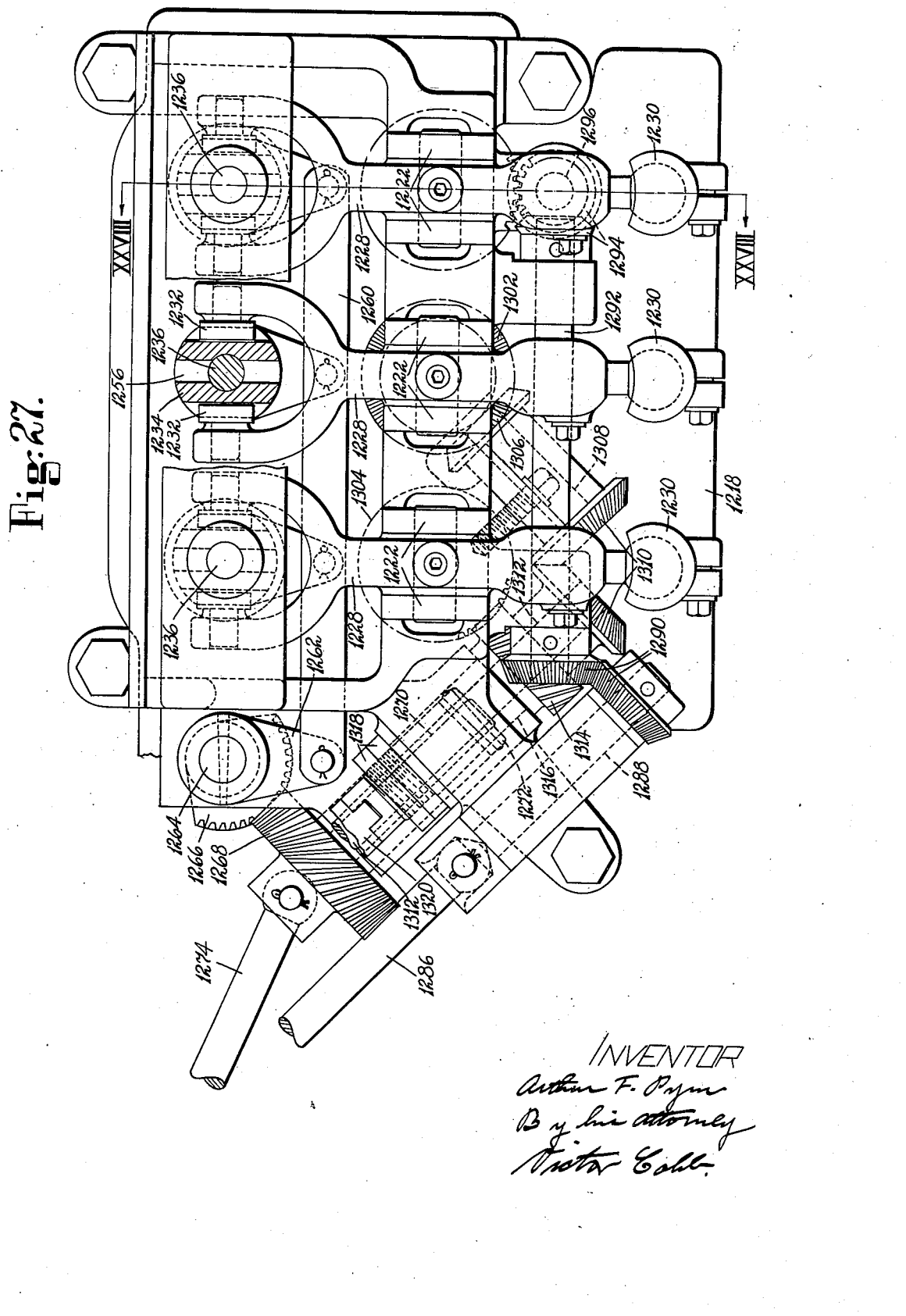
Fig. 27 shows the right-hand gripper-spreading mechanism as viewed from the right of Fig. 26, parts being broken away.
Figure 28:
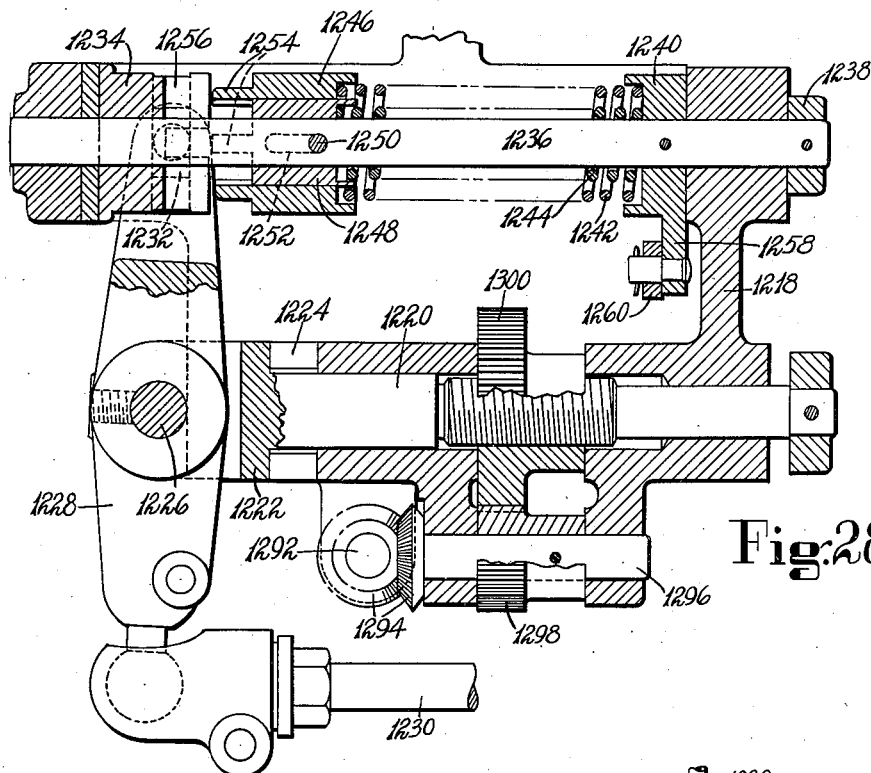
Fig. 28 is a section on the line XXVIII—XXVIII of Fig. 27.

It will be evident that at the end of the upper-pulling operation of the grippers the toe-end gripper, through the action of the foredrawing mechanism connected thereto, holds the upper pulled outwardly away from the edge of the insole, and as the wipers thereafter wipe the upper heightwise of the last this gripper will swing inwardly toward the edge of the insole in response to the pull of the upper thereon against the resistance of one or both of the foredraw springs 1172, 1174. For controlling the corner toe grippers, the tip-line grippers and the ball grippers in such manner as to cause them similarly to pull the upper outwardly from the edge of the insole and to move yieldingly inward as the wipers wipe the upper heightwise of the last, there are provided at the opposite sides of the machine what may be termed gripper-spreading mechanisms. In Figs. 26, 27 and 28 is shown in detail the gripper-spreading mechanism at the right-hand side of the machine, which appears also in Fig. 2, and Fig. 26 shows additionally a portion of the corresponding mechanism at the left-hand side. These mechanisms are substantially identical, except for such changes as are required by the fact that they are located at opposite sides of the machine, and accordingly a description of one will suffice for both. Secured to the frame of the machine is a casting 1218, and mounted in this casting for movements in directions widthwise of the last are three rods 1220 provided at their outer ends with forked heads 1222 having flat side faces engaged by faces 1224 (Fig. 28) on the casting 1218 to prevent the rods from turning. These forked heads of the rods are provided with bearings for pins 1226 fast in levers 1228 having arms extending respectively above and below the pins. The lower arms of the levers 1228 are connected by links 1230 to the previously mentioned arms 898 which are connected respectively to the corresponding corner toe gripper, tip-line gripper and ball gripper, the links being connected to these arms and to the arms of the levers by ball joints so as not to interfere with the swinging of the grippers lengthwise of the last. The upper arms of the levers 1228 are forked and have pivotally mounted thereon blocks 1232 which lie in slots formed in opposite sides of members 1234, these members being movably mounted on rods 1236 supported at their opposite ends in the casting 1218. Each rod 1236 is held against lengthwise movement by a collar 1238 fast on one end thereof and a member 1240 also fast on the rod and engaging the casting 1218 on the opposite side from the collar. The member 1240 is recessed to provide a seat for the inner ends of two springs 1242 and 1244, one of which is stronger than the other, and at their other ends these springs are engaged respectively by rings 1246 and 1248 movable lengthwise of the rod 1236. A pin 1250 fast in the rod extends through slots 1252 in the two rings to prevent turning of the rings relatively to the rod while permitting the rings to move lengthwise of the rod. The rings are each provided with two fingers 1254 extending toward the member 1234, and this member is provided with a slot 1256 with which the two fingers 1254 of either of the rings may aline. If the fingers of the inner ring 1248 are in alinement with the slot, the spring 1242 alone is effective to resist swinging movement of the lever 1228 in a clockwise direction (Fig. 28) by reason of engagement of the member 1234 with the fingers 1254 of the outer ring 1246. If, on the other hand, the fingers of the outer ring 1246 are in alinement with the slot, the spring 1244 alone is effective to resist movement of the lever, and if the fingers of neither ring are in position to aline with the slot both springs are effective. It will be evident that any swinging movement of the lever 1228 in the direction above mentioned results from swinging movement of the corresponding gripper inwardly toward the edge of the insole, and accordingly the springs associated respectively with the different grippers tend to prevent such inward swinging movements of the grippers in the upper-pulling operation and in the wiping operation, but are yieldable to permit such movements.

Adjustments to render either or both of the two springs 1242 and 1244 of each pair effective as above described are made by turning the corresponding rod 1236 in its bearings in the casting 1218, the rings 1246 and 1248 turning with the rod by reason of their relation to the pin 1250. For turning the several rods the members 1240 have depending arms 1258, and pivotally connected to these arms is a link 1260 connected also at one end to an arm 1262, this arm of the mechanism at the right-hand side of the machine being fast on a shaft 1264 mounted in a bearing in the casting 1218. Formed on this shaft is a spiral gear sector 1266 engaged by a spiral gear 1268 formed on a shaft 1270 which is mounted in a bearing in the casting 1218, this shaft being held against lengthwise movement by the gear and by a collar 1272 fast thereon. Connected at one end by a universal joint to this gear 1268 and its shaft is a shaft 1274 the other end of which is similarly connected to a shaft 1276 (Fig. 1) mounted in the front frame plate 542 and having a crank arm 1278 fast thereon. As is evident from Fig. 1, this crank arm may be moved to any one of three positions corresponding respectively to the three different adjustments of the spring mechanisms which it controls. By this crank arm not only the three spring mechanisms associated with the grippers at the right-hand side of the machine, but also the corresponding spring mechanisms associated with the grippers at the opposite side are simultaneously adjustable. For this purpose a shaft 1280 (Fig. 26) connects the shaft 1264 on which the gear sector 1266 is formed to a corresponding shaft 1282, without any gear sector thereon, at the opposite side of the machine, this shaft carrying the arm 1262 for operating the link 1260 at that side.

The above-described gripper-spreading mechanisms serve additionally as means for adjusting widthwise of the last the grippers which they control. The two corner toe grippers are thus adjustable respectively by hand wheels 1284 (Fig. 1). The hand wheel 1284 which controls the corner toe gripper at the right-hand side of the machine is connected by a telescopic shaft 1286 (Figs. 19 and 27) to a shaft 1288 rotatable in the right-hand casting 1218, this shaft being connected by beveled gearing 1290 to another shaft 1292 connected by beveled gearing 1294 (Fig. 28) to a shaft 1296. Fast on this shaft between lugs on the casting 1218 is a pinion 1298 in mesh with a pinion 1300 threaded on that rod 1220 which supports the lever 1228 connected to the right-hand corner toe gripper. The pinion 1300 is confined between portions of the casting 1218, and accordingly when it is turned by the hand wheel 1284 it serves to adjust the rod 1220 lengthwise and thus to move the fulcrum of the lever 1228 to swing the corresponding gripper inwardly or outwardly through the connections between the lower end of the lever and the gripper. Mechanism of the same character serves to connect the left-hand hand wheel 1284 to the corresponding pinion 1300 threaded on the rod which controls the left-hand corner toe gripper. Accordingly, either of the corner toe grippers may be adjusted widthwise of the last independently of the other.

For adjusting the right-hand line gripper and the right-hand ball gripper widthwise of the last there are threaded respectively on the rods 1220 which control these grippers a beveled gear 1302 and a spiral gear 1304 (Fig. 27), these gears corresponding in function to the above-mentiond pinion 1300. The beveled gear 1302 is engaged by another beveled gear 1306 fast on a shaft 1308 mounted in a bracket on the casting 1218, and this shaft is connected by beveled gearing 1310 to a shaft 1312. The spiral gear 1304 is engaged by another spiral gear 1314 formed on a sleeve 1316 which is rotatable in a bearing in the casting 1218 and provides a bearing within it for the shaft 1312. Threaded on the sleeve 1316 are nuts 1318 which hold the sleeve against lengthwise movement in one direction, movement of the sleeve in the other direction being prevented by engagement of the gear 1314 with the casting 1218. Interlocking with the front end of the sleeve 1316 is another sleeve 1320 (Figs. 19 and 27) which extends forwardly through a bearing in the front frame plate 542 and has keyed on its front end the hub of a disk 1322. The shaft 1312 extends forwardly through this sleeve and has secured on its front end a hand wheel 1324. Mounted in this hand wheel is a spring-pressed pin 1326 arranged to enter any one of a series of holes 1328 formed in the disk 1322 and extending all around the axis of the disk. The pin 1326 is provided with a knob 1330 by which it may be pulled out of any hole 1328, and fingers 1332 formed on this knob are arranged to engage a portion of the hand wheel 1324 to hold the pin in retracted position upon partial rotation of the knob after the retractive movement of the pin. It will be evident that when the hand wheel 1324 and the disk 1322 are connected together by the pin, rotation of the hand wheel serves to rotate both the shaft 1312 and the sleeve 1320 and accordingly to adjust both the tip-line gripper and the ball gripper simultaneously, the construction being such that both grippers move in the same direction as they are thus adjusted. On the other hand, if the hand wheel 1324 is disconnected from the disk 1322 the hand wheel serves only to rotate the shaft 1312 and accordingly to adjust the tip-line gripper alone. Accordingly, if only the tip-line gripper needs to be adjusted, the operator disconnects the hand wheel from the disk and turns only the shaft 1312. If the ball gripper needs to be adjusted, the operator connects the hand wheel to the disk and turns both these parts simultaneously, thereafter disconnecting them and turning only the hand wheel if it is then necessary to adjust the tip-line gripper relatively to the ball gripper. It will be observed that there is a similar hand wheel 1324 at the left-hand side of the machine (Fig. 1), and it will be understood that through mechanism of the same construction as above described this hand wheel serves to adjust the left-hand tip-line gripper and ball gripper, or the left-hand tip-line gripper alone.

In order to guide the arms 898 properly in their swinging movements effected by the links 1230 and to prevent them from turning with the sleeves 196 about the axes of the sleeves, each arm is provided with an upwardly extending forked portion 1334 (Fig. 26) between the forks of which is located a pin 1336 mounted in lugs formed on the cap 204 associated with the sleeve 196. This pin is in line with the center of the spherical boss 198 on the sleeve, so as not to interfere with the swinging movements of the sleeve and the gripper lengthwise of the last.

For maintaining the toe-end gripper 186 normally in a centralized position laterally of the machine, there are formed on opposite sides of the hub of the arm 898 associated with this gripper lugs 1338 one of which is shown in dotted lines in Fig. 3, and mounted in a recess in each of these lugs is a spring 1340 which bears against the lower face of the bracket 202. These springs accordingly tend to centralize the gripper at all times during the operation of the machine while permitting the swinging of the gripper lengthwise of the shoe in the manner hereinbefore described.

For wiping the toe end of the upper heightwise of the last and for wiping its marginal portion inwardly over the insole there are provided toe-embracing wipers 1342 (Fig. 29) shaped to conform substantially to the contour of the edge of the insole and detachably secured to wiper holders 1344 by pins 1346 in substantially the same manner as disclosed in Letters Patent No. 2,039,448. The wiper holders 1344 are supported on a wiper carrier 1348 and are guided thereon for swinging movements to close the wipers laterally of the shoe about an axis located substantially at the point where the edges of the wipers meet at the end of the toe. The wiper holders are thus guided, in part, by a curved rib 1350 (Figs. 34 and 36) formed on the carrier and extending into grooves in the holders, plates 1352 being secured to the holders in engagement with the upper face of this rib. Additional guides for the holders near their front ends are provided by plates 1354, these plates being fastened to the lower face of the wiper carrier 1348 and having flanges 1356 which extend into grooves in the holders. Pins 1358 (Fig. 29) which lie partly in corresponding recesses in the wiper holders and partly in elongated slots 1360 in the wiper carrier 1348 under the plates 1352 assist in maintaining the wiper holders in assembled relation to the carrier if the holders are disconnected from their operating mechanisms hereinafter described.

The wiper carrier 1348 is guided at its opposite sides by vertical faces 1362, one of which is shown in Fig. 1, on the frame of the machine, and fast on the opposite sides of the carrier are plates 1364, one of which is shown in Figs. 29 and 33. These plates are pivotally connected to the upper ends of links 1366 the lower ends of which are pivotally connected to a lever 1368 mounted for swinging movements about a rod 1370 supported at its opposite ends on the frame of the machine, this lever being controlled as hereinafter described. At its rear end the wiper carrier 1348 is pivotally mounted on a pin 1372 carried by the forked upper end of a lever 1374 (Figs. 33 and 35) which is supported between its opposite ends on a rod 1376 mounted in bearings in the frame, the lever being fulcrumed, for a purpose hereinafter described, on an eccentric 1378 (Fig. 35) fast on the rod. The lower or rear end of the lever 1374 is pivotally connected to the upper end of a rod 1380 which extends downwardly through a pin 1382 (Fig. 39) swiveled in a forked end of a rearwardly extending arm 1384 of a bell-crank lever mounted to swing about the rod 1370, this bell-crank lever having an upwardly extending arm 1388 (Figs. 35 and 39) which carries a roll 1389 engaged by a path cam 1390 formed in one side of a cam wheel 1392 fast on the previously mentioned cam shaft 650. Surrounding the rod 1380 is a spring 1394 which bears at its lower end against a thimble 1396 (Fig. 39) in engagement with the pin 1382 and at its upper end against a thimble 1398 engaged by a nut 1400 on the rod. At its lower end the rod 1380 has a head 1402 which limits upward movement of the rod relatively to the pin 1382. It will thus be seen that by swinging movement in an upward direction the arm 1384 acts through the spring 1394 on the lever 1374 to move the wiper carrier 1348 forwardly toward the shoe, the links 1366 swinging forwardly about their connections with the lever 1368 while maintaining a substantially parallel relation to the carrier-supporting arm of the lever 1374.

For swinging the wiper holders 1344 to close the wipers laterally of the shoe, each wiper holder is connected by a link 1404 (Fig. 29) to the outer end of a lever 1406 arranged to extend widthwise of the last, the inner end of this lever being pivotally fulcrumed on a block 1408 supported as hereinafter described on the wiper carrier 1348. Each lever 1406 comprises two parts spaced from each other and held together by bolts 1410, the fulcrum block 1408 and the rear end of the link 1404 being positioned between these parts. Also positioned between the two parts of the lever midway between its opposite ends is a trunnion block 1412 pivotally connected to the lever and also pivotally connected to the forked front end of a link 1414 the rear end of which is connected to one arm of a lever 1416 mounted to swing about the rod 1376. The connections between the link 1414 and the lever 1416 comprise a block 1418 (Fig. 33) having a forked portion pivotally connected to the link and a depending stem swiveled in the lever 1416 to permit such lateral swinging movement of the link as results from the swinging of the lever 1406. The rear end of each lever 1416 is connected through a rod 1420 and a spring 1422 to a rearwardly extending arm 1424 of a three-armed lever 1426 (Fig. 33) mounted to swing about the rod 1370, the connections between the lever 1416 and the arm 1424 being substantially the same as those above described between the lever 1374 and the arm 1384. Another arm 1428 of the lever 1426 carries a roll 1430 engaged by a peripheral cam 1432 on the cam shaft 650, and a third arm 1434 of the lever carries a roll 1436 engaged by a peripheral cam 1438 on this cam shaft. It will be understood that there are two pairs of cams 1432, 1438 (Fig. 39) for operating respectively the three-armed levers 1426 associated with the two wiper-closing levers 1416. The closing of the wipers results from the action of the cams 1432 on the lever arms 1428, the arms 1424 acting through the springs 1422 on the levers 1416, and the opening of the wipers results from the action of the cams 1438 on the arms 1434.

Each of the levers 1416 is fulcrumed on an eccentric 1440 secured to the rod 1376 similarly to the eccentric 1378 on which the lever 1374 for operating the wiper carrier 1348 is fulcrumed. The purpose of the eccentric 1378 is to determine variably by its adjustment the initial position of the wipers lengthwise of the shoe and accordingly the distance between their edges and the end face of the last after they have been advanced by the movement of the wiper carrier 1348 preparatory to the wiping of the upper heightwise of the toe, and the eccentrics 1440 are provided simply to effect compensating adjustments of the wiper-closing mechanisms whenever the eccentric 1378 is adjusted, so that the relation of the wipers to each other will not be affected by the adjustment of the wiper carrier. Simultaneous adjustment of the three eccentrics is effected by turning the rod 1376 in its bearings in the frame. For this purpose there is fast on the rod a lever arm 1442 (Fig. 2) connected by a link 1444 to a block 1446 threaded on a rod 1448 mounted to turn in bearings on the frame. This rod is connected by beveled gearing 1450 to a shaft 1452 rotatable in the frame and having a hand wheel 1454 (Fig. 1) thereon for turning it. Through gearing not shown but of the same general character as that previously described as associated with the disk 630 a dial plate 1456 under the hand wheel is rotatable by the hand wheel at reduced speed, the dial plate cooperating with a mark on the frame to afford an indication of the adjusted position of the eccentrics. Lengthwise movement of the rod 1448 is prevented by collars fast thereon at the opposite sides of one of its bearings 1457 as the shaft is turned to effect the adjustment.

The positions of the wipers laterally of the shoe in the wiping of the upper heightwise of the last are determined variably by adjustment of the wiper-closing mechanisms to vary the initial positions of the wipers. For this purpose each fulcrum block 1408 (Fig. 29) is threaded on a rod 1458 which is mounted to turn in bearings in a bracket 1460 secured to the wiper carrier 1348 and is held against lengthwise movement by a nut 1462 on one end thereof and a beveled gear 1464 on its other end. In engagement with this beveled gear is another gear 1466 operated by a shaft 1468 which is supported, as hereinafter described, partly by the bracket 1460 and is rotatable at one end in a bearing in a block 1470 (Fig. 30) secured to a bracket 1472 mounted in an opening in the wiper carrier 1348. The shaft 1468 is connected by beveled gearing 1474 to a shaft 1476 which is mounted to turn in the bracket 1472 and in a plate 1478 fast on the wiper carrier, this shaft having fast on its upper end a hand wheel 1480 which serves by engagement with the plate 1478 to support the bracket 1472 through one of the gears 1474. It will thus be seen that by rotation of either of the two hand wheels 1480 the fulcrum of the corresponding lever 1406 may be shifted to swing the lever about its connection with the link 1414 and thereby to swing the corresponding wiper carrier 1344 inwardly or outwardly. By thus adjusting the wipers independently of each other they may be so positioned that their edges will be in proper relation to the sides of the shoe to act effectively in wiping the upper heightwise of the last, the proper relation of the edges of the wipers to the upper at the end of the toe being determined as hereinabove described by adjustment of the eccentric 1378.

The machine is further provided with means for variably limiting in a positive manner the movements of the wipers lengthwise and laterally of the shoe to wipe the marginal portion of the upper inwardly against the lip of the insole, so that the wipers will act uniformly on all shoes of the same style and size to apply the required amount of inward pressure to the upstanding margin of the upper materials. For thus limiting the movement of the wipers lengthwise of the shoe there is provided a link 1482 (Figs. 29 and 35) arranged to act as a stop on the previously mentioned pin 1372 which connects the wiper carrier 1348 to the lever 1374. This pin extends through a slot 1484 in the link, and the link is pivotally connected at its rear end to an arm 1486 fast on a shaft 1488 which is mounted to turn in bearings in the frame. Keyed to this shaft is another arm 1490 having a pin 1492 mounted to turn therein, the pin being threaded on a rod 1494 which is mounted near its front end (Fig. 34) in a bearing member 1496 on the frame. The rod is connected at its front end by beveled gears 1498 to a shaft 1500 mounted in the frame, this shaft having thereon a hand wheel 1502 (Fig. 1) for turning it. A dial plate 1504 is turned by the hand wheel at slower speed through gearing, not shown, but of the same general character as that hereinbefore described as associated with the disk 630. The rod 1494 is held against lengthwise movement by collars fast thereon at the opposite sides of its bearing member 1496, so that as the shaft is turned by the hand wheel the link 1482 is adjusted to determine variably the limit of movement of the wiper carrier 1348. It will be understood that the movement of the carrier is stopped by engagement of the link with the pin 1372 at the front end of the slot 1484 in the link, and that any further movement of the arm 1384 which operates the lever 1374 results in compression of the spring 1394.

The means for variably limiting in a positive manner the movements of the wipers laterally of the shoe to wipe the upper against the lip of the insole comprise rods 1506 (Figs. 29 and 33) arranged to act as stops on lugs 1508 extending downwardly from the links 1404. Each rod 1506 is mounted for lengthwise movement in bearings 1510 and 1511 formed on a bracket 1512 which is fastened to the wiper carrier 1348 and is braced by screws 1514 threaded in the bracket and bearing against the carrier. The rod 1506 is prevented from turning in the bearing 1510 by a key extending into a slot 1516 in the rod. Threaded on the rod is a beveled gear 1518 which abuts at one end against the bracket 1512 and at the other end against a spacing collar 1520 between it and the bearing 1510. The gear 1518 is engaged by another beveled gear 1522 supported on the bracket 1512 and arranged to be operated by a beveled gear 1524 through flexible shafting 1526. The gear 1524 is supported on the previously mentioned bracket 1460 and is engaged by a beveled gear 1528 fast on the shaft 1468. It will thus be seen that when either shaft 1468 is turned by the hand wheel 1480 associated therewith it serves to adjust the stop rod 1506 to vary the limit of the overwiping movement of the corresponding wiper as well as to adjust the fulcrum block 1408 to vary the limit of the closing movement of the wiper prior to the wiping of the upper heightwise of the last. It will be understood that when the closing movements of the wipers are thus stopped the springs 1422 are compressed by further movements of the arms 1424 of the three-armed levers 1426.

It may be desirable under some conditions to vary the limits of the overwiping movements of the wipers laterally of the shoe without varying the limits of their closing movements which occur before wiping the upper heightwise of the last, and to permit this to be done with respect to either wiper the construction is such that the shaft 1468 may be disconnected at will from the threaded rod 1458 by movement of the gear 1466 out of engagement with the gear 1464. The gear 1466 (Fig. 30) is mounted on a reduced tubular end portion of a short shaft 1529 formed integral with the gear 1528 in alinement with the shaft 1468 and rotatable in a bearing in the bracket 1460. The gear 1466 is connected to the shaft 1529 by a key 1530 which extends through the tubular portion of this shaft and is held in place by the elongated head 1532 of the screw which is threaded in the shaft. The hub of the gear 1466 is provided with a peripheral groove 1534 (Fig. 31) into which extend two shoes 1536 carried by a yoke member 1538 pivotally mounted on the bracket 1460. A spring 1540 bearing against the hub of the gear 1466 and against a shoulder on the shaft 1529 serves when permitted to move the gear along the shaft into engagement with the gear 1464. To disconnect these gears the gear 1466 is moved along the shaft 1529 against the resistance of the spring 1540 through a link 1542 connected at one end to a sleeve 1544 mounted on a pin 1546 carried by the yoke member 1538 and at the other end (Fig. 32) to a crank arm 1548 formed on a shaft 1550 which is rotatable in the wiper carrier 1348 and is provided with a handle 1552 for turning it. In disconnecting the gear 1466 from the gear 1464 the crank arm 1548 is moved to a dead center position determined by engagement of the handle 1552 with a pin 1554 (Fig. 29) on the wiper carrier 1348. A stud 1556 (Fig. 30) threaded in the bracket 1460 and extending into a groove in the short shaft 1529 assists in maintaining the parts in proper assembled relation.

For moving the wipers downwardly to wipe the upper heightwise of the last before they wipe it inwardly against the lip of the insole, and for also forcing them reversely upward to press the upper firmly upon the feather of the insole, the wiper carrier 1348 is swung in directions heightwise of the last about the pin 1372 through movements of the lever 1368 (Fig. 33) previously referred to as connected to the wiper carrier by the links 1366. The lever 1368 includes a web 1558 (Fig. 39) extending laterally of the machine between arms of the lever to which the links 1366 are connected, and the lever further includes at the opposite sides of the machine rearwardly extending arms 1560 pivotally suspended on which is a crossbar 1562. Mounted on the rod 1376 is a three-armed lever 1564 (Fig. 33) having an arm 1566 which carries a roll 1568 engaged by a cam 1570 fast on the cam shaft 650, and having also an arm 1572 provided with a roll 1574 engaged by a cam 1576 (Fig. 39) on the cam shaft. The third arm 1578 of the lever has a pin 1580 swiveled therein, and fastened to this pin is the upper end of a rod 1582 which extends downwardly through the crossbar 1562 and has on its lower end (Fig. 40) a nut 1584 and a washer 1585 overlapping the crossbar, the rod being slidably mounted in the crossbar but held from turning by a key 1586. It will thus be seen that when the three-armed lever 1564 is swung in a counterclockwise direction (Fig. 33) by the action of the cam 1576 on its arms 1572, upward movement is imparted to the rod 1582 to swing the lever 1368 in the same direction and thereby to swing the wiper carrier 1348 downwardly to cause the wipers to wipe the upper heightwise of the last, the wipers being thus operated in a positive manner.

Upward swinging movement is imparted to the wiper carrier 1348 to cause the wipers to press the upper more firmly against the feather of the insole, after they have substantially completed their movements to wipe the upper inwardly over the insole, by the action of the cam 1570 on the arm 1566 of the three-armed lever 1564, and in order to cause the wipers thus to act yieldingly on the upper there is provided spring mechanism through which the lever 1368 is operated at this time by downward movement of the arm 1578 of the three-armed lever. This spring mechanism (Figs. 39 and 40) comprises a pair of springs 1588 and 1590, one stronger than the other, abutting at their upper ends against a member 1592 engaged by a nut 1594 on the rod 1582 and abutting at their lower ends respectively against rings 1596 and 1598. The ring 1596 rests at its lower end normally on a shoulder 1600 provided by an enlarged portion of the rod 1582, and it is provided with a plurality of pins 1602, one of which is visible in Fig. 40, extending downwardly through holes in the ring 1598. Mounted in this ring is a pin 1604 extending through a slot 1606 in the rod 1582 and normally resting against the rod at the lower end of the slot. Below the lower ends of the pins 1602 is a plate 1608 supported on a flange 1610 formed on the upper end of a sleeve 1612 which is mounted on the rod 1582 and rests at its lower end on the washer 1585. An annular plate 1614 is fastened to the plate 1608 and overlaps the lower face of the flange 1610. The plate 1608 may be turned about the rod 1582 relatively to the flange 1610 by means hereinafter described, and it carries a plurality of pins 1616, one of which is visible in Fig. 40, extending upwardly therefrom toward the ring 1598. The plate 1608 is provided with a plurality of holes 1618 arranged to aline with the pins 1602 when the plate is in one position, and the ring 1598 is provided with a plurality of holes 1620 with which the pins 1616 on the plate are arranged to aline when the plate is in another position. It will be evident that when the holes 1618 are in alinement with the pins 1602 the spring 1588 remains idle as the rod 1582 is moved downwardly, and force is applied through the spring 1590 and the ring 1598 to the pins 1616 on the plate 1608. This force is transmitted through the sleeve 1612 to the crossbar 1562 and to the wipers to cause the wipers to press the upper up against the feather of the insole, a shoulder 1622 on the sleeve 1612 engaging at this time a washer 1624 on the crossbar. If, on the other hand, the plate 1608 is so adjusted that the holes 1618 are out of alinement with the pins 1602 and the pins 1616 are in alinement with the holes 1620, the spring 1590 remains idle and the force is applied to the wipers through the spring 1588. By means hereinafter described the plate 1608 may be further so adjusted that neither set of pins and the corresponding holes are in alinement with each other, in which case force is transmitted through both the springs 1588 and 1590. Downward movement of the rod 1582 relatively to the ring 1598 is permitted by the slot 1606 in the rod, and the sleeve 1612 is prevented from turning about the rod by the key 1586 which extends through a slot in the sleeve into a slot in the rod.

It is desirable that as the wipers wipe the upper inwardly over the feather of the insole, before the comparatively heavy pressure is applied to the upper through one or both of the springs 1588, 1590, provision be afforded for yielding movement of the wipers heightwise of the shoe, in response to pressure of the upper materials upon them, to permit them to accommodate themselves to upper materials of different thicknesses. For this purpose there is provided a comparatively light spring 1626 between the washer 1624 on the crossbar 1562 and a ring 1628 which rests against the lower face of the flange 1610. It will be understood that this spring will be compressed more or less by such upward movement of the crossbar 1562 as may result from downward movement of the wipers as they wipe the upper inwardly over the feather of the insole, provision being afforded for such movement of the crossbar by the space between the shoulder 1622 on the sleeve 1612 and the washer 1624. This space is, of course, taken up, so that the shoulder rests on the washer, when the wipers are forced upward with increased pressure substantially at the end of their inward wiping movement in the manner above explained.

The ring 1628 is provided with pins 1630 which extend through slots 1632 in the sleeve 1612 and are connected to a bushing 1634 which surrounds the rod 1582 and bears at its upper end against the lower face of the ring 1598. This prevents any tendency for the spring 1626 to lift the plate 1608. It will be understood that downward movement of the bushing 1634 by the ring 1598 when the spring 1590 is idle is permitted by the slots 1632 and by an annular slot 1634 in the sleeve 1612 into which the bushing extends.

For adjusting the plate 1608 to different positions to render one or the other or both of the springs 1588, 1590 effective as above described, there is provided a horizontal bar 1636 (Fig. 39) suspended at one end on a link 1638 pivoted on the frame and at its other end on one arm 1640 of a bell-crank lever 1642 also mounted on the frame, the arm being parallel to the link. The bar 1636 is provided with a rectangular vertical slot 1644 extending into it from its front face, in which lies a vertical rectangular bar 1646 having a stem 1648 (Fig. 40) mounted to turn in an arm on the plate 1608. It will thus be seen that the plate is turned to adjust it to the different required positions by lengthwise movement of the bar 1636, and such movement of the bar is effected by swinging the bell-crank lever 1642. For this purpose an arm 1650 of the lever is connected by a link 1652 to a crank pin 1654 carried by a head 1656 fast on the rear end of a rod 1658. This rod is supported in bearings on the frame and extends to the front of the machine where it is provided with a hand wheel 1660 (Fig. 1) for turning it, a dial plate 1661 being associated with the hand wheel.

Figure 34:
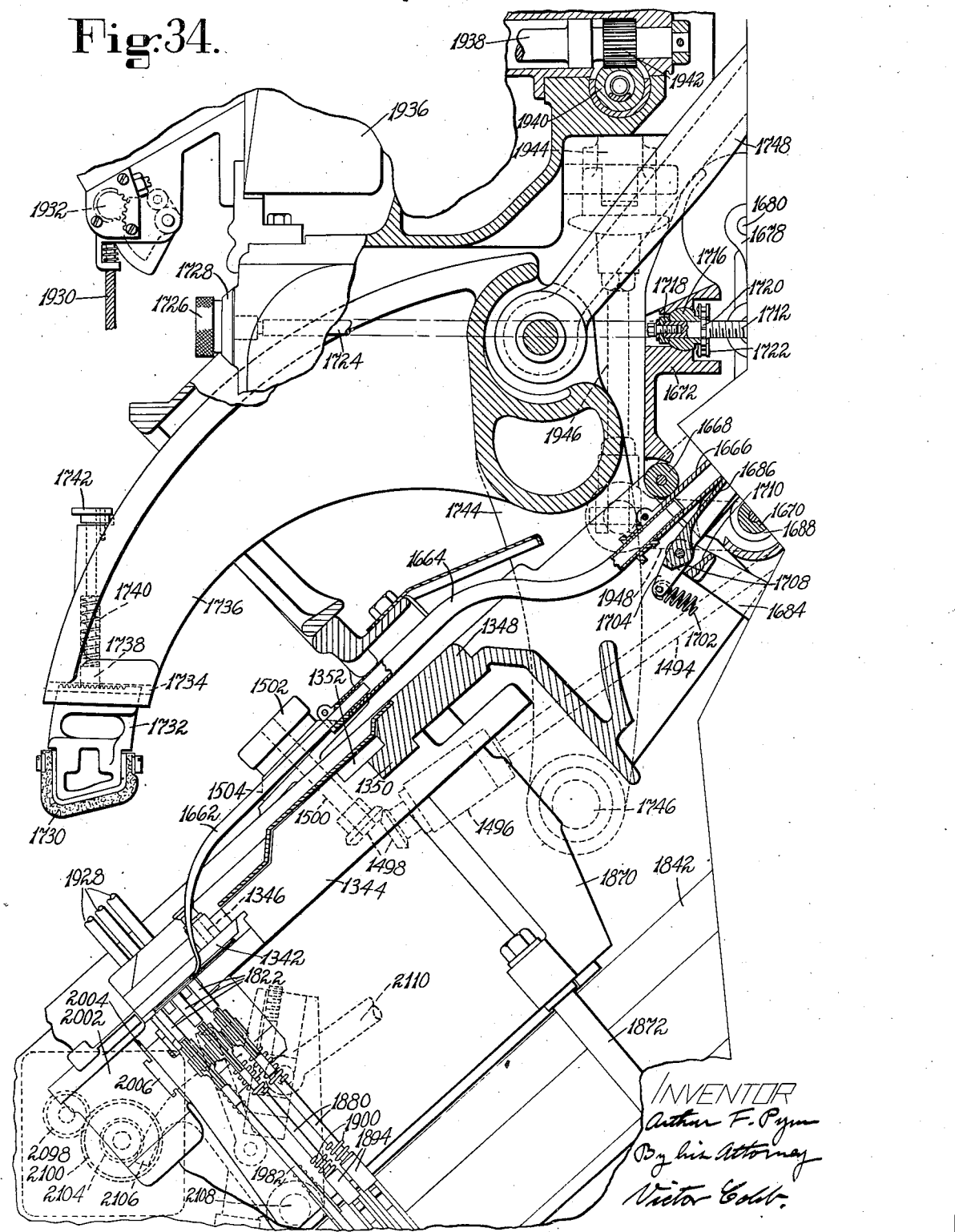
Fig. 34 is a view partly in right-hand side elevation and partly in section of portions of the structure shown in Fig. 33 and of other parts located thereabove.

To indicate whether the tip line of the upper is in proper relation to the last while the upper is held under tension by the grippers prior to the action of the wipers thereon, there is provided a tip gage comprising a bar 1662 curved as shown in Fig. 34 to extend from over the wipers downwardly toward the shoe and having a substantially flat front end provided with a straight edge arranged to extend laterally of the shoe. The tip gage is maintained initially in an upraised and rearwardly retracted position, and as the upper is pulled by the grippers it is moved forwardly and downwardly to a predetermined position in engagement with the top of the toe end of the upper. The rear end of the bar 1662 is clamped in the front end of a tubular member 1664 the rear end of which is clamped in a holder 1666 (Figs. 34 and 35) mounted between two guide rolls 1668 and 1670 supported by a bracket 1672 on the frame. Fastened to the rear end of the holder 1666 is a tubular member 1674 slidingly mounted in a trunnion block 1676 which is pivotally supported on an arm 1678 mounted to swing on a pin 1680 on the bracket 1672. At its rear end the tubular member 1674 has a head 1682 arranged to engage the trunnion block 1676 to limit forward movement of the tip gage. For imparting such forward movement to the tip gage there is provided a lever 1684 mounted on the bracket 1672 and connected by a link 1686 to the holder 1666, the link being mounted in a bifurcated portion of the holder. An annular groove 1688 in the roll 1670 provides clearance for the link. For operating the lever 1684 there is provided an arm 1690 mounted to swing about the rod 1370 and provided with a roll 1692 engaged by a path cam 1694 formed in one side of the previously mentioned cam wheel 1392. A rod 1696 pivotally connected to the arm 1690 telescopes with a tubular member 1698 pivotally connected to the lever 1684, and through this rod and member the lever 1684 is swung positively by the arm 1690 in the direction to retract the tip gage from over the shoe. For swinging the lever in the direction to move the tip gage to its operative position there is provided a spring 1700 through which the arm 1690 operates the lever, this spring being yieldable when the movement of the tip gage is stopped by engagement of the trunnion block 1676 with the head 1682.

In order to prevent the tip gage from rubbing on the upper, it is prevented from engaging the shoe until it has arrived substantially at the limit of its forward movement. For this purpose a spring 1702 (Fig. 34) is connected to the lever 1684 and to a forwardly extending arm 1704 of the link 1686. By its tendency to swing the link the spring presses the holder 1666 up against the roll 1668 as the holder is moved forwardly. Before the forward movement of the holder is stopped by the trunnion block 1676, a recess 1706 in the holder arrives in a position over the lower roll 1670 to permit the downward swinging movement of the holder required to bring the tip gage into contact with the shoe. Shortly thereafter a shoulder 1708 on the link is engaged by a shoulder 1710 on the lever, thus preventing further relative movement of the link and the lever, whereupon the lever and the link act as a unit to swing the tip gage downwardly, the lever at that time, of course, occupying a position in which it extends more nearly lengthwise of the shoe than illustrated in Fig. 34. It will be understood that by reverse movement of the parts the tip gage is first lifted from the shoe and is then retracted lengthwise of the shoe.

Adjustment of the limit of forward movement of the tip gage for tips of different lengths is effected by swinging the arm 1678. For this purpose a rod 1712 is threaded at its rear end in a pin 1714 which is mounted to turn in the arm 1678, the front end of the rod being mounted in a bearing in a pin 1716 (Fig. 34) which can turn in the bracket 1672. The rod 1712 is held against lengthwise movement by a washer 1718 confined on one end thereof and engaging the pin 1716, and by a sprocket wheel 1720 fast on the rod at the other side of the pin, this sprocket wheel being connected by a chain 1722 to another sprocket wheel (not shown) mounted on a rod 1724 which is rotatably mounted in the frame and is provided at its front end with a hand wheel 1726 for turning it, the hand wheel having associated therewith a dial plate 1728 for indicating the adjusted relation of the parts.

For supporting the shoe against the upward pressure of the wipers, there is provided a holder 1730 (Fig. 34) arranged to engage the top of the forepart of the shoe and comprising a pad mounted on a block 1732 which is adjustable lengthwise of the shoe along a guideway 1734 in an arm 1736 and is held in adjusted position by a member 1738 engaging teeth on the block, this member being movable upwardly against the resistance of a spring 1740 to release the block by means of a knob 1742 fast on a stem extending upwardly therefrom. The arm 1736 is curved upwardly and rearwardly and is connected by webs to a pair of downwardly extending arms 1744, one only of which is shown in Fig. 34, these arms being pivotally mounted at their lower ends on pins 1746 on the frame. The arm 1736 is connected by a link 1748 (Figs. 34 and 35) to one arm of a lever 1750 mounted to swing about the shaft 1498, this lever having a rearwardly extending arm 1752 connected by a link 1754 to a lever 1756 mounted to swing about the rod 1376. The lever 1756 has a pin 1758 mounted to turn therein, and threaded in this pin is the upper end of a rod 1760 which extends downwardly through a pin 1762 (Fig. 39) mounted to turn in the forked end of a rearwardly extending arm 1764 of a three-armed lever 1766 (see also Fig. 33) mounted on the rod 1370. Below the pin 1762 the rod 1760 is provided with a head 1768 engaged by the pin to retract the holder 1730 from the shoe in response to movement of the three-armed lever 1766 in the direction to lower its arm 1764. Such movement is imparted to the lever by a cam 1770 mounted on the shaft 650 and engaging a roll 1772 on an arm 1774 of the lever, this arm being connected to the arm 1764 of the lever by a web 1776. Movement of the holder 1730 into engagement with the shoe is effected by another cam 1778 (Figs. 35 and 39) on the shaft 650 in engagement with a roll 1780 carried by an arm 1782 of the three-armed lever 1766, this cam acting to lift the arm 1764 of the lever. In order to press the holder yieldingly on the shoe, the arm 1764 in its upward movement acts on the rod 1760 through spring mechanism which is in most respects similar to that shown in Fig. 40 for pressing the wipers upwardly against the shoe. This mechanism comprises two springs 1784 and 1786 (Fig. 35), one stronger than the other, which abut at their upper ends against a member 1788 engaged by a nut 1790 on the rod 1760. At their lower ends these springs are controlled by mechanism, substantially like that shown in Fig. 40, for rendering one or the other or both of the springs selectively effective to force the holder against the shoe, as determined by adjustment of a plate 1792 (Fig. 39) corresponding in function to the plate 1608 of Fig. 40, this plate being supported on the pin 1762 of the arm 1764 through a sleeve member 1794 resting on the pin. The sleeve member has a flange 1795 at its upper end connected to the plate 1792 in the same manner that the flange 1610 of Fig. 40 is connected to the plate 1608. To hold the plate 1792 properly spaced initially from a ring 1796 above it, which corresponds in function to the ring 1598 of Fig. 40, there is provided below this ring a light spring 1798 which rests on the flange 1795 of the sleeve member 1794. It will be understood that the arm 1764 in its upward movement acts on the holder 1730 through one or the other or both of the springs 1784, 1786, depending upon the adjustment of the plate 1792. Adjustment of this plate to its different positions is effected by the same means whereby the plate 1608 (Fig. 40) is adjusted as hereinbefore described, so that whenever the spring mechanism through which the wipers are forced upwardly is adjusted to increase or lessen the pressure applied by the wipers to the shoe, the spring mechanism associated with the shoe holder is simultaneously adjusted to increase or lessen correspondingly the amount of pressure applied by the holder to the shoe. For this purpose there is mounted to turn in an arm of the plate 1792 an upwardly extending rectangular bar 1800 corresponding to the bar 1646 of Fig. 40 and lying in a slot in the horizontal adjusting bar 1636.

As the wipers are advanced and closed to wipe the marginal portion of the upper inwardly against the lip of the insole in the manner hereinbefore described, a binder wire is fed along a groove 1802 (Fig. 36) in the edges of the wipers from the front end of the left-hand wiper to the front end of the right-hand wiper to be applied to the shoe by the wipers to hold the upper around the toe in lasted position. The mechanism for thus feeding the wire will be hereinafter described. To fasten the binder wire to the shoe, and also to fasten the upper at the sides of the forepart, the machine is provided with means for driving three tacks at each side of the forepart through notches 1804 (Figs. 29 and 36) in the edges of the wipers. The tacks are so guided that their shanks engage the outer side of the binder wire, and they are deflected inwardly by inclined faces on the wipers in the notches 1804 in such manner that they crowd the wire inwardly toward the lip of the insole, substantially in the same manner as disclosed in Letters Patent No. 2,039,448, the machine herein shown being so constructed as to drive all three tacks far enough into the shoe for their heads to clamp the wire against the upper. For the purpose in view each wiper holder 1344 has mounted thereon, so as to partake of the movements of the wiper, three tack-inserting devices comprising slides 1806 (Figs. 36 and 37) movable along guideways 1808 extending in directions substantially radial to the edges of the wipers, in alinement with which guideways are guideways 1810 formed in the lower faces of the wipers. Pivoted at 1812 on each slide 1806 is a driver-operating lever 1814 having a socket in which is mounted the ball-shaped lower end of a driver 1816 held in the socket by a spring 1818 on the lever. This driver extends upwardly into a driver passage in the slide in position to drive a tack upwardly from a tack pocket 1820 formed in the slide and closed at one side by a pivoted tack-guiding finger 1822. A spring 1824 controlling this finger holds it in position properly to guide the tack, the finger being yieldingly movable to permit the passage of the tack and the driver. Each slide 1806 is movable from a retracted tack-receiving position, in which the tack pocket 1820 is in alinement with a hole 1826 in the wiper holder 1344 through which a tack is delivered, to a position in which the tack pocket is in alinement with the corresponding notch 1804 in the wiper. To determine the proper positions of the slide and to control the tack finger 1822, there is mounted in a guideway in the slide a bar 1828 having a T-shaped outer end 1830 lying in a lateral slot in the slide 1806. As the parts are positioned in Fig. 36 a shoulder 1832 formed on an upward extension of the bar 1828 is in engagement with a shoulder on the wiper holder 1344 to limit outward movement of the bar, and the T-shaped end 1830 of the bar is in engagement with a shoulder 1834 on the slide 1806 to limit outward movement of the slide. When the parts are in these positions a hole 1836 in the bar 1828 is in alinement with the hole 1826 in the wiper holder and with the tack pocket 1820 to permit passage of a tack into the pocket, and the tack finger 1822 is retracted against the resistance of the spring 1824 by engagement of the end of the bar with the finger, so as to permit a tack to enter the tack pocket 1820. When the slide 1806 is moved inwardly, the movement of the bar 1828 is limited by its engagement with a shoulder 1838 on the wiper and the movement of the slide is limited, to cause the tack pocket to aline with the notch 1804 in the wiper, by engagement of a shoulder 1840 on the slide with the T-shaped end 1830 of the bar.

Figure 36:
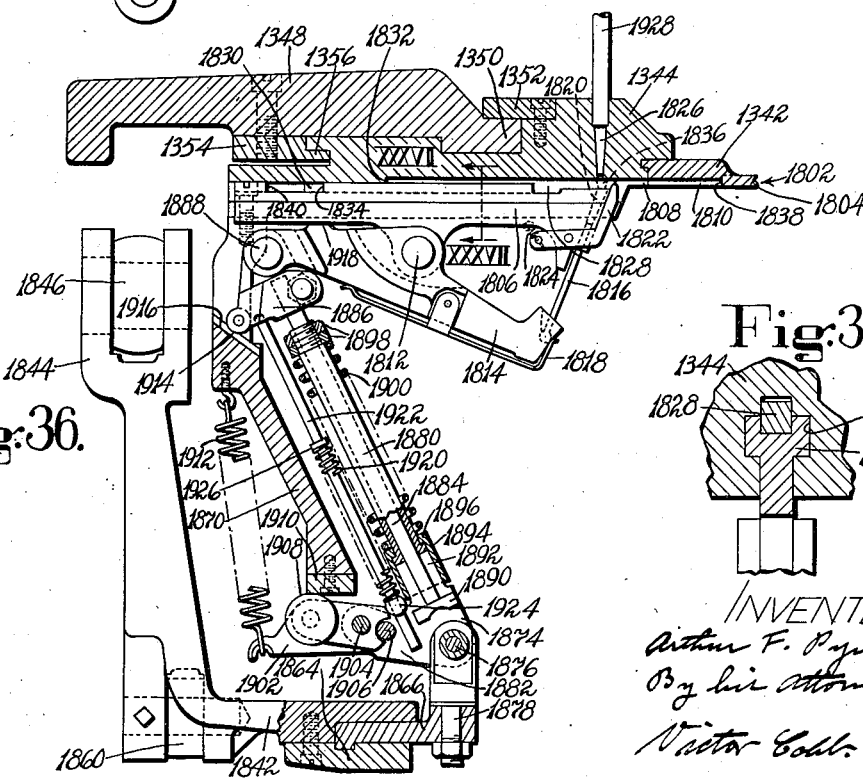
Fig. 36 is a section on the line XXXVI—XXXVI of Fig. 29, showing a portion of the fastening-inserting means associated with the left-hand wiper.
Figure 37:
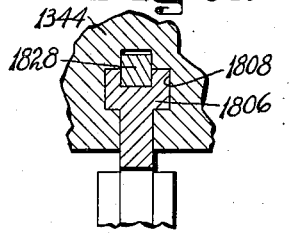
Fig. 37 is a section on an enlarged scale on the line XXXVII—XXXVII of Fig. 36.

Movements of the tack-inserting devices from their tack-receiving positions into positions to drive the tacks, and also the swinging movements of the levers 1814 to operate the drivers, are effected by downward movement of a substantially U-shaped operating member 1842 (Figs. 3, 33 and 36). Upwardly extending arms 1844 integral with this member at the opposite sides thereof are pivotally supported on forwardly extending arms of levers 1846 pivotally mounted between their opposite ends on studs 1848 supported on the plates 1364 which are fastened to the wiper carrier 1348. Rearwardly extending arms of the levers 1846 are connected by links 1850 to arms 1852 which are mounted to swing about the shaft 1376, these arms being provided with rolls 1854 engaged by path cams 1856 (Fig. 33) formed in cam wheels 1858 (Fig. 39) on the cam shaft 650. Links 1860 which are substantially parallel to the forwardly extending arms of the levers 1846 connect the member 1842 to downwardly extending arms 1862 which are integral with the wiper carrier 1348. It will thus be seen that upward and downward movements relatively to the wiper carrier are imparted to the member 1842 by swinging movements of the levers 1846, and that by reason of the links 1860 the member 1842 is so controlled as to prevent any tipping thereof relatively to the wiper carrier as the member is moved upwardly or downwardly. The member 1842, moreover, partakes of the wiper-operating movements of the wiper carrier without materially altering its relation to the carrier.

Mounted for sliding movements in guideways formed partly in the member 1842 and partly in plates 1864 (Figs. 33 and 36) secured to this member are plates 1866 which are thus guided to move in paths curved similarly to the paths of movement of the wiper holders 1344 and the wipers. Fastened to each wiper holder by a plurality of screws 1868 (Fig. 29) are downwardly extending castings 1870 (Figs. 3 and 36) and each of these castings carries a downwardly extending rod 1872 which extends through a hole in the corresponding plate 1866. Through these rods, therefore, the plates 1866 are moved along their guideways by the wiper holders 1344 as these holders are operated to close the wipers laterally of the shoe or to open the wipers.

The plates 1866 carry mechanisms associated respectively with the different tack-inserting devices for imparting to these devices their positioning movements and for operating the drivers to drive the tacks. Each of these mechanisms comprises what is, in effect, a bell-crank lever 1874 (Fig. 36) pivotally mounted at 1876 on the head of a stud 1878 fastened to the plate 1866, the bell-crank lever having an upwardly extending tubular arm 1880 and an outwardly extending arm 1882. Slidingly mounted in the tubular arm 1880 is a rod 1884 fast on the upper end of which is a member 1886 pivotally connected by a stud 1888 to the outer end of the driver-operating lever 1814. At its lower end the rod 1884 is provided with a crossbar 1890 which may enter a transverse slot 1892 provided in the lower portion of the tubular arm 1880 and is in position to be engaged by the lower end of a sleeve 1894 which surrounds the slotted portion of the arm and has a flange 1896 resting normally on a shoulder on the arm. Between this flange and nuts 1898 threaded on the upper end of the tubular arm 1880 is a spring 1900. The outwardly extending arm 1882 of the bell-crank lever 1874 has an extension 1902 pivoted at 1904 on the main portion of the arm and provided with a forked end controlled by a pin 1906 fast in that portion of the arm, the diameter of the pin being slightly less than the distance between the forks. A limited relative movement of the two portions of the arm is thus permitted as a measure of safety against danger of breakage of parts. Mounted on opposite sides of the extension 1902 are rolls 1908 arranged to engage a plate 1910 fast on the casting 1870, and connecting the extension to this casting is a spring 1912. When the parts are in their initial positions, as illustrated in Fig. 36, the slide 1806 is maintained at the limit of its outward movement through the bell-crank lever 1874 by reason of the engagement of the plate 1910 with the rolls 1908 on the outwardly extending arm 1882 of the lever. When the operating member 1842 is moved downwardly in a direction away from the last it carries the bell-crank lever with it, thus permitting the spring 1912 to swing the lever in the direction to move the slide 1806 inwardly toward the edges of the wipers, such movement being imparted to the slide by the bell-crank lever through the connection between the rod 1884 and the driver-operating lever 1814. After the slide 1806 has arrived at the limit of its inward movement, the bell-crank lever 1874 is carried farther downward bodily by continued downward movement of the member 1842, the tubular arm 1880 of the lever acting on the crossbar 1890 of the rod 1884 through the spring 1900 and the sleeve 1894 to move the rod downwardly and thereby to impart driver-operating movement to the lever 1814. By reason of compression of the spring 1900 at the end of the tack-driving operation the crossbar will enter the slot 1892 in the tubular arm 1880. In case the slide 1806 should, by reason of friction, fail to start to move inwardly as soon as permitted by the downward movement of the member 1842, a roll 1914 on the member 1886 is arranged to be engaged by an inclined face 1916 formed in an opening in the casting 1870 to start the inward movement of the slide.

It will be understood that in response to upward movement of the operating member 1842 each driver-operating lever 1814 is first returned to its initial position relatively to the slide 1806, determined by engagement of a boss 1918 on the lever with the lower face of the slide, and that in response to further upward movement of the operating member the slide is returned to its initial tack-receiving position by swinging movement of the bell-crank lever 1874 resulting from the engagement of the plate 1910 with the rolls 1908. Insurance that the driver-operating lever 1814 will be maintained initially in its proper position is afforded by a spring 1920 mounted on a rod 1922 which is seated at its upper end in a socket in the member 1886 and is slidingly mounted near its lower end in an opening provided in a bar 1924 resting on the arm 1882 of the bell-crank lever 1874, the spring being located between this bar and a collar 1926 fast on the rod. It will thus be seen that the spring 1920 when under compression tends to move the rod 1884 upward relatively to the tubular arm 1880. Near the end of the upward movement of the member 1842 the spring is compressed by the upward movement of the bell-crank lever 1874, the tubular arm 1880 sliding upward along the rod 1884, so that the crossbar 1890 of the rod assumes a position somewhat below the lower end of the sleeve 1894, as illustrated in Fig. 36. This insures that the lever 1814 will be so positioned that the driver 1816 is fully retracted.

The tacks are delivered at the proper time through the holes 1826 in the wiper holders and into the tack pockets 1820 from tubes 1928 carried by the wiper holders and communicating with flexible tubes 1930 (Figs. 1, 2 and 34) leading from the tack-supplying mechanism. This tack-supplying mechanism is of substantially the same construction as disclosed in Letters Patent No. 2,039,448 and is therefore not shown in detail. Briefly, it comprises a tack inverter 1932 (Fig. 34) which receives the tacks from tack-separating mechanism 1934 (Fig. 2) and delivers them head downward into the tubes 1930, and an oscillatory tack hopper 1936 by which the separating mechanism is operated. The tack hopper is operated through a rock shaft 1938 (Fig. 34) on which it is mounted, corresponding to the rock shaft 1273 of the above-mentioned Letters Patent. The means for operating this rock shaft, in the construction herein shown, comprises, briefly, a reciprocatory horizontal rack bar 1940 engaging a pinion 1942 on the shaft, a bell-crank lever 1944 for operating the rack bar, and a link 1946 connecting the bell-crank lever 1944 to a bell-crank lever 1948 (Fig. 39) provided with a roll 1950 engaged by a path cam formed in one side of a cam wheel 1952 on the cam shaft 650.

The binder wire fed into the groove 1802 in the wipers is severed from the remainder of the wire by mechanism associated with the foremost of the three left-hand fastening-inserting devices and shown in Fig. 38. The wire is fed through a small block 1954 fastened to the left-hand wiper 1342 in a slot formed in the wiper, this block being provided with a hole 1956 in alinement with the groove in the wiper and with a slot 1958 (Fig. 43) through which the wire is fed. Mounted in a guideway in the slide 1806 of the foremost fastening-inserting device and confined in the guideway by a plate 1960 fast on the slide is a knife 1962 movable upwardly into the slot 1958 to cut the wire. This knife has a curved lower end swiveled in a recess formed in a plate 1964 which is part of a lever 1966 pivotally mounted between its ends on a stud 1968 on the slide 1806. The plate 1964 is adjustable relatively to the main portion of the lever about the stud 1968 by means of a screw 1970 threaded in a lug on that portion of the lever and engaging a lug 1972 on the plate, so as to vary the position of the knife 1962, and the plate is secured in adjusted position by a bolt 1974 extending through the plate and through a slot 1976 in the main portion of the lever and by a nut 1978 on the bolt. When the parts are in their initial positions the knife 1962 is retracted by engagement of the previously mentioned stud 1888, which connects the member 1886 to the driver-operating lever 1814, with the outer end of the lever 1966 in a recess formed in the lever. The lever is operated to move the knife upwardly to cut the wire by that portion of the downward movement of the operating member 1842 (Fig. 36) which occurs after the fastening-inserting devices have been moved inwardly to their operating positions in response to the earlier portion of the movement of this member, the knife 1962 having been moved into alinement with the slot 1958 in the block 1954 by the inward movement of the slide 1806 which carries it. For thus operating the lever 1966 there is pivotally connected to a lug 1980 formed on the head of the stud 1878 which supports the corresponding bell-crank lever 1874, a bar 1982 having a tubular portion in which is mounted a spring 1984, and extending through this spring is a rod 1986 which is threaded at its upper end in a member 1988 pivotally connected to the lever 1966 and is provided at its lower end with a head 1990 arranged to engage a washer 1992 against which the lower end of the spring 1984 bears, this washer resting initially on a shoulder on the bar 1982. The upper end of the spring is engaged by a nipple 1994 threaded in the upper end of the tubular portion of the bar. It will thus be seen that during the latter portion of the downward movement of the operating member 1842, as the stud 1888 is moved downwardly to operate the lever 1814, the lever 1966 is swung to operate the knife 1962 through the connections between the lever and the lug 1980. The upward movement of the knife is limited by engagement of a shoulder 1996 thereon with the block 1954, and after the knife has thus been brought to a stop the spring 1984 is compressed during the further downward movement of the operating member 1842.

The mechanism for feeding the binder wire, shown in Figs. 43 and 44, comprises two feed wheels 1998 and 2000 supported by a casting 2002 which is mounted on a plate 2004 (Figs. 34 and 44) fast on the front face of the left-hand wiper holder 1344, this plate having a T-shaped horizontal rib 2006 which lies in a corresponding groove in the casting and serves as a guide along which the casting may be moved toward the left from its operative position when it is desired to remove the wipers 1342 and to substitute differently shaped wipers. Fast on the top of the casting 2002 is a plate 2008, and fast on this plate is a smaller plate 2010 in which is mounted a slide 2012 provided with a pin 2014 arranged to enter a hole in the left-hand wiper to determine the position of the casting 2002 relatively to the wiper. To withdraw the pin 2014 from the hole in the wiper when it is desired to slide the casting toward the left, there is pivotally mounted on the plate 2008 in a recess in the plate 2010 a bell-crank lever 2016 one arm of which has a projection 2018 extending into a recess in the slide 2012 and the other arm of which extends outwardly beyond the plate 2010 into position for use by the operator to retract the slide 2012. A spring 2020 acts on the bell-crank lever to maintain the pin 2014 normally in the hole in the wiper.

Fastened in a slot in the plate 2008 is a bar 2022 having an upwardly extending portion bored to provide a guideway for the binder wire $w$ conducted from a reel 2024 (Fig. 1), the bar having another portion at right angles to its upwardly extending portion provided with a bore 2026 (Fig. 43) along which the wire is led to the feed wheels. The two feed wheels, which are coaxial, are arranged to grip the wire between opposed faces thereof adjacent to their peripheries, and the wheels are positioned within a recess in the plate 2008 of substantially the same diameter as the wheels, so that the plate confines the wire between the opposed faces of the wheels, the construction shown being such that the wire is engaged by the wheels somewhat more than half way around their common axis. A thin plate 2028 has an annular portion located between the feed wheels and another portion extending outwardly from between them, as shown in Fig. 43, and fastened to the plate 2008 to serve as a stripper to deflect the wire away from the wheels, the wire moving along a guideway 2030 between the edge of the stripper and the plate. This guideway is continued in a curve along the plate 2008 to a point where it alines with the hole 1956 in the block 1954, a thin curved plate 2032 being fastened in a similarly curved slot in the plate 2008 to serve as one wall of the guideway. In order to avoid excessive wear on the stripper plate 2028 by reason of engagement of the wire therewith, the two feed wheels are so formed as to facilitate deflection of the wire from between them. For this purpose their wire-gripping faces diverge from each other toward the peripheries of the wheels, as illustrated particularly in Fig. 45. In the construction shown the wire-gripping face of the upper wheel 1998 is continuous about the axis of the wheel, while the gripping face of the lower wheel 2000 is provided by a series of teeth 2034 for still better insurance that the wheels will not slip on the wire.

The upper feed wheel 1998 has a sleeve 2036 mounted on a stud 2038 provided with an enlarged head 2040 seated in an opening in the plate 2008, and the lower feed wheel 2000 has a sleeve 2042 extending around the sleeve 2036. The lower end portions of these sleeves are provided at opposite sides of the stud 2038 with slots 2044 into which extend tongues 2046 formed on a member 2048 which is clamped against a shoulder on the stud 2038 by a nut 2050. A spring 2052 bears at its lower end against the member 2048 and at its upper end against a collar 2054 in engagement with the lower face of the feed wheel 2000.

It will thus be seen that the spring 2052 tends to force the lower feed wheel upwardly toward the other feed wheel, so that the wire is yieldingly gripped between the wheels, the stripper plate 2028 being sufficiently thin to permit the wire-gripping faces of the wheels to be located near enough to each other to grip the upper effectively and to prevent pressure of the wheels on the plate. The upper feed wheel bears against a shoulder 2056 on the head 2040 of the stud 2038, so that by the action of the spring 2052 the upper feed wheel and the head of the stud are clamped against each other. The feed wheels are rotated by turning movement of the member 2048, by reason of the tongue-and-slot connection between this member and the sleeves on the wheels, and the stud 2038 turns with the wheels. The member 2048 is turned by a rotatable member 2058 mounted in a bearing in the casting 2002, this member having a beveled gear 2060 secured on its lower end and in engagement with another beveled gear 2062 which is keyed to a shaft 2064 mounted in a bearing in the casting 2002. The member 2058 is held against movement lengthwise of its axis by its engagement with a shoulder 2066 on the casting 2002 and by further engagement of a washer 2068 with the casting, this washer being confined by the gear 2060. The two members 2048 and 2058 interlock with each other in such manner as to permit the member 2058 to move relatively to the other member in the event of any obstruction to the feeding of the wire. For this purpose there are formed on the opposed faces of the two members radially extending teeth 2070 having their side faces beveled for engagement with one another, so that the teeth of the lower member may slip past the teeth of the upper member 2048, forcing the latter and the stud 2038 upwardly against resistance of the spring 2052 in the event of any obstruction to the feeding of the wire.

The shaft 2064 is connected by a universal joint 2072 to a telescopic shaft 2074 (see also Fig. 1), and this shaft is connected by a universal joint 2076 to a shaft 2078 supported by a bracket 2080 fast on the outside of the frame of the machine. It will be understood that the telescopic shaft 2074 permits the movements of the casting 2002 toward the left and the right for the purpose hereinbefore described, and also the movements of the wipers. Keyed on the outer end of the shaft 2078 is a block 2082 to which is fastened one end of a torsion spring 2084, the other end of this spring being fastened to another block 2086 loosely mounted on the shaft. This block is provided with a series of teeth 2088 arranged to interlock with similar teeth 2090 formed on a member 2092 which is threaded on a sleeve 2094 surrounding the shaft 2078 and rotatable within a bushing 2096 in the bracket 2080. Keyed to the sleeve 2094 is a pinion 2098 engaged by another pinion 2100 fast on a shaft 2102 rotatable in the bracket 2080 and operated as hereinafter described. The thread on the sleeve 2094 has a comparatively steep pitch, and the member 2092 is so loosely mounted thereon that as the sleeve starts to rotate in the direction to feed the wire the member 2092, by reason of its inertia, is immediately advanced into position for its teeth to interlock with the teeth on the block 2086, so that through this block, the torsion spring 2084 and the block 2082 the shaft 2078 is rotated to operate the feed wheels. The spring 2084 may yield somewhat to guard against too rapid starting movement of the feed wheels, thus affording still further insurance that the wheels will not slip on the wire. As hereinafter described, the sleeve 2094, after having been rotated to feed the wire the proper distance, is reversely rotated, and as it starts its reverse rotation the thread thereon retracts the member 2092 from engagement with the block 2086. To guard against any reverse movement of the wire, the teeth on the member and block are so formed that any reverse turning movement of the member 2092 with the sleeve will cause the teeth on this member to slip over the teeth on the block 2086, forcing the block along the shaft 2078 against the resistance of the spring 2084.

Fast on the shaft 2102 is a pinion 2104 in engagement with which is a gear sector 2106 mounted to swing about a rod 2108 on the frame. This gear sector is connected by a link 2110 (Figs. 34 and 44) to a lever 2112 (Fig. 39) pivotally mounted on the frame and provided with a roll 2114 engaged by a path cam formed in one side of the previously mentioned cam wheel 1952. It will be understood that by the action of this cam the lever 2112 is swung in one direction to feed the wire at the proper time in the cycle of the machine and thereafter in the opposite direction to its starting position. To vary the amount of movement of the feed wheels, the end of the link 2110 which is connected to the gear sector 2106 is adjustable toward or from the rod 2108, so as to vary the amount of movement imparted to the gear sector. For this purpose the link is pivotally connected to a block 2116 which is adjustable along a guideway in the gear sector and is in threaded engagement with a rod 2118 rotatable in the gear sector and provided at its lower end with a pinion 2120 fast thereon. This pinion is connected through an idle pinion 2122 to a pinion 2124 fast on a shaft 2126 also mounted in the gear sector, this shaft being connected by a universal joint to a telescopic shaft 2128 which extends upwardly and is connected at its upper end by another universal joint (not shown) to a shaft 2130 (Fig. 1) mounted in the frame of the machine and on which is a hand wheel 2132. It will be evident that by turning this hand wheel the block 2116 may be adjusted to vary its distance from the axis of the gear sector and thus to vary the amount of wire-feeding movement imparted to the feed wheels.

In order to insure that the end of the binder wire, after it passes along an abruptly curved portion of the edges of the wipers at a corner of the toe or, when the toe is comparatively pointed, at the end of the toe, will not curl inwardly in such manner as to catch in the upper and thereby interfere with further feeding of the wire, the machine is provided with mechanism mounted on the right-hand wiper holder 1344 for feeding along the groove in the wipers in the opposite direction from the binder wire a guide wire 2134 (Fig. 46). As illustrated, this guide wire is fed slightly more than half way along the groove in the wipers, beyond the meeting point of the edges of the wipers, so that the end portion of the guide wire, which also tends to curl inwardly as it passes along an abruptly curved portion of the edges of the wipers, will act as a shield for the end of the binder wire to prevent the latter from catching in the upper. That is, the guide wire is fed to such a position that by the time the end of the binder wire starts to curl inwardly the end of the guide wire will lie between it and the upper, so that the binder wire cannot catch in the upper, and as the binder wire is further fed along the edges of the wipers, the guide wire is retracted, acting as a shield for the end of the binder wire until the feeding of the binder wire is completed. By reference to Fig. 33 it will be seen that there is secured to the front end of the right-hand wiper holder a plate 2136 similar to the plate 2004 (Fig. 34) secured to the left-hand wiper holder, this plate acting as a guide for a casting 2138 (Figs. 41 and 42) to permit the casting to be moved toward the right from its normal position when it is desired to remove the wipers. The casting is held in its normal position by a slide 2140, like the slide 2012 of Fig. 43, provided with a pin 2142 which enters a hole in the right-hand wiper, the slide being movable to withdraw the pin from the hole by means of a bell-crank lever 2144 coresponding to the lever 2016 shown in Fig. 43. Secured to the top of the casting 2138 is a plate 2146, and on this plate is secured a cover plate 2148 which is omitted from Fig. 41. The plate 2146 closely embraces a feed wheel 2150 throughout the greater portion of the periphery of the wheel, and substantially fitting the remainder of the periphery of the wheel is a small plate 2152 secured to the plate 2146 under the cover plate 2148. The feed wheel 2150 is provided on its periphery with a helical groove 2154 to receive the guide wire 2134, the end of the wire being anchored to a small block 2156 (Fig. 41) inserted in the top of the wheel. The plate 2152 is formed to provide a guideway 2158 for the guide wire between it and the plate 2146, and this guideway continues along another plate 2160 inserted in an opening in the plate 2146, the end of the guideway being in alinement with the groove 1802 in the right-hand wiper. It will be understood that initially the guide wire is wound on the wheel 2150 in the helical groove in the wheel with its end somewhat retracted from the end of the wiper, and that the wheel is rotated first in one direction to advance the wire the proper distance along the groove in the wipers and thereafter in the opposite direction to withdraw the wire from the groove. The guide wire is thus withdrawn at the same speed that the binder wire is advanced along the groove in the wipers, so as to remain in control of the end of the binder wire. The feed wheel 2150 is secured by a screw 2162 and dowel pins 2164 to a rotatable member 2166 which is threaded in a ring 2168 fastened to the casting 2138, so that as the feed wheel is rotated it is also moved axially to maintain the portion of its helical groove 2154 where the guide wire leaves the wheel at the same height as the end of the wire-guiding groove 2158 in the plate 2152. The member 2166 is provided at opposite sides with lugs 2170 extending into slots 2172 formed in a tubular member 2174 the lower end of which is rotatably mounted in a bearing in the casting 2138. A portion of this member rests on a shoulder 2176 on the casting, and secured to its lower end is a beveled gear 2178 which confines a washer 2180 overlapping another shoulder 2182 on the casting. It will thus be seen that the member 2174 is held against upward or downward movement. In engagement with the gear 2178 is another beveled gear 2184 keyed on a shaft 2186 connected by a universal joint 2188 to a telescopic shaft 2190 (see Fig. 1), this shaft being connected at its other end by a universal joint (not shown) to a shaft 2192 (Fig. 2) rotatable in a bracket 2194 fast on the frame of the machine and provided with a pinion 2196 in mesh with another pinion 2198 in fixed relation to which is a pinion 2200 operated by a gear sector 2202 pivotally mounted on the frame. This gear sector is connected by a link 2204 to a lever 2206 supported on the frame, and this lever is connected by a link 2208 to an arm 2210 mounted to swing about the previously mentioned shaft 152. The arm 2210 carries a roll 2212 engaged by a path cam formed in one side of a cam wheel 2214 (Fig. 12) fast on the cam shaft 160. It will be understood that this cam is so formed as to swing the arm 2210 first in one direction to turn the feed wheel 2150 in the direction to advance the guide wire into the groove in the wipers and thereafter to swing the arm in the opposite direction so as to turn the feed wheel reversely to retract the guide wire.

The manner of operation of the machine is briefly as follows. After the grippers and other parts have been adjusted, as determined partly by trial, into the positions appropriate for operating on shoes of a given style and size, the operator mounts the shoe and last on the pins 6 with the insole in engagement with the rim 4 of the plate 2, the appropriate plate for right or left shoes having been mounted and locked in proper position on its support. After presenting the marginal portion of the upper materials outspread between the jaws of the several grippers, the operator depresses the treadle 90 to move the plate 2 along the insole into engagement with the lip at the end of the toe and to impart preliminary closing movements to the gripper jaws. If desired for any reason, the operator may then return the gripper jaws to their fully open positions by depression of the treadle 408, and if it is necessary to remove the shoe and present it again he may also release the plate 2 by means of the handle 168, to cause the plate to be returned to its initial position by its operating spring. Otherwise the operator proceeds to adjust the upper in proper relation to the last and to the partially closed gripper jaws, positioning the edge of the toe tip substantially flush with those end faces of the tip-line gripper jaws which are toward the front of the machine. He then starts the machine by depression of the treadle 774. As the machine starts to operate, the grippers are closed firmly on the upper and are operated to pull the upper heightwise of the last, foredrawing movements lengthwise of the last being also imparted to all the grippers throughout the greater portion of their downward upper-pulling movements. The limits of the foredrawing movements of the tip-line grippers are determined positively by the stop devices associated respectively with these different grippers. In this stage of the cycle of operations also the toe wipers are advanced and closed and are also moved a short distance downwardly preparatory to the wiping of the upper heightwise of the last in the next stage of the cycle, and the tip gage is advanced to its proper position over the toe end of the upper and is moved downwardly into engagement with the upper. After the upper has thus been pulled by the grippers, the machine comes automatically to a stop with the upper held under tension to permit the operator to inspect the work and to determine, with reference to the tip gage and otherwise, whether the upper is in proper relation to the last. If it appears that any further adjustment of the machine or of the upper is required in order that the upper may be pulled properly, the operator may cause the parts to be returned to their starting positions by depression of the reversing treadle 832; and in that event, after making the required adjustment, he will proceed again as before until the machine has come to a stop at the end of the first stage of the cycle. It will be understood that after the machine has been properly adjusted to operate on shoes of a given style and size, no readjustment thereof will ordinarily be required until shoes of a different style or size are to be operated upon.

As the machine begins the second stage of its cycle, initiated by depression of the starting treadle 774, the tip gage is retracted from over the shoe, and early in this stage of the cycle the shoe holder 1730 is swung downwardly into clamping engagement with the upper at the top of the toe and downward movement is imparted to the toe wipers to cause them to wipe the upper heightwise of the last, the wipers moving from the position illustrated in Fig. 47 to that illustrated in Fig. 48 and the grippers being swung more or less inwardly in response to the pull of the upper thereon. In the course of this downward movement of the wipers the tip-line grippers receive their secondary foredrawing movements, the limits of these movements of the grippers being determined by the secondary stop devices associated therewith. As the wipers complete their downward movements they begin to advance and close to wipe the marginal portion of the upper inwardly over the feather and against the lip of the insole, and as they wipe the upper inwardly the binder wire is fed around the toe along the groove in their wiping edges, the guide wire being advanced and then retracted along the groove in the proper time relation to the feeding of the binder wire. Substantially at the time when the wipers begin to wipe the upper inwardly over the insole the grippers open to release the upper, the foredrawing mechanisms having by this time returned far enough to relieve the stresses of any of the springs which may have been compressed in imparting the foredrawing movements to the grippers. After the grippers release the upper they are moved farther downwardly for clearance. As the wipers move inwardly over the insole they may move yieldingly heightwise of the shoe against the resistance of the comparatively light spring 1626 (Fig. 39) for better accommodation to the thickness of the upper materials, and after their advancing and closing movements have been substantially completed they are pressed more firmly up against the margin of the upper. The advancing and closing movements of the wipers inwardly over the insole are positively limited by the stop devices associated therewith.

After the wipers have arrived at the limits of their advancing and closing movements, the several tack-inserting devices are, in response to downward movement of the operating member 1842, moved inwardly from their tack-receiving positions into their tack-driving positions and are operated to drive the tacks. Fig. 49 shows one of the devices in its tack-driving position prior to the driving of the tack, and Fig. 50 shows how the parts are positioned at the end of the movement of the tack driver. As the tacks are thus driven they engage the outer side of the binder wire and crowd the wire inwardly toward the lip of the insole, the tacks being driven inwardly far enough for their heads also to clamp the wire against the upper. As the drivers are thus operated, the binder wire fed around the toe is severed from the remainder of the wire. After the driving of the tacks the parts of the machine are returned to their starting positions, the tack-inserting devices being moved outwardly into positions to receive tacks which are then delivered to them for use in operating on the next shoe. Before the wipers are retracted from over the upper their upward pressure on the upper and the pressure of the shoe holder on the top of the toe are relieved, to prevent the wipers from dragging on the upper during their retractive movements.

Novel features of the mechanism herein disclosed for feeding the binder wire are claimed in Letters Patent No. 2,198,695, granted on April 30, 1940, on an application of R. W. Cummings.

Having described the invention, what I claim as new and desire to secure by Letters Patent of the United States is:

1. In a shoe machine, the combination with means for shaping an upper over a last and over the toe end of a welt shoe insole on the last, of a device for engaging the inner face of the lip of the insole around its toe end to support the lip against inward pressure lengthwise and laterally of the shoe in the upper-shaping operation, and means arranged to extend through the insole into the last to hold the last against lengthwise displacement during that operation.

2. In a shoe machine, the combination with means for shaping an upper over a last and over the toe end of a welt shoe insole on the last, of a device arranged to position the last heightwise by engagement with the toe end of the insole and also to support the lip of the insole around its toe end against inward pressure lengthwise and laterally of the shoe in the upper-shaping operation, and means arranged to extend through the insole into the last to position the toe end of the last lengthwise and laterally during that operation.

3. In a shoe machine, the combination with means for shaping an upper over a last and over the toe end of a welt shoe insole on the last, of a device for engaging the inner face of the lip of the insole around its toe end to support the lip against inward pressure in the upper-shaping operation, and a plurality of pins arranged to extend through the insole into holes previously provided in the last to position the last lengthwise and laterally during that operation.

4. In a shoe machine, the combination with means for shaping an upper over a last and over the toe end of a welt shoe insole on the last, of a plate arranged to position the last heightwise by engagement with the toe end of the insole and formed to fit the inner face of the lip of the insole around its toe end to support the lip against inward pressure in the upper-shaping operation, and a plurality of pins arranged to extend through the insole into holes previously provided in the forepart of the last to position the last lengthwise and laterally during that operation.

5. In a shoe machine, the combination with means for shaping an upper over a last and over the toe end of a welt shoe insole on the last, of a device for engaging the inner face of the lip of the insole around its toe end to support the lip against inward pressure in the upper-shaping operation, said device being detachable to permit differently formed devices to be used respectively for right and left shoes, and a plurality of members arranged to extend through the forepart of the insole of each right or left shoe into holes previously provided in the last to position the last in the upper-shaping operation, said members being shiftable in directions widthwise of the shoe to different positions for right and left shoes respectively.

6. In a shoe machine, the combination with means for shaping an upper over a last and over the toe end of a welt shoe insole on the last, of a device for engaging the inner face of the lip of the insole around its toe end to support the lip against inward pressure in the upper-shaping operation, said device being detachable to permit differently formed devices to be used respectively for right and left shoes, a plurality of members arranged to extend through the forepart of the insole of each right or left shoe into holes previously provided in the last to position the last in the upper shaping operation, and a block on which said members are mounted, said block being movable about an axis extending heightwise of the shoe to different positions for right and left shoes respectively.

7. In a shoe machine, the combination with means for shaping an upper over a last and over the toe end of a welt shoe insole on the last, of a plurality of members arranged to extend through the forepart of the insole into holes previously provided in the last to position the last in the upper-shaping operation, said members being shiftable in directions widthwise of the shoe to different positions for right and left shoes respectively, and a device for engaging the inner face of the lip of the insole around its toe end to support the lip against pressure in the upper-shaping operation, said device being detachable to permit differently formed devices to be used respectively for right and left shoes and having means for properly positioning said members.

8. In a shoe machine, the combination with means for shaping an upper over a last and over the toe end of a welt shoe insole on the last, of a plurality of pins arranged to extend through the forepart of the insole into holes previously provided in the last to position the last in the upper-shaping operation, said pins being shiftable in directions widthwise of the shoe to different positions for right and left shoes respectively, and a device for engaging the inner face of the lip of the insole around its toe end to support the lip against pressure in the upper-shaping operation, said device being detachable to permit differently formed devices to be used respectively for right and left shoes and being constructed to interlock with said pins to position the pins.

9. In a shoe machine, the combination with means for shaping an upper over a last and over the toe end of a welt shoe insole on the last, of a plurality of pins arranged to extend through the forepart of the insole into holes previously provided in the last to position the last in the upper-shaping operation, a block supporting said pins and movable about an axis extending heightwise of the shoe to different positions for right and left shoes respectively, and a plate for engaging the inner face of the lip of the insole around its toe end to support the lip against pressure in the upper-shaping operation, said plate being detachable to permit differently formed plates to be used respectively for right and left shoes and having openings therein to receive said pins and thereby determine the position of said block.

10. In a shoe machine, the combination with means for shaping an upper over a last and over the toe end of an insole on the last, of a plurality of members arranged to extend through the forepart of the insole into holes previously provided in the last to position the last in the upper-shaping operation, said members being movable in directions widthwise of the last about an axis located substantially at the end of the toe to different positions for right and left shoes respectively.

11. In a shoe machine, the combination with means for shaping an upper over a last and over the toe end of an insole on the last, of a plurality of members arranged to extend through the forepart of the insole into holes previously provided in the last to position the last in the upper-shaping operation, said members being shiftable about an axis extending heightwise of the last to such different positions for right and left shoes respectively as to cause the heel ends of the different shoes to occupy substantially the same position laterally of the machine.

12. In a shoe machine, the combination with means for shaping an upper over a last and over the toe end of an insole on the last, of a plurality of pins arranged to extend through the forepart of the insole into holes previously provided in the last to position the last in the upper-shaping operation, and a block on which said pins are mounted, said block being movable about an axis extending heightwise of the last in a location substantially at the end of the toe to different positions for right and left shoes respectively.

13. In a shoe machine, the combination with means for shaping an upper over a last and over the toe end of a welt shoe insole on the last, of means arranged to extend through the forepart of the insole into the last to hold the last against lengthwise displacement in the upper-shaping operation, and a device for supporting the lip of the insole at the toe end against inward pressure in the upper-shaping operation, said device being movable relatively to said holding means into supporting engagement with the lip at the end of the toe.

14. In a shoe machine, the combination with means for shaping an upper over a last and over the toe end of a welt shoe insole on the last, of a plurality of members arranged to extend through the forepart of the insole into the last to position the last in the upper-shaping operation, a device for supporting the lip of the insole at the toe end against inward pressure in the upper-shaping operation, and means for moving said device lengthwise of the last relatively to said members into supporting engagement with the lip at the end of the toe after the last has been mounted on said members.

15. In a shoe machine, the combination with means for shaping an upper over a last and over the toe end of a welt shoe insole on the last, of a plurality of pins arranged to extend through the forepart of the insole into holes previously provided in the last to position the last in the upper-shaping operation, a plate for supporting the lip of the insole at the toe end against inward pressure in the upper-shaping operation, said plate having slots therein to receive said pins and permit the plate to be moved lengthwise of the last relatively to the pins into supporting engagement with the lip at the end of the toe, and means for thus moving the plate after the last has been mounted on the pins.

16. In a power-operated shoe machine, the combination with means for shaping an upper over a last and over the toe end of a welt shoe insole on the last, of a device for supporting the lip of the insole at the toe end against inward pressure in the upper-shaping operation, a member movable by the operator prior to the starting of the power operation of the machine, and mechanism arranged to be operated by the movement of said member to move said device along the insole into supporting engagement with the lip at the end of the toe after the shoe has been presented to the machine.

17. In a power-operated shoe machine, the combination with means for shaping an upper over a last and over the toe end of a welt shoe insole on the last, of a device for supporting the lip of the insole at the toe end against inward pressure in the upper-shaping operation, a member movable by the operator prior to the starting of the power operation of the machine, and a toggle arranged to be straightened by the movement of said member to move said device along the insole into supporting engagement with the lip at the end of the toe after the shoe has been presented to the machine.

18. In a power-operated shoe machine, the combination with means for shaping an upper over a last and over the toe end of a welt shoe insole on the last, of a device for supporting the lip of the insole at the toe end against inward pressure in the upper-shaping operation, a member movable by the operator prior to the starting of the power operation of the machine, mechanism for moving said device along the insole into supporting engagement with the lip at the end of the toe by the movement of said member, a spring tending to return the device, and retaining means arranged to act against the resistance of said spring to hold the device in lip-supporting position.

19. In a power-operated shoe machine, the combination with means for shaping an upper over a last and over the toe end of a welt shoe insole on the last, of a device for supporting the lip of the insole at the toe end against inward pressure in the upper-shaping operation, a member movable by the operator prior to the starting of the power operation of the machine, mechanism for moving said device along the insole into supporting engagement with the lip at the end of the toe by the movement of said member, and means arranged for use at the will of the operator to cause said device to return to its initial position prior to the starting of the power operation of the machine.

20. In a power-operated shoe machine, the combination with means for shaping an upper over a last and over the toe end of a welt shoe insole on the last, of a device for supporting the lip of the insole at the toe end against inward pressure in the upper-shaping operation, a member movable by the operator prior to the starting of the power operation of the machine, mechanism for moving said device along the insole into supporting engagement with the lip at the end of the toe by the movement of said member, a spring tending to return said device, and retaining means for holding the device in lip-supporting position, said retaining means being movable at the will of the operator to release the device and permit its return by the spring prior to the starting of the power operation of the machine.

21. In a power-operated shoe machine, the combination with grippers for pulling an upper over a last, and power-operated means for closing said grippers on the upper in the power operation of the machine, of means controlled by the operator for imparting preliminary closing movements to said grippers and for then maintaining their jaws close to the upper without any substantial gripping pressure thereon prior to the starting of the power operation of the machine.

22. In a power-operated shoe machine, the combination with grippers for pulling an upper over a last at the opposite sides of the forepart, and power-operated means for closing said grippers on the upper in the power operation of the machine, of means controlled by the operator for imparting preliminary closing movements to said grippers and for then maintaining them partially closed to permit adjustment of the upper relatively to their jaws prior to the starting of the power operation of the machine.

23. In a power-operated shoe machine, the combination with grippers for pulling an upper over a last, of power-operated mechanism for closing said grippers on the upper in the power operation of the machine, a cam for operating said mechanism, said cam being so formed as to permit movement of said mechanism to impart preliminary closing movements to the grippers prior to the power operation of the machine, and means movable by the operator thus to operate said mechanism prior to the starting of the machine.

24. In a power-operated shoe machine, the combination with grippers for pulling an upper over a last, of a lever and a member operated thereby to close said grippers on the upper in the power operation of the machine, and treadle-operated mechanism arranged to act on said member independently of said lever to impart preliminary closing movements to the grippers prior to the starting of the power operation of the machine.

25. In a power-operated shoe machine, the combination with grippers for pulling an upper over a last, and power-operated means for closing said grippers on the upper in the power operation of the machine, of mechanism movable by the operator to close the grippers preliminarily on the upper prior to the starting of the power operation of the machine, said mechanism being reversely movable upon its release by the operator to permit opening movements of the grippers, and automatic means for preventing the grippers from fully opening when said mechanism is thus released.

26. In a power-operated shoe machine, the combination with grippers for pulling an upper over a last, and power-operated means for closing said grippers on the upper in the power operation of the machine, of mechanism movable by the operator to close the grippers preliminarily on the upper prior to the starting of the power operation of the machine, said mechanism being reversely movable upon its release by the operator to permit opening movements of the grippers, and a device arranged to act automatically to limit the reverse movement of said mechanism and thereby prevent the grippers from fully opening after they have started to open.

27. In a power-operated shoe machine, the combination with grippers for pulling an upper over a last, of power-operated mechanism for closing said grippers on the upper in the power operation of the machine, a member movable by the operator to operate said mechanism and thereby close the grippers preliminarily on the upper prior to the starting of the power operation of the machine, said member being reversely movable upon its release by the operator to permit opening movements of the grippers, and means for automatically limiting such opening movements of the grippers to prevent them from fully opening.

28. In a power-operated shoe machine, the combination with grippers for pulling an upper over a last, of power-operated mechanism for closing said grippers on the upper in the power operation of the machine, a member movable by the operator to operate said mechanism and thereby close the grippers preliminarily on the upper prior to the starting of the power operation of the machine, said member being reversely movable upon its release by the operator to permit opening movements of the grippers, and a device arranged to act on said member to limit its reverse movement and thereby prevent the grippers from fully opening when said member is released by the operator.

29. In a power-operated shoe machine, the combination with grippers for pulling an upper over a last, of a lever and a member operated thereby to close said grippers on the upper in the power operation of the machine, treadle-operated mechanism for operating said member to impart preliminary closing movements to said grippers prior to the starting of the power operation of the machine, said mechanism being reversely movable upon its release by the operator to permit opening movements of the grippers, and a device controlled by said lever for automatically limiting the reverse movement of said mechanism and thereby preventing the grippers from fully opening.

30. In a shoe machine, the combination with grippers for pulling an upper over a last, of mechanism movable by the operator to close said grippers on the upper, said mechanism being reversely movable upon its release by the operator to permit opening movements of the grippers, and automatic means for preventing full reverse movement of said mechanism after the beginning of such movement to cause the gripper jaws to remain close to the upper but without any substantial gripping pressure thereon.

31. In a shoe machine, the combination with grippers for pulling an upper over a last, of mechanism movable by the operator to close said grippers on the upper, said mechanism being reversely movable upon its release by the operator to permit opening movements of the grippers, and a locking device arranged to act on said mechanism shortly after the beginning of its reverse movement to prevent further such movement thereof and thereby cause the gripper jaws to remain close to the upper but without any substantial gripping pressure thereon.

32. In a power-operated shoe machine, the combination with grippers for pulling an upper over a last, and power-operated means for closing said grippers on the upper in the power operation of the machine, of means controlled by the operator for imparting preliminary closing movements to said grippers and for then maintaining their jaws close to the upper without any substantial gripping pressure thereon prior to the starting of the power operation of the machine, and additional means movable at the will of the operator prior to the starting of the machine to cause the grippers again to open.

33. In a power-operated shoe machine, the combination with grippers for pulling an upper over a last, of power-operated mechanism for closing said grippers on the upper in the power operation of the machine, a member movable by the operator to operate said mechanism and thereby impart preliminary closing movements to the grippers prior to the starting of the power operation of the machine, and additional mechanism movable at the will of the operator prior to the starting of the machine to cause the grippers again to open.

34. In a power-operated shoe machine, the combination with grippers for pulling an upper over a last, of power-operated mechanism for closing said grippers on the upper in the power operation of the machine, a member movable by the operator to operate said mechanism and thereby impart preliminary closing movements to the grippers prior to the starting of the power operation of the machine, a device for preventing said grippers from fully opening while permitting them partially to open upon release of said member by the operator, and means movable at the will of the operator prior to the starting of the machine to render said device inoperative and thereby permit the grippers to open fully.

35. In a power-operated shoe machine, the combination with grippers for pulling an upper over a last, of power-operated mechanism for closing said grippers on the upper in the power operation of the machine, a treadle-operated member movable by the operator to operate said mechanism and thereby close the grippers preliminarily on the upper prior to the starting of the power operation of the machine, a device for limiting reverse movement of said member and thereby preventing the grippers from fully opening while permitting them partially to open upon release of said member by the operator, and treadle-operated mechanism movable at the will of the operator prior to the starting of the machine to render said device inoperative and also to open the grippers fully.

36. In a shoe machine, the combination with grippers for pulling an upper over a last, of a member movable by the operator, mechanism for closing said grippers on the upper by movement of said member, said mechanism being reversely movable to permit opening movements of the grippers upon release of said member by the operator, a device for automatically preventing full reverse movement of said mechanism and for thereby limiting the opening movements of the grippers, and another member movable at the will of the operator to render said device inoperative.

37. In a power-operated shoe machine, the combination with grippers for pulling an upper over a last, and means for wiping the margin of the toe end of the upper inwardly against the lip of a welt shoe insole on the last, of mechanism for imparting preliminary closing movements to said grippers prior to the starting of the power operation of the machine, a plate movable along the insole into supporting engagement with the lip at the end of the toe, and a member movable by the operator for controlling both said plate and said gripper-closing mechanism.

38. In a power-operated shoe machine, the combination with grippers for pulling an upper over a last, and means for wiping the margin of the toe end of the upper inwardly against the lip of a welt shoe insole on the last, of mechanism for imparting preliminary closing movements to said grippers prior to the starting of the power operation of the machine, a treadle for thus operating said mechanism, a member movable along the insole into supporting engagement with the lip at the end of the toe, and means for thus moving said member also by said treadle.

39. In a shoe machine, the combination with grippers for pulling an upper over a last, and means for wiping the margin of the toe end of the upper inwardly against the lip of a welt shoe insole on the last, of mechanism for imparting closing movements to said grippers a plate movable along the insole into supporting engagement with the lip at the end of the toe, and a member movable by the operator for thus operating both said mechanism and said plate.

40. In a power-operated shoe machine, the combination with means for shaping an upper over a last and over the toe end of a welt shoe insole on the last, of a member movable along the insole into operative position in supporting engagement with the lip of the insole at the end of the toe prior to the starting of the power operation of the machine, and mechanism for preventing the starting of the machine unless said member is in such operative position.

41. In a power-operated shoe machine, the combination with means for shaping an upper over a last and over the toe end of a welt shoe insole on the last, of a member for supporting the lip of the insole at the toe end against inward pressure in the upper-shaping operation, mechanism for moving said member along the insole into operative position prior to the starting of the power operation of the machine, a starting member movable to start the machine, and a device controlled by said mechanism for locking said starting member against operative movement unless said lip-supporting member is in its operative position.

42. In a power-operated shoe machine, the combination with grippers for pulling an upper over a last, of mechanism controlled by the operator for imparting preliminary closing movements to said grippers prior to the starting of the power operation of the machine, and means for preventing the starting of the machine unless said grippers are thus preliminarily closed.

43. In a power-operated shoe machine, the combination with grippers for pulling an upper over a last, of mechanism movable by the operator to impart preliminary closing movements to said grippers prior to the starting of the power operation of the machine, a starting member movable to start the machine, and a device controlled by said mechanism for preventing operative movement of said starting member unless the grippers are thus preliminarily closed.

44. In a power-operated shoe machine, the combination with grippers for pulling an upper over a last, and means for wiping the margin of the toe end of the upper inwardly against the lip of a welt shoe insole on the last, of a plate for supporting the lip of the insole at the toe end against inward pressure in the wiping operation, mechanism for moving said plate along the insole into operative position prior to the starting of the power operation of the machine, mechanism for imparting preliminary closing movements to said grippers also prior to the starting of the machine, a member movable to start the machine, and devices controlled respectively by said different mechanisms for preventing operative movement of said starting member unless said plate is in operative position and the grippers are preliminarily closed.

45. In a shoe machine, a plurality of grippers for pulling an upper over a last, each of said grippers comprising a pair of upper-gripping jaws one of which is mounted to swing toward the other and jaw-closing mechanism movable relatively to said swinging jaw for effecting relative closing movement of the jaws, means for moving said grippers heightwise of the last to pull the upper, levers associated respectively with the different grippers and movable bodily with them heightwise of the last, means movable relatively to said levers for operating the jaw-closing mechanisms by swinging movements of said levers, and means for thus swinging the levers.

46. In a shoe machine, a plurality of grippers for pulling an upper over a last, each of said grippers comprising a pair of upper-gripping jaws and jaw-closing mechanism for effecting relative closing movement of the jaws, means for moving said grippers heightwise of the last to pull the upper, levers associated respectively with the different grippers and movable bodily with them heightwise of the last, means movable toward the gripper jaws to operate the jaw-closing mechanisms in response to swinging movements of said levers, and means for thus swinging the levers.

47. In a shoe machine, a plurality of grippers for pulling an upper over a last, each of said grippers comprising a pair of upper-gripping jaws and jaw-closing mechanism for effecting relative closing movement of the jaws, means for moving said grippers heightwise of the last to pull the upper, levers associated respectively with the different grippers and movable bodily with them heightwise of the last, said levers being arranged to extend generally heightwise of the last, members movable toward the gripper jaws to operate the jaw-closing mechanisms, links connecting said members and levers for thus operating the members by swinging movements of the levers, and means for thus swinging the levers.

48. In a shoe machine, a plurality of grippers for pulling an upper over a last, each of said grippers comprising a pair of upper-gripping jaws and jaw-closing mechanism for effecting relative closing movement of the jaws, means for moving said grippers heightwise of the last to pull the upper, levers associated respectively with the different grippers and movable bodily with them heightwise of the last, said levers being arranged to extend generally heightwise of the last, means for operating the jaw-closing mechanisms by swinging movements of said levers in directions widthwise of the last, and means for thus swinging the levers.

49. In a shoe machine, a plurality of grippers for pulling an upper over a last, each of said grippers comprising a pair of upper-gripping jaws and jaw-closing mechanism for effecting relative closing movement of the jaws, means for moving said grippers heightwise of the last to pull the upper, levers associated respectively with the different grippers and movable bodily with them heightwise of the last, said levers being arranged to extend generally heightwise of the last, means for operating the jaw-closing mechanisms by swinging movements of said levers, operating levers mounted for swinging movements in directions widthwise of the last, and links connecting said operating levers to said first-named levers.

50. In a shoe machine, a plurality of grippers for pulling an upper over a last, each of said grippers comprising a pair of upper-gripping jaws and jaw-closing mechanism for effecting relative closing movement of the jaws, gripper-operating means movable heightwise of the last to impart upper-pulling movements to the grippers, levers associated respectively with the different grippers and movable bodily heightwise of the last by said gripper-operating means, means for operating the jaw-closing mechanisms by swinging movements of said levers, and means for thus swinging said levers independently of the movement of said gripper-operating means.

51. In a shoe machine, a plurality of grippers for pulling an upper over a last, each of said grippers comprising a pair of upper-gripping jaws and jaw-closing mechanism for effecting relative closing movement of the jaws, levers mounted for swinging movements heightwise of the last for operating said grippers to pull the upper, other levers movable bodily by said first-named levers, means for operating the jaw-closing mechanisms by swinging movements of said other levers, and means for thus swinging said other levers independently of the movements of said first-named levers.

52. In a shoe machine, a plurality of grippers for pulling an upper over a last, each of said grippers comprising a pair of upper-gripping jaws and jaw-closing mechanism for effecting relative closing movement of the jaws, levers mounted for swinging movements heightwise of the last for operating said grippers to pull the upper, other levers movable bodily by said first-named levers and arranged to extend generally heightwise of the last, means for operating the jaw-closing mechanisms by swinging movements of said other levers, and links movable independently of said first-named levers in directions transverse to the directions of the upper-pulling movements of the grippers to operate said other levers.

53. In a shoe machine, a plurality of grippers for pulling an upper over a last, devices connected respectively to the different grippers and movable heightwise of the last to impart upper-pulling movements to the grippers, the grippers being mounted to swing relatively to said devices, levers fulcrumed on said devices and movable bodily with them heightwise of the last, means for closing the grippers on the upper by swinging movements of said levers, and means for thus swinging the levers.

54. In a shoe machine, a plurality of grippers having jaws for gripping and pulling an upper over a last, devices connected respectively to the different grippers and movable heightwise of the last to impart upper-pulling movements to the grippers, the grippers being mounted to swing relatively to said devices, levers fulcrumed on said devices and movable bodily with them heightwise of the last, said levers being arranged to extend generally heightwise of the last, members movable toward the gripper jaws to effect relative closing movements of the jaws in response to swinging movements of said levers, and means for thus swinging the levers.

55. In a shoe machine, a plurality of grippers having jaws for gripping and pulling an upper over a last, each of said grippers including a jaw-closing member movable in a direction toward its jaws to effect relative closing movement of the jaws, devices connected respectively to the different grippers and movable heightwise of the last to impart upper-pulling movements to the grippers, the grippers being mounted to swing relatively to said devices, levers fulcrumed on said devices and movable bodily with them heightwise of the last, members carried by said devices for operating said jaw-closing members in response to swinging movements of said levers, and means for thus swinging the levers.

56. In a shoe machine, a plurality of grippers for pulling an upper over a last, devices connected respectively to the different grippers and movable heightwise of the last to impart upper-pulling movements to the grippers, the grippers being mounted to swing relatively to said devices, levers supported on said devices and movable bodily with them heightwise of the last, means for closing the grippers on the upper by swinging movements of said levers, and members connected to said levers for thus swinging them independently of the movements of said devices.

57. In a shoe machine, a plurality of grippers for pulling an upper over a last, devices connected respectively to the different grippers and movable heightwise of the last to impart upper-pulling movements to the grippers, the grippers being mounted to swing relatively to said devices, levers connected to said devices for operating them, other levers movable bodily with said devices, means for closing the grippers on the upper by swinging movements of said other levers, and members connected to said other levers for thus swinging them independently of the movements of said first-named levers.

58. In a shoe machine, a plurality of grippers for pulling an upper over a last, devices connected respectively to the different grippers and movable heightwise of the last to impart upper-pulling movements to the grippers, the grippers being mounted to swing relatively to said devices, levers mounted for swinging movements heightwise of the last to operate said devices, other levers movable bodily with said devices and arranged to extend generally heightwise of the last, means for closing the grippers on the upper by swinging movements of said other levers, and operating levers movable in directions transverse to the directions of the upper-pulling movements of the grippers and connected to said other levers to operate them.

59. In a shoe machine, grippers for pulling an upper over a last respectively at the opposite sides of the last, said grippers being arranged to extend generally heightwise of the last, levers arranged to extend widthwise of the last and connected respectively at their inner ends to the different grippers, means providing fulcrums for said levers at their outer ends, and operating means arranged to act on said levers in locations between their opposite ends to swing them heightwise of the last and thereby impart upper-pulling movements to the grippers.

60. In a shoe machine, a plurality of grippers for pulling an upper over a last in different locations along the opposite sides of the last, said grippers being arranged to extend generally heightwise of the last, levers arranged to extend widthwise of the last and connected respectively at their inner ends to the different grippers, means providing fulcrums for said levers at their outer ends, an operating member on which the levers for operating the grippers at one side of the last are pivotally mounted between their opposite ends, another operating member on which the levers for operating the grippers at the other side of the last are similarly mounted, and means for moving said operating members heightwise of the last to impart gripper-operating movements to said levers.

61. In a shoe machine, grippers for pulling an upper over a last respectively at the opposite sides of the last, levers arranged to extend widthwise of the last and connected respectively at their inner ends to the different grippers, members on which said levers are fulcrumed at their outer ends, operating means arranged to act on said levers in locations between their opposite ends to swing them heightwise of the last and thereby impart upper-pulling movements to the grippers, and springs arranged to control said fulcrum members and yieldable in response to resistance of the upper to the force of the pull of the grippers.

62. In a shoe machine, grippers for pulling an upper over a last respectively at the opposite sides of the last, levers arranged to extend widthwise of the last and connected respectively at their inner ends to the different grippers, members on which said levers are fulcrumed at their outer ends, operating means arranged to act on said levers in locations between their opposite ends to swing them heightwise of the last and thereby impart upper-pulling movements to the grippers, spring mechanisms arranged to control said fulcrum members and yieldable in response to resistance of the upper to the force of the pull of the grippers, and means comprising a member common to said different spring mechanisms for adjusting them simultaneously to vary their resistance to movements of the fulcrum members.

63. In a shoe machine, grippers for pulling an upper over a last respectively at the opposite sides of the last, levers arranged to extend widthwise of the last and connected respectively at their inner ends to the different grippers, members on which said levers are fulcrumed at their outer ends, operating means arranged to act on said levers in locations between their opposite ends to swing them heightwise of the last and thereby impart upper-pulling movements to the grippers, and spring mechanisms arranged to control said fulcrum members and yieldable in response to resistance of the upper to the force of the pull of the grippers, each of said spring mechanisms comprising a pair of springs of different strengths and means adjustable to render either of said springs selectively effective to resist movement of the corresponding fulcrum member.

64. In a shoe machine, the combination with means for wiping an upper heightwise of a last, of a gripper for gripping the margin of the upper, and a lever connected to said gripper for moving it heightwise of the last to pull the upper, said lever comprising parts connected together for relative movement against yielding resistance to insure against breakage if the gripper is moved farther heightwise of the last by contact of the wiping means therewith.

65. In a shoe machine, the combination with means for wiping an upper heightwise of a last, of a gripper for gripping the margin of the upper, a lever connected to said gripper, a member providing a fulcrum for said lever, means for swinging the lever to impart upper-pulling movement heightwise of the last to the gripper, said fulcrum member being yieldingly movable in response to resistance of the upper to the force of the pull of the gripper, and means for limiting return movement of the fulcrum member, said lever comprising parts connected together for relative movement against yielding resistance to insure against breakage if the gripper is moved farther heightwise of the last by contact of the wiping means therewith.

66. In a shoe machine, the combination with means for wiping an upper heightwise of a last, of a gripper for gripping the margin of the upper, a lever connected to said gripper, means for swinging said lever to impart upper-pulling movement heightwise of the last to the gripper, and a spring against the resistance of which the lever is movable to insure against breakage if the gripper is moved farther heightwise of the last by contact of the wiping means therewith.

67. In a shoe machine, the combination with means for wiping an upper heightwise of a last, of a gripper for gripping the margin of the upper, a lever connected at one end to said gripper, a device providing a fulcrum for said lever at its other end, means for swinging the lever by force applied thereto between its opposite ends to impart upper-pulling movement heightwise of the last to the gripper, a spring against the resistance of which said fulcrum device is movable in response to resistance of the upper to the force of the pull of the gripper, and another spring against the resistance of which said fulcrum device is reversely movable beyond its normal position to insure against breakage if the gripper is moved farther heightwise of the last by contact of the wiping means therewith.

68. In a shoe machine, the combination with grippers for pulling an upper over a last at the opposite sides of the forepart, of a gripper for also pulling the upper over the last at the end of the toe, a lever for moving said toe-end gripper heightwise of the last to pull the upper, means providing a fulcrum for said lever in its upper-pulling movement, said fulcrum means being yieldingly movable in response to resistance of the upper to the force of the pull of the gripper, and mechanism for positively but adjustably limiting the yielding movement of said fulcrum means to determine the limit of the upper-pulling movement of the gripper.

69. In a shoe machine, the combination with grippers for pulling an upper over a last at the opposite sides of the forepart, of a gripper for also pulling the upper over the last at the end of the toe, a lever connected at one end to said toe-end gripper, a device providing a fulcrum for said lever at its other end, means for swinging the lever by force applied thereto between its opposite ends to impart upper-pulling movement to the gripper, a spring against the resistance of which said fulcrum device is movable in response to resistance of the upper to the force of the pull of the gripper, and mechanism for positively but adjustably limiting the movement of said device to determine the limit of the upper-pulling movement of the gripper.

70. In a shoe machine, the combination with grippers for pulling an upper over a last at the opposite sides of the forepart, of a gripper for also pulling the upper over the last at the end of the toe, a lever connected at one end to said toe-end gripper, means for swinging said lever by force applied thereto between its opposite ends to impart upper-pulling movement to the gripper, a device connected to the lever at the opposite end thereof from the gripper, a rod on which said device is mounted, a spring against the resistance of which said device and rod are movable in response to resistance of the upper to the force of the pull of the gripper, and stop mechanism for adjustably limiting the movement of said device and rod to determine the limit of the upper-pulling movement of the gripper.

71. In a shoe machine, a gripper for pulling an upper over a last, said gripper comprising a pair of upper-gripping jaws one movable rectilinearly and the other mounted to swing in the closing of the jaws, and a member yieldi ly controlled by said rectilinearly movable jaw and movable therewith to impart closing movement to said swinging jaw.

72. In a shoe machine, a gripper for pulling an upper over a last, said gripper comprising a pair of upper-gripping jaws one movable rectilinearly and the other mounted to swing in the closing of the jaws, a wedge member movable with said first-named jaw to impart closing movement to the swinging jaw, and spring means through which the wedge member is operated by said first-named jaw.

73. In a shoe machine, a gripper for pulling an upper over a last, said gripper comprising a jaw holder having an opening therein, a rectilinearly movable jaw having a shank portion guided in said opening, a swinging jaw mounted on said holder, and a member yieldingly supported by said shank portion of the rectilinearly movable jaw and arranged to be operated thereby to impart closing movement to the swinging jaw.

74. In a shoe machine, a gripper for pulling an upper over a last, said gripper comprising a jaw holder having an opening therein, a rectilinearly movable jaw having a shank portion guided in said opening, a swinging jaw mounted on said holder, a wedge member also guided in said opening for imparting closing movement to said swinging jaw, and spring means controlled by said shank portion of the rectilinearly movable jaw for operating said wedge member.

75. In a shoe machine, a gripper for pulling an upper over a last, said gripper comprising a jaw holder having an opening therein, a rectilinearly movable jaw having a shank portion guided in said opening, a swinging jaw mounted on said holder, and a jaw-closing member in said opening movable with said rectilinearly movable jaw to impart closing movement to the swinging jaw, said holder having fast thereon a guide member located between said jaw-closing member and the shank portion of the rectilinearly movable jaw.

76. In a shoe machine, a plurality of grippers for pulling an upper over a last respectively at the end of the toe and in different locations along both sides of the last, means for effecting relative movement of said grippers and the last to pull the upper heightwise of the last, and foredrawing mechanisms operatively independent of one another and associated respectively with said different grippers for imparting to said grippers foredrawing movements lengthwise of the last.

77. In a shoe machine, a plurality of grippers for pulling an upper over a last respectively at the end of the toe and in different locations along both sides of the last, means for effecting relative movement of said grippers and the last to pull the upper heightwise of the last, and foredrawing mechanisms operatively independent of one another and associated respectively with said different grippers for imparting to said grippers foredrawing movements lengthwise of the last, each of said foredrawing mechanisms including a spring through which the foredrawing movement is imparted to the corresponding gripper.

78. In a shoe machine, a plurality of grippers for pulling an upper over a last respectively at the end of the toe and in different locations along both sides of the last, means for effecting relative movement of said grippers and the last to pull the upper heightwise of the last, and foredrawing mechanisms operatively independent of one another and associated respectively with said different grippers for imparting to said grippers foredrawing movements lengthwise of the last, each of said foredrawing mechanisms being adjustable to vary the position of the corresponding gripper lengthwise of the last independently of the other grippers.

79. In a shoe machine, a plurality of grippers for pulling an upper over a last respectively at the end of the toe and in different locations along both sides of the last, means for effecting relative movement of said grippers and the last to pull the upper heightwise of the last, the grippers being mounted for swinging movements lengthwise of the last, foredrawing mechanisms associated respectively with the different grippers and comprising members movable rectilinearly to impart to the grippers foredrawing movements lengthwise of the last by swinging them, and links through which such movements are imparted respectively to the different grippers by said members.

80. In a shoe machine, a plurality of grippers for pulling an upper over a last respectively in different locations about the forepart of the last, means for effecting relative movement of said grippers and the last to pull the upper heightwise of the last, foredrawing mechanisms associated respectively with said different grippers for imparting to said grippers foredrawing movements lengthwise of the last, each of said mechanisms comprising relatively movable members and spring means for transmitting force from one of said members to the other, and a member common to said different mechanisms for adjusting them simultaneously to vary the forces applied to the respective grippers through the spring means.

81. In a shoe machine, a plurality of grippers for pulling an upper over a last respectively in different locations about the forepart of the last, means for effecting relative movement of said grippers and the last to pull the upper heightwise of the last, and foredrawing mechanisms associated respectively with said different grippers for imparting to said grippers foredrawing movements lengthwise of the last, each of said mechanisms comprising relatively movable members and a pair of springs of different strengths for transmitting force from one of said members to the other, and each of said mechanisms being adjustable to render either of said springs selectively effective in the foredrawing operation.

82. In a shoe machine, a plurality of grippers for pulling an upper over a last respectively in different locations about the forepart of the last, means for effecting relative movement of said grippers and the last to pull the upper heightwise of the last, rods associated respectively with said different grippers and movable lengthwise to impart to the grippers foredrawing movements lengthwise of the last, members threaded on said rods, means for operating the rods through said members, and means for effecting relative turning movements of said members and rods to adjust the different respective grippers lengthwise of the last independently of one another.

83. In a shoe machine, a plurality of grippers for pulling an upper over a last respectively in different locations about the forepart of the last, means for effecting relative movement of said grippers and the last to pull the upper heightwise of the last, rods associated respectively with said different grippers and rectilinearly movable to impart to the grippers foredrawing movements lengthwise of the last, links connecting the rods to the grippers, sleeves threaded on the rods, means for operating the rods through said sleeves, and members connected respectively to the different rods for turning them to adjust the grippers lengthwise of the last.

84. In a shoe machine, a plurality of grippers for pulling an upper over a last respectively at the end of the toe and at the corners of the toe, means for effecting relative movement of said grippers and the last to pull the upper heightwise of the last, and foredrawing mechanisms associated respectively with said different grippers for imparting to said grippers foredrawing movements lengthwise of the last, each of said mechanisms comprising relatively movable members and a spring for transmitting force from one of said members to the other in the foredrawing operation.

85. In a shoe machine, a plurality of grippers for pulling an upper over a last respectively at the end of the toe and at the corners of the toe, means for effecting relative movement of said grippers and the last to pull the upper heightwise of the last, foredrawing mechanisms associated respectively with said different grippers for imparting to said grippers foredrawing movements lengthwise of the last, and members associated respectively with said different foredrawing mechanisms and movable by the operator in his working position at the front of the machine to adjust said mechanisms and thereby vary the positions of the grippers lengthwise of the last independently of one another.

86. In a shoe machine, grippers for pulling an upper over a last respectively at the opposite sides of the last, means for effecting relative movement of said grippers and the last to pull the upper heightwise of the last, means for imparting to said grippers foredrawing movements lengthwise of the last, and members arranged to act as stops to limit respectively the foredrawing movements of said different grippers each independently of the other.

87. In a shoe machine, grippers for pulling an upper over a last respectively at the opposite sides of the last, means for effecting relative movement of said grippers and the last to pull the upper heightwise of the last, means for imparting to said grippers foredrawing movements lengthwise of the last, and members arranged to act as stops to limit respectively the foredrawing movements of said different grippers, said members being adjustable each independently of the other to vary the limits of said foredrawing movements.

88. In a shoe machine, grippers for pulling an upper over a last respectively at the opposite sides of the last, means for effecting relative movement of said grippers and the last to pull the upper heightwise of the last, means for imparting to said grippers foredrawing movements lengthwise of the last, members arranged to act as stops to limit respectively the foredrawing movements of said different grippers, and mechanism common to said members for adjusting them both simultaneously to vary the limits of the foredrawing movements of the grippers.

89. In a shoe machine, grippers for pulling an upper over a last respectively at the opposite sides of the last, means for effecting relative movement of said grippers and the last to pull the upper heightwise of the last, means for imparting to said grippers foredrawing movements lengthwise of the last, members arranged to act as stops to limit respectively the foredrawing movements of said different grippers, and means for adjusting said stop members either in unison or independently of each other to vary the limits of the foredrawing movements of the grippers.

90. In a shoe machine, grippers for pulling an upper over a last respectively at the opposite sides of the last, means for effecting relative movement of said grippers and the last to pull the upper heightwise of the last, means for imparting to said grippers foredrawing movements lengthwise of the last, members arranged to act as stops to limit respectively the foredrawing movements of said different grippers, mechanism for adjusting said stop members both simultaneously in the same direction to vary the limits of the foredrawing movements of the grippers, and additional mechanisms for adjusting said stop members each independently of the other.

91. In a shoe machine, grippers for pulling an upper over a last respectively at the opposite sides of the last, means for effecting relative movement of said grippers and the last to pull the upper heightwise of the last, mechanisms for imparting respectively to said different grippers foredrawing movements lengthwise of the last, rods arranged to act as stops on said mechanisms to limit respectively the foredrawing movements of the different grippers, members threaded on said rods, means for turning the rods relatively to said members simultaneously to vary the limits of the foredrawing movements of the grippers, and additional means for turning said members each independently of the other further to adjust the rods and thereby to vary the limits of said foredrawing movements.

92. In a shoe machine, grippers for pulling an upper over a last respectively at the opposite sides of the last, means for effecting relative movement of said grippers and the last to pull the upper heightwise of the last, mechanisms for imparting respectively to said different grippers foredrawing movements lengthwise of the last, and members arranged to act as stops on said mechanisms to limit respectively the foredrawing movements of the different grippers, each of said mechanisms including a spring yieldable in response to further movement of a portion of the mechanism after the gripper operated thereby has been brought to a stop.

93. In a shoe machine, grippers for pulling an upper over a last respectively at the opposite sides of the last, means for effecting relative movement of said grippers and the last to pull the upper heightwise of the last, mechanisms for imparting respectively to said different grippers foredrawing movements lengthwise of the last, means for adjusting said mechanisms to vary the positions of the grippers lengthwise of the last, members arranged to act as stops to limit respectively the foredrawing movements of the different grippers, and means for adjusting said members to vary the limits of said foredrawing movements.

94. In a shoe machine, grippers for pulling an upper over a last respectively at the opposite sides of the last, means for effecting relative movement of said grippers and the last to pull the upper heightwise of the last, mechanisms for imparting respectively to said different grippers foredrawing movements lengthwise of the last, a member common to said different mechanisms for operating them to adjust both said grippers simultaneously in the same direction lengthwise of the last, members arranged to act as stops to limit respectively the foredrawing movements of the different grippers, and means for adjusting said members independently of each other to vary the limits of said foredrawing movements.

95. In a shoe machine, grippers for pulling an upper over a last respectively at the opposite sides of the last, means for effecting relative movement of said grippers and the last to pull the upper heightwise of the last, means for imparting to said grippers foredrawing movements lengthwise of the last, and additional means for thereafter imparting to the grippers secondary foredrawing movements.

96. In a shoe machine, grippers for pulling an upper over a last respectively at the opposite sides of the last, means for effecting relative movement of said grippers and the last to pull the upper heightwise of the last, members associated respectively with said different grippers for imparting to them foredrawing movements lengthwise of the last, cam-operated mechanism for operating said members to impart such foredrawing movements to the grippers, and additional cam-operated mechanism for thereafter further operating said members to impart to the grippers secondary foredrawing movements.

97. In a shoe machine, grippers for pulling an upper over a last respectively at the opposite sides of the last, means for effecting relative movement of said grippers and the last to pull the upper heightwise of the last, members connected respectively to said different grippers for imparting to them foredrawing movements lengthwise of the last, said members each having a pinion rotatably mounted thereon, different pairs of operating mechanisms associated respectively with said different members, the mechanisms of each pair engaging the corresponding pinion respectively at its opposite sides, means for moving one of each of said pairs of mechanisms to operate the corresponding members through the pinions, and means for thereafter moving the other of each of said pairs of mechanisms again to operate the corresponding members through the pinions.

98. In a shoe machine, grippers for pulling an upper over a last respectively at the opposite sides of the last, means for effecting relative movement of said grippers and the last to pull the upper heightwise of the last, means for imparting to said grippers foredrawing movements lengthwise of the last, stop mechanism for limiting said foredrawing movements of the grippers, additional means for thereafter imparting to said grippers secondary foredrawing movements, and additional stop mechanism for limiting such secondary movements of the grippers.

99. In a shoe machine, grippers for pulling an upper over a last respectively at the opposite sides of the last, means for effecting relative movement of said grippers and the last to pull the upper heightwise of the last, mechanisms for imparting to said grippers foredrawing movements lengthwise of the last, members arranged to act as stops to limit respectively the foredrawing movements of the different grippers, additional mechanisms for thereafter imparting to said grippers secondary foredrawing movements, and other members associated with said additional mechanisms and arranged to act as stops to limit such secondary movements of the grippers.

100. In a shoe machine, grippers for pulling an upper over a last respectively at the opposite sides of the last, means for effecting relative movement of said grippers and the last to pull the upper heightwise of the last, means for imparting to said grippers foredrawing movements lengthwise of the last and for thereafter imparting to them secondary foredrawing movements, and stop mechanisms adjustable independently of each other for limiting respectively said first-mentioned foredrawing movements and said secondary movements.

101. In a shoe machine, grippers for pulling an upper over a last respectively at the opposite sides of the last, means for effecting relative movement of said grippers and the last to pull the upper heightwise of the last, mechanisms for imparting to said grippers foredrawing movements lengthwise of the last, members arranged to act as stops to limit respectively the foredrawing movements of the different grippers and adjustable to vary the limits of said movements, additional mechanisms for thereafter imparting to said grippers secondary foredrawing movements, other members arranged to act as stops to limit said secondary movements of the grippers, and means for adjusting said other members independently of each other to vary the limits of the secondary movements.

102. In a shoe machine, grippers for pulling an upper over a last respectively at the opposite sides of the last in the vicinity of the tip line, other grippers for pulling the upper over the last respectively at the end of the toe and the corners of the toe, a member common to said tip-line grippers for adjusting them both simultaneously in the same direction lengthwise of the last, and members associated respectively with said other grippers for adjusting them lengthwise of the last independently of one another.

103. In a shoe machine, grippers for pulling an upper over a last respectively at the opposite sides of the last in the vicinity of the tip line, other grippers for pulling the upper over the last respectively at the opposite sides of the ball portion of the last, a member common to said tip-line grippers for adjusting them both simultaneously in the same direction lengthwise of the last independently of said ball grippers, and members associated respectively with said ball grippers for adjusting them lengthwise of the last independently of each other.

104. In a shoe machine, a plurality of grippers for pulling an upper over a last respectively in different locations about the forepart of the last, sleeves in which said grippers are sliding mounted for upper-pulling movements heightwise of the last, means providing bearings for said sleeves to permit them to swing with the grippers, and members connected to portions of said sleeves located at the opposite sides of said bearings from the last to control them with respect to such swinging movements.

105. In a shoe machine, a plurality of grippers for pulling an upper over a last respectively in different locations about the forepart of the last, sleeves in which said grippers are slidingly mounted for upper-pulling movements heightwise of the last, means providing bearings for said sleeves to permit them to swing with the grippers in directions lengthwise of the last, and members connected to portions of said sleeves located at the opposite sides of said bearings from the last to impart such swinging movements to the sleeves and grippers.

106. In a shoe machine, grippers for pulling an upper over a last respectively at the opposite sides of the last, guide members in which said grippers are slidingly mounted for upper-pulling movements heightwise of the last, means providing bearings for said guide members to permit them to swing with the grippers in directions widthwise of the last, and members connected to portions of said guide members located at the opposite sides of said bearings from the last to control them with respect to such swinging movements.

107. In a shoe machine, grippers for pulling c, upper over a last respectively at the opposite si_es of the last, guide members in which said grippers are slidingly mounted for upper-pulling movements heightwise of the last, means providing bearings for said guide members to permit them to swing with the grippers in directions widthwise of the last, and members connected to portions of said guide members located at the opposite sides of said bearings from the last for adjusting said guide members and grippers widthwise of the last by swinging them.

108. In a shoe machine, grippers for pulling an upper over a last respectively at the opposite sides of the last, guide members in which said grippers are slidingly mounted for upper-pulling movements heightwise of the last, means providing universal bearings for said guide members to permit them to swing with the grippers in directions both lengthwise and widthwise of the last, members connected to portions of said guide members located at the opposite sides of said bearings from the last to control them with respect to swinging movements lengthwise of the last, and other members connected to the same portions of said guide members for controlling them with respect to swinging movements widthwise of the last.

109. In a shoe machine, grippers for pulling an upper over a last respectively at the opposite sides of the last, guide members in which said grippers are slidingly mounted for upper-pulling movements heightwise of the last, means providing universal bearings for said guide members to permit them to swing with the grippers in directions both lengthwise and widthwise of the last, members connected to portions of said guide members located at the opposite sides of said bearings from the last for adjusting the grippers lengthwise of the last, and other members connected to the same portions of said guide members for adjusting the grippers widthwise of the last.

110. In a shoe machine, grippers for pulling an upper over a last respectively at the opposite sides of the last, means for effecting relative movement of said grippers and the last to pull the upper heightwise of the last, the grippers being mounted for movements widthwise of the last, levers associated respectively with said different grippers and each fulcrumed between its opposite ends, means connecting one arm of each lever to the corresponding gripper, and spring means controlling the other arms of said levers and against the resistance of which the grippers are movable widthwise of the last in response to pull of the upper thereon.

111. In a shoe machine, grippers for pulling an upper over a last respectively at the opposite sides of the last, means for effecting relative movement of said grippers and the last to pull the upper heightwise of the last, the grippers being mounted for movements widthwise of the last, spring mechanisms arranged respectively to control said different grippers and against the resistance of which the grippers are movable widthwise of the last in response to pull of the upper thereon, and a member common to said spring mechanisms for varying their resistance to such movements of the grippers.

112. In a shoe machine, grippers for pulling an upper over a last respectively at the opposite sides of the last, means for effecting relative movement of said grippers and the last to pull the upper heightwise of the last, the grippers being mounted for movements widthwise of the last, levers associated respectively with said different grippers, means connecting said levers to the corresponding grippers, spring mechanisms arranged respectively to control said different levers and against the resistance of which the grippers are movable widthwise of the last in response to pull of the upper thereon, and a member common to said spring mechanisms for varying their resistance to such movements of the grippers.

113. In a shoe machine, grippers for pulling an upper over a last respectively at the opposite sides of the last, means for effecting relative movement of said grippers and the last to pull the upper heightwise of the last, the grippers being mounted for movements widthwise of the last, levers associated respectively with said different grippers, means connecting said levers to the corresponding grippers, spring mechanisms arranged respectively to control said different levers and each comprising a pair of springs of different strengths yieldable to permit movements of the grippers widthwise of the last in response to pull of the upper thereon, each of said spring mechanisms being adjustable to render either of its pair of springs selectively effective thus to control the gripper, and means common to said spring mechanisms for adjusting them simultaneously.

114. In a shoe machine, grippers for pulling an upper over a last respectively at the opposite sides of the last, means for effecting relative movement of said grippers and the last to pull the upper heightwise of the last, the grippers being mounted for movements widthwise of the last, levers associated respectively with said different grippers, members providing fulcrums for said levers, connections between the levers and the corresponding grippers, spring means controlling the levers and against the resistance of which the grippers are movable widthwise of the last in response to pull of the upper thereon, and means for moving said fulcrum members to adjust the grippers widthwise of the last.

115. In a shoe machine, grippers for pulling an upper over a last respectively at the opposite sides of the last, means for effecting relative movement of said grippers and the last to pull the upper heightwise of the last, the grippers being mounted for movements widthwise of the last, levers associated respectively with said different grippers, rods providing fulcrums for said levers, connections between the levers and the corresponding grippers, spring means controlling the levers and against the resistance of which the grippers are movable widthwise of the last in response to pull of the upper thereon, and members threaded on said rods for moving the rods lengthwise to adjust the grippers widthwise of the last.

116. In a shoe machine, a pair of grippers for pulling an upper respectively in different locations along one side of a last, another pair of grippers for pulling the upper respectively in different locations along the other side of the last, means for effecting relative movement of said grippers and the last to pull the upper heightwise of the last, and mechanisms associated respectively with said different pairs of grippers for adjusting them widthwise of the last, each of said mechanisms comprising members arranged to be moved in unison to adjust both grippers simultaneously or to permit movement of one member alone to adjust only one of the pair of grippers.

117. In a shoe machine, a pair of grippers for pulling an upper respectively in different locations along one side of a last, another pair of grippers for pulling the upper respectively in different locations along the other side of the last, means for effecting relative movement of said grippers and the last to pull the upper heightwise of the last, and mechanisms associated respectively with said different pairs of grippers for adjusting them widthwise of the last, each of said mechanisms comprising rotatable adjusting members and means for connecting them together for movements in unison to adjust both grippers simultaneously or for disconnecting them to permit adjustment of only one of the pair of grippers by movement of one of the members alone.

118. In a shoe machine, wipers for embracing an upper around an end of a last and for wiping the upper inwardly over the bottom of the last, a wiper carrier movable to advance said wipers bodily lengthwise of the last, wiper-closing mechanisms connected to the wipers and comprising members supported independently of the wiper carrier for swinging the wipers to close them widthwise of the last, means for adjusting the wiper carrier and wipers lengthwise of the last, and means for effecting a compensating adjustment of said members simultaneously with the adjustment of the wiper carrier to maintain the wipers in substantially the same relation to each other as the carrier is thus adjusted.

119. In a shoe machine, wipers for embracing an upper around an end of a last and for wiping the upper inwardly over the bottom of the last, a wiper carrier movable to advance said wipers bodily lengthwise of the last, a lever for thus operating the wiper carrier, the fulcrum of said lever being movable to adjust the wiper carrier and wipers lengthwise of the last, wiper-closing mechanisms connected to the wipers and including levers supported independently of the wiper carrier for swinging the wipers to close them widthwise of the last, and means for moving the fulcrums of said wiper-closing levers simultaneously with the fulcrum of said first-named lever to maintain the wipers in substantially the same relation to each other during adjustment of the wiper carrier.

120. In a shoe machine, wipers for embracing an upper around an end of a last and for wiping the upper inwardly over the bottom of the last, a wiper carrier movable to advance said wipers bodily lengthwise of the last, a lever for thus operating the wiper carrier, an eccentric on which said lever is fulcrumed, wiper-closing mechanisms connected to the wipers and including levers supported independently of the wiper carrier for swinging the wipers to close them widthwise of the last, other eccentrics on which said wiper-closing levers are fulcrumed, and mechanism common to all said eccentrics for moving them simultaneously to adjust the wiper carrier and wipers lengthwise of the last and to maintain the wipers in substantially the same relation to each other during such adjustment of the wiper carrier.

121. In a shoe machine, wipers for embracing an upper around an end of a last and for wiping the upper inwardly over the bottom of the last, a wiper carrier movable to advance said wipers bodily lengthwise of the last, wiper holders supporting the wipers and mounted on said wiper carrier for swinging movements to close the wipers widthwise of the last, levers fulcrumed on the wiper carrier and arranged to extend widthwise of the last, links connecting said levers respectively to the different wiper holders, and members connected to said levers for operating them independently of the movement of the wiper carrier to impart wiper-closing movements to the wiper holders.

122. In a shoe machine, wipers for embracing an upper around an end of a last and for wiping the upper inwardly over the bottom of the last, a wiper carrier movable to advance said wipers bodily lengthwise of the last, wiper holders supporting the wipers and mounted on said wiper carrier for swinging movements to close the wipers widthwise of the last, levers each fulcrumed at one end on the wiper carrier, links connecting the other ends of said levers to the wiper holders, and members connected to said levers between the opposite ends of the levers for operating them independently of the movement of the wiper carrier to impart wiper-closing movements to the wiper holders.

123. In a shoe machine, wipers for embracing an upper around an end of a last and for wiping the upper inwardly over the bottom of the last, a wiper carrier movable to advance said wipers bodily lengthwise of the last, wiper holders supporting the wipers and mounted on said wiper carrier for swinging movements to close the wipers widthwise of the last, levers connected to said wiper holders, members movable with said wiper carrier and providing fulcrums for said levers, and means for operating the levers to impart wiper-closing movements to the wiper holders, said fulcrum members being adjustable relatively to the wiper carrier to vary the initial positions of the wipers by swinging said levers.

124. In a shoe machine, wipers for embracing an upper around an end of a last and for wiping the upper inwardly over the bottom of the last, a wiper carrier movable to advance said wipers bodily lengthwise of the last, wiper holders supporting the wipers and mounted on said wiper carrier for swinging movements to close the wipers widthwise of the last, levers arranged to extend widthwise of the last and connected respectively at their outer ends to the wiper holders, members movable with the wiper carrier and providing fulcrums for the inner ends of said levers, means connected to the levers between their opposite ends for operating them to impart wiper-closing movements to the wiper holders, and means for adjusting said fulcrum members relatively to the wiper carrier to vary the initial positions of the wipers by swinging said levers.

125. In a shoe machine, wipers for embracing an upper around an end of a last and for wiping the upper inwardly over the bottom of the last, a wiper carrier movable to advance said wipers bodily lengthwise of the last, wiper holders supporting the wipers and mounted on said wiper carrier for swinging movements to close the wipers widthwise of the last, levers connected respectively to the different wiper holders, members movable with the wiper carrier and providing fulcrums for said levers, means connected to the levers for operating them to impart wiper-closing movements to the wiper holders, rods rotatably supported on said wiper carrier and on which said fulcrum members are threaded, and mechanisms for turning said rods each independently of the other to adjust the fulcrum members and thereby vary the initial positions of the wipers by swinging the levers.

126. In a shoe machine, wipers for embracing an upper around an end of a last and for wiping the upper inwardly over the bottom of the last, a wiper carrier movable to advance said wipers bodily lengthwise of the last, means for swinging the wipers independently of the movement of the wiper carrier to close them widthwise of the last, and stop mechanism for adjustably limiting independently of the shoe the closing of the wipers.

127. In a shoe machine, wipers for embracing an upper around an end of a last and for wiping the upper inwardly over the bottom of the last, a wiper carrier movable to advance said wipers bodily lengthwise of the last, means for swinging the wipers independently of the movement of the wiper carrier to close them widthwise of the last, and devices associated respectively with the different wipers and arranged to act as stops to limit independently of the shoe the closing of the wipers, each of said devices being adjustable independently of the other to vary the limit of movement of the wiper controlled thereby.

128. In a shoe machine, wipers for embracing an upper around an end of a last and for wiping the upper inwardly over the bottom of the last, a wiper carrier movable to advance said wipers bodily lengthwise of the last, wiper-closing mechanisms connected respectively to the different wipers for closing them widthwise of the last, and devices associated respectively with the different wipers and arranged to act as stops to limit independently of the shoe the closing of the wipers, each of said wiper-closing mechanisms including a spring yieldable in response to further movement of a portion of the mechanism after the movement of the wiper operated thereby has thus been stopped.

129. In a shoe machine, wipers for embracing an upper around an end of a last and for wiping the upper inwardly over the bottom of the last, a wiper carrier movable to advance said wipers bodily lengthwise of the last, wiper holders supporting the wipers and mounted on said wiper carrier for swinging movements to close the wipers widthwise of the last, wiper-closing mechanisms comprising links connected to said wiper holders for operating them to close the wipers widthwise of the last, and devices supported on the wiper carrier and arranged to act as stops on said links to limit the closing movements of the wipers.

130. In a shoe machine, wipers for embracing an upper around an end of a last and for wiping the upper inwardly over the bottom of the last, a wiper carrier movable to advance said wipers bodily lengthwise of the last, wiper holders supporting the wipers and mounted on said wiper carrier for swinging movements to close the wipers widthwise of the last, levers fulcrumed on the wiper carrier, links connecting said levers to the wiper holders, means for operating the levers independently of the movement of the wiper carrier to impart wiper-closing movements to the wiper holders, and devices arranged to act as stops to limit respectively the wiper-closing movements of the different levers.

131. In a shoe machine, wipers for embracing an upper around an end of a last and for wiping the upper inwardly over the bottom of the last, a wiper carrier movable to advance said wipers bodily lengthwise of the last, wiper-closing mechanisms connected respectively to the different wipers for closing them widthwise of the last, each of said wiper-closing mechanisms being adjustable to vary the initial position of the wiper operated thereby, devices associated respectively with the different wiper-closing mechanisms and arranged to act as stops to limit independently of the shoe the closing of the wipers, and adjusting means common to each wiper-closing mechanism and the stop device associated therewith for adjusting said mechanism and for also simultaneously adjusting said device to vary the limit of closing movement of the wiper.

132. In a shoe machine, wipers for embracing an upper around an end of a last and for wiping the upper inwardly over the bottom of the last, a wiper carrier movable to advance said wipers bodily lengthwise of the last, wiper-closing mechanisms comprising levers fulcrumed on the wiper carrier and connected respectively to the different wipers for closing them widthwise of the last, the fulcrums of said levers being adjustable to vary the initial positions of the wipers, devices associated respectively with the different wiper-closing mechanisms and arranged to act as stops to limit independently of the shoe the closing of the wipers, mechanisms arranged respectively to adjust said different devices independently of each other to vary the limits of the closing movements of the wipers, and means for simultaneously adjusting the fulcrums of the corresponding wiper-closing levers by the movements of said adjusting mechanisms.

133. In a shoe machine, wipers for embracing an upper around an end of a last and for wiping the upper inwardly over the bottom of the last, a wiper carrier movable to advance said wipers bodily lengthwise of the last, wiper-closing mechanisms connected respectively to the different wipers for closing them widthwise of the last, each of said wiper-closing mechanisms being adjustable to vary the initial position of the wiper operated thereby, devices associated respectively with the different wiper-closing mechanisms and arranged to act as stops to limit independently of the shoe the closing of the wipers, each of said devices having a member associated therewith for adjusting it to vary the limit of the closing movement of the wiper, and means for rendering each said member either effective or ineffective to adjust simultaneously the corresponding wiper-closing mechanism.

134. In a shoe machine, wipers for embracing an upper around an end of a last and for wiping the upper inwardly over the bottom of the last, a wiper carrier movable to advance said wipers bodily lengthwise of the last, wiper-closing mechanisms comprising levers connected respectively to the different wipers for closing them widthwise of the last, members movable with the wiper carrier and on which said levers are fulcrumed, said members being adjustable to vary the initial positions of the wipers, devices associated respectively with the different wiper-closing mechanisms and arranged to act as stops to limit independently of the shoe the closing of the wipers, members associated respectively with said different devices for adjusting them to vary the limits of the closing movements of the wipers, and mechanisms for connecting said adjusting members to the corresponding fulcrum members for adjusting the latter simultaneously with said devices or for disconnecting the adjusting members from the fulcrum members to permit said devices alone to be adjusted.

135. In a shoe machine, wipers for embracing an upper around an end of a lost and for wiping the upper inwardly over the bottom of the last, a wiper carrier movable to advance said wipers bodily lengthwise of the last, wiper-closing mechanisms connected respectively to the different wipers for closing them widthwise of the last independently of the movement of the wiper carrier, and devices arranged to act independently of the shoe as stops to limit respectively the movement of the wiper carrier and the movements of the wiper-closing mechanisms.

136. In a shoe machine, wipers for embracing an upper around an end of a last and for wiping the upper inwardly over the bottom of the last, a wiper carrier movable to advance said wipers bodily lengthwise of the last, wiper-closing mechanisms connected respectively to the different wipers for closing them widthwise of the last independently of the movement of the wiper carrier, devices arranged to act independently of the shoe as stops to limit respectively the movement of the wiper carrier and the movements of the wiper-closing mechanisms, and means for adjusting said devices independently of one another to vary the limits of movement of the wipers.

137. In a shoe machine, wipers for wiping the marginal portion of an upper inwardly over the bottom of a last around the toe end of the last and for applying pressure to the upper heightwise of the last, a holder for engaging the upper at the top of the forepart to support the last against such pressure of the wipers on the upper, spring mechanisms through which respectively the wipers are thus pressed on the upper and the holder is pressed on the top of the upper, and means comprising a member common to both said spring mechanisms for adjusting them simultaneously to increase the pressures applied by both the wipers and the holder in operating on a shoe or to decrease said pressures.

138. In a shoe machine, wipers for wiping the marginal portion of an upper inwardly over the bottom of a last around the toe end of the last and for applying pressure to the upper heightwise of the last, a holder for engaging the upper at the top of the forepart to support the last against such pressure of the wipers on the upper, spring mechanisms through which respectively the wipers are thus pressed on the upper and the holder is pressed on the top of the upper, each of said spring mechanisms comprising a pair of springs of different strengths and means adjustable to render either of said springs selectively effective in the pressure-applying operation, and adjusting means compirsing a member common to both said mechanisms for adjusting them either to render the stronger springs of both mechanisms or their weaker springs simultaneously effective in operating on a shoe.

139. In a shoe machine, wipers formed to embrace an upper around an end of a last and movable to wipe the marginal portion of the upper inwardly over the bottom of the last, fastening-inserting devices movable relatively to said wipers inwardly toward their wiping edges into positions to drive fastenings to fasten the upper, said devices including drivers for driving the fastenings, an operating device mounted for movement heightwise of the last, and means for moving said fastening-inserting devices inwardly into their fastening-inserting positions and for also operating the drivers to drive the fastenings in response to that movement of said operating device.

140. In a shoe machine, wipers formed to embrace an upper around an end of a last and movable to wipe the marginal portion of the upper inwardly over the bottom of the last, fastening-inserting devices movable relatively to said wipers inwardly toward their wiping edges into positions to drive fastenings to fasten the upper, said devices including drivers for driving the fastenings, an operating device mounted for movement heightwise of the last in a direction away from the last, and mechanisms associated respectively with said different fastening-inserting devices for moving them inwardly into their fastening-inserting positions in response to that movement of said operating device and for then operating the drivers to drive the fastenings in response to further movement of said operating device in the same direction.

141. In a shoe machine, wipers formed to embrace an upper around an end of a last and movable to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings, an operating device mounted for movement heightwise of the last in a direction away from the last, controlling mechanisms associated respectively with said different fastening-inserting devices, and springs for operating said mechanisms to move the fastening-inserting devices inwardly into their fastening-inserting positions in response to the movement of said operating device in a direction away from the last, said mechanisms being connected to the drivers for operating them to drive the fastenings by further movement of said operating device in the same direction.

142. In a shoe machine, wipers formed to embrace an upper around an end of a last and movable to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings, an operating device mounted for movement heightwise of the last in a direction away from the last, controlling mechanisms associated respectively with said different fastening-inserting devices, springs tending to operate said controlling mechanisms to move the fastening-inserting devices inwardly into their fastening-inserting positions, and means arranged to act on said mechanisms to hold the fastening-inserting devices initially retracted and to release said mechanisms to permit their operation by the springs in response to the movement of said operating device in a direction away from the last, said mechanisms being connected to the drivers for operating them to drive the fastenings by further movement of said operating device in the same direction.

143. In a shoe machine, wipers formed to embrace an upper around an end of a last and movable to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings, an operating device mounted for movement heightwise of the last in a direction away from the last, levers associated respectively with said different fastening-inserting devices and fulcrumed on said operating device, and means for swinging said levers to move the fastening-inserting devices inwardly into their fastening-inserting positions in response to the movement of said operating device in a direction away from the last, said levers being movable bodily to operate the drivers to drive the fastenings in response to further movement of said operating device in the same direction.

144. In a shoe machine, wipers formed to embrace an upper around an end of a last and movable to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings, an operating device mounted for movement heightwise of the last in a direction away from the last, levers fulcrumed on said operating device for swinging movements to move the fastening-inserting devices inwardly into their fastening-inserting positions, springs tending thus to swing said levers, and means arranged to act on the levers to hold the fastening-inserting devices initially retracted and to release the levers to permit their operation by the springs in response to the movement of said operating device in a direction away from the last, said levers being movable bodily to operate the drivers to drive the fastenings by further movement of said operating device in the same direction.

145. In a shoe machine, wipers formed to embrace an upper around an end of a last and movable to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings and levers for operating the drivers, an operating device mounted for movement heightwise of the last in a direction away from the last, mechanisms connected to said levers for operating them to drive the fastenings by that movement of said operating device, and means for operating said mechanisms to move the fastening-inserting devices inwardly into their fastening-inserting positions in response to that movement of said operating device prior to the driving of the fastenings.

146. In a shoe machine, wipers formed to embrace an upper around an end of a last and movable to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings and levers for operating the drivers, an operating device mounted for movement heightwise of the last in a direction away from the last, mechanisms connected to said levers for operating them to drive the fastenings by that movement of said operating device, said mechanisms being mounted for swinging movements to move the fastening-inserting devices inwardly into their fastening-inserting positions, and means for thus swinging said mechanisms in response to that movement of said operating device prior to the driving of the fastenings.

147. In a shoe machine, wipers formed to embrace an upper around an end of a last and movable to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings and levers for operating the drivers, an operating device mounted for movement heightwise of the last in a direction away from the last, mechanisms connected to said levers for operating them to drive the fastenings by that movement of said operating device, said mechanisms being mounted on the operating device for swinging movements to move the fastening-inserting devices inwardly into their fastening-inserting positions, means arranged to act on said mechanisms to hold the fastening-inserting devices initially retracted and to release them for swinging movements in response to that movement of the operating device, and springs for swinging said mechanisms when they are thus released.

148. In a shoe machine, wipers formed to embrace an upper around an end of a last and movable in curved paths to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings, an operating device mounted for movement heightwise of the last, said device comprising members movable in paths curved similarly to the paths of movement of the wipers, means for thus moving said members with the wipers, and mechanisms controlled by said members for moving said fastening-inserting devices inwardly into their fastening-inserting positions in response to the movement of said operating device heightwise of the last and for then operating the drivers to drive the fastenings in response to further movement of said operating device in the same direction.

149. In a shoe machine, wipers formed to embrace an upper around an end of a last and movable in curved paths to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings, an operating device mounted for movement heightwise of the last in a direction away from the last, said operating device comprising members movable in paths curved similarly to the paths of movement of the wipers, means for thus moving said members with the wipers, controlling mechanisms mounted on said members and associated respectively with said different fastening-inserting devices, and means for operating said mechanisms to move the fastening-inserting devices inwardly into their fastening-inserting positions in response to the movement of said operating device in a direction away from the last, said mechanisms being connected to the drivers for operating them to drive the fastenings by further movement of said operating device in the same direction.

150. In a shoe machine, wipers formed to embrace an upper around an end of a last and movable in curved paths to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings, an operating device mounted for movement heightwise of the last in a direction away from the last, said operating device comprising members movable in paths curved similarly to the paths of movement of the wipers, means for thus moving said members with the wipers, levers supported on said members for swinging movements to move the fastening-inserting devices inwardly into their fastening-inserting positions, and springs for thus swinging said levers in response to the movement of said operating device in a direction away from the last, said levers being movable bodily to operate the drivers to drive the fastenings by further movement of said operating device in the same direction.

151. In a shoe machine, wipers formed to embrace an upper around an end of a last and movable in curved paths to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings and levers for operating the drivers, an operating device mounted for movement heightwise of the last in a direction away from the last, said operating device comprising members movable in paths curved similarly to the paths of movement of the wipers, means for thus moving said members with the wipers, mechanisms mounted on said members and connected to said levers for operating them to drive the fastenings by the movement of said operating device in a direction away from the last, and means for operating said mechanisms to move the fastening-inserting devices inwardly into their fastening-inserting positions in response to that movement of said operating device prior to the driving of the fastenings.

152. In a shoe machine, wipers formed to embrace an upper around an end of a last for wiping the marginal portion of the upper inwardly over the bottom of the last, a wiper carrier supporting said wipers and movable to advance them bodily lengthwise of the last, the wipers being movable relatively to said carrier widthwise of the last, fastening-inserting devices movable with said wipers and also movable relatively to the wipers inwardly toward their wiping edges into positions to drive fastenings to fasten the upper, said devices including drivers for driving the fastenings, an operating device movable with said wiper carrier and also movable relatively to the carrier heightwise of the last, and means for moving said fastening-inserting devices inwardly into their fastening-inserting positions and for also operating the drivers to drive the fastenings in response to the movement of said operating device heightwise of the last.

153. In a shoe machine, wipers formed to embrace an upper around an end of a last for wiping the marginal portion of the upper inwardly over the bottom of the last, a wiper carrier supporting said wipers and movable to advance them bodily lengthwise of the last, the wipers being movable relatively to said carrier widthwise of the last, fastening-inserting devices movable with said wipers and also movable relatively to the wipers inwardly toward their wiping edges into positions to drive fastenings to fasten the upper, said devices including drivers for driving the fastenings, an operating device movable with said wiper carrier, levers supported on said wiper carrier for moving said operating device relatively to the carrier heightwise of the last, and mechanisms associated respectively with said different fastening-inserting devices for moving them inwardly into their fastening-inserting positions in response to the movement of said operating device heightwise of the last and for then operating the drivers to drive the fastenings in response to further movement of said operating device in the same direction.

154. In a shoe machine, wipers formed to embrace an upper around an end of a last for wiping the marginal portion of the upper inwardly over the bottom of the last, a wiper carrier supporting said wipers and movable to advance them bodily lengthwise of the last, the wipers being movable relatively to said carrier widthwise of the last, fastening-inserting devices movable with said wipers and also movable relatively to the wipers inwardly toward their wiping edges into positions to drive fastenings to fasten the upper, said devices including drivers for driving the fastenings, an operating device supported on said wiper carrier to move therewith lengthwise of the last, said operating device being also movable relatively to the carrier heightwise of the last in a direction away from the last, and mechanisms associated respectively with said different fastening-inserting devices for moving them inwardly into their fastening-inserting positions in response to the movement of said operating device in a direction away from the last and for then operating the drivers to drive the fastenings in response to further movement of said operating device in the same direction.

155. In a shoe machine, wipers formed to embrace an upper around an end of a last, a wiper carrier supporting said wipers and movable to advance them bodily lengthwise of the last, the wipers being movable relatively to said carrier in curved paths to wipe the marginal portion of the upper inwardly over the bottom of the last, fastening-inserting devices movable with said wipers and also movable relatively to the wipers inwardly toward their wiping edges into positions to drive fastenings to fasten the upper, said devices including drivers for driving the fastenings, an operating device movable with said wiper carrier and also movable relatively to the carrier heightwise of the last in a direction away from the last, said operating device comprising members movable in paths curved similarly to the paths of movement of the wipers, means for thus moving said members with the wipers, and mechanisms controlled by said members for moving said fastening-inserting devices inwardly into their fastening-inserting positions in response to the movement of said operating device in a direction away from the last and for then operating the drivers to drive the fastenings in response to further movement of said operating device in the same direction.

156. In a shoe machine, the combination with means for supporting a last bottom downward, of wipers formed to embrace an upper around an end of the last and movable to wipe the marginal portion of the upper inwardly over the bottom of the last, a wiper carrier supporting said wipers and movable to advance them bodily lengthwise of the last, fastening-inserting devices movable relatively to said wipers inwardly toward their wiping edges into positions to drive fastenings to fasten the upper, said devices including drivers for driving the fastenings, an operating device positioned below said wiper carrier and movable relatively to the carrier heightwise of the last, and means for moving said fastening-inserting devices inwardly into their fastening-inserting positions and for also operating the drivers to drive the fastenings in response to movement of said operating device heightwise of the last.

157. In a shoe machine, the combination with means for supporting a last bottom downward, of wipers formed to embrace an upper around an end of the last and movable to wipe the marginal portion of the upper inwardly over the bottom of the last, a wiper carrier supporting said wipers and movable to advance them bodily lengthwise of the last, fastening-inserting devices movable relatively to said wipers inwardly toward their wiping edges into positions to drive fastenings to fasten the upper, said devices including drivers for driving the fastenings, an operating device positioned below said wiper carrier and movable downward relatively to the carrier, and mechanisms associated respectively with said different fastening-inserting devices for moving them inwardly into their fastening-inserting positions in response to the downward movement of said operating device and for then operating the drivers to drive the fastenings in response to further downward movement of said device.

158. In a shoe machine, the combination with means for supporting a last bottom downward, of wipers formed to embrace an upper around an end of the last for wiping the marginal portion of the upper inwardly over the bottom of the last, wiper holders supporting said wipers and movable in curved paths to close the wipers inwardly widthwise of the last, fastening-inserting devices supported on said wiper holders to move with the wipers and also movable relatively to the wipers inwardly toward their wiping edges into positions to drive fastenings to fasten the upper, said devices including drivers for driving the fastenings, an operating device positioned below said wiper holders and movable heightwise of the last, and means for moving said fastening-inserting devices inwardly into their fastening-inserting positions and for also operating the drivers to drive the fastenings in response to the movement of said operating device heightwise of the last.

159. In a shoe machine, the combination with means for supporting a last bottom downward, of wipers formed to embrace an upper around an end of the last for wiping the marginal portion of the upper inwardly over the bottom of the last, wiper holders supporting said wipers and movable in curved paths to close the wipers inwardly widthwise of the last, fastening-inserting devices supported on said wiper holders to move with the wipers and also movable relatively to the wipers inwardly toward their wiping edges into positions to drive fastenings to fasten the upper, said devices including drivers for driving the fastenings, an operating device positioned below said wiper holders and movable heightwise of the last, and mechanisms controlled by said operating device for moving said fastening-inserting devices inwardly into their fastening-inserting positions in response to downward movement of said operating device and for then operating the drivers to drive the fastenings in response to further downward movement of said device.

160. In a shoe machine, the combination with means for supporting a last bottom downward, of wipers formed to embrace an upper around an end of the last for wiping the marginal portion of the upper inwardly over the bottom of the last, wiper holders supporting said wipers and movable in curved paths to close the wipers inwardly widthwise of the last, fastening-inserting devices supported on said wiper holders to move with the wipers and also movable relatively to the wipers inwardly toward their wiping edges into positions to drive fastenings to fasten the upper, said devices including drivers for driving the fastenings, an operating device positioned below said wiper holders and movable heightwise of the last, said operating device comprising members movable in paths curved similarly to the paths of movement of the wiper holders, means for thus moving said members with the wiper holders, and mechanisms supported on said members for moving said fastening-inserting devices inwardly into their fastening-inserting positions in response to downward movement of said operating device and for then operating the drivers to drive the fastenings in response to further downward movement of said device.

161. In a shoe machine, wipers formed to embrace an upper around an end of a last and movable to wipe the marginal portion of the upper inwardly over the bottom of the last, fastening-inserting devices comprising drivers and levers for operating said drivers to drive fastenings to fasten the upper, an operating device mounted for movement heightwise of the last in a direction away from the last, and means for operating said levers to drive the fastenings by that movement of said operating device.

162. In a shoe machine, wipers formed to embrace an upper around an end of a last and movable in curved paths to wipe the marginal portion of the upper inwardly over the bottom of the last, fastening-inserting devices movable with said wipers, said fastening-inserting devices comprising drivers and levers for operating said drivers to drive fastenings to fasten the upper, an operating device mounted for movement heightwise of the last in a direction away from the last and comprising members movable in paths curved similarly to the paths of movement of the wipers, means for thus moving said members with the wipers, and connections between said members and levers for operating the levers to drive the fastenings by the movement of said operating device in a direction away from the last.

163. In a shoe machine, wipers formed to embrace an upper around an end of a last and movable to wipe the marginal portion of the upper inwardly over the bottom of the last, members movable with said wipers and movable also relatively to the wipers inwardly toward their wiping edges into operative positions and outwardly to retracted positions, said members having pockets therein to receive fastenings and fingers for guiding fastenings driven from said pockets, drivers for driving the fastenings to fasten the upper when said members are in their operative positions, and other members movable inwardly and outwardly with said first-named members and relatively to which also the latter are further movable in both directions, said other members being arranged to control said fingers to permit delivery of fastenings into the pockets when said first-named members are in their retracted positions.

164. In a shoe machine, wipers formed to embrace an upper around an end of a last and movable to wipe the marginal portion of the upper inwardly over the bottom of the last, wiper holders supporting said wipers and movable to close the wipers inwardly widthwise of the last, slides carried by said wiper holders and movable relatively thereto inwardly toward the edges of the wipers into operative positions and outwardly to retracted positions, said slides having pockets therein to receive fastenings and fingers for guiding fastenings driven from said pockets, drivers for driving the fastenings to fasten the upper when the slides are in their operative positions, and bars movable inwardly and outwardly with said slides and relatively to which also the slides are further movable in both directions, said bars being arranged to control said fingers to permit delivery of fastenings into the pockets in the slides when the slides are in their retracted positions.

165. In a shoe machine, wipers formed to embrace an upper around an end of a last and movable to wipe the marginal portion of the upper inwardly over the bottom of the last, wiper holders supporting said wipers and movable to close the wipers inwardly widthwise of the last, slides carried by said wiper holders and movable relatively thereto inwardly toward the edges of the wipers into operative positions and outwardly to retracted positions, said slides having pockets therein to receive fastenings and fingers for guiding fastenings driven from said pockets, drivers for driving the fastenings to fasten the upper when the slides are in their operative positions, bars movable inwardly and outwardly with said slides and relatively to which also the slides are further movable in both directions, and means for limiting the movements of said bars and for rendering the bars effective to limit the movements of the slides, said bars being arranged to engage said fingers and to hold them in retracted relation to the slides to permit delivery of fastenings into the pockets when the slides are in their retracted positions.

166. In a shoe machine, wipers formed to embrace an upper around an end of a last and movable to wipe the marginal portion of the upper inwardly over the bottom of the last, wiper holders supporting said wipers and movable to close the wipers inwardly widthwise of the last, slides carried by said wiper holders and movable relatively thereto inwardly toward the edges of the wipers into operative positions and outwardly to retracted positions, said slides having pockets therein to receive fastenings and fingers for guiding fastenings driven from said pockets, drivers for driving the fastenings to fasten the upper when the slides are in their operative positions, and bars movable inwardly and outwardly with said slides and relatively to which also the slides are further movable in both directions, said bars being arranged to engage said fingers and to hold them in retracted relation to the slides to permit delivery of fastenings into the pockets when the slides are in their retracted positions, the bars having openings arranged to aline with said pockets when the fingers are thus retracted.

167. In a shoe machine, wipers formed to embrace an upper around an end of a last and movable to wipe the marginal portion of the upper inwardly into lasted relation to an insole on the last, said wipers having a groove extending along their wiping edges to receive a binder wire for holding the upper in lasted position, means for feeding a binder wire along said groove, fastening-inserting devices comprising drivers for driving fastenings at the opposite sides of the bottom of the shoe to fasten the binder wire to the shoe, an operating device movable heightwise of the last in a direction away from the last to operate said drivers to drive the fastenings, a cutter for severing the binder wire in said groove from the remainder of the wire, and means for also operating said cutter by the driver-operating movement of said operating device.

168. In a shoe machine, wipers formed to embrace an upper around an end of a last and movable to wipe the marginal portion of the upper inwardly into lasted relation to an insole on the last, said wipers having a groove extending along their wiping edges to receive a binder wire for holding the upper in lasted position, means for feeding a binder wire along said groove, fastening-inserting devices comprising drivers for driving fastenings at the opposite sides of the bottom of the shoe to fasten the binder wire to the shoe, an operating device movable heightwise of the last in a direction away from the last, connections between said operating device and the drivers for operating the drivers to drive the fastenings by that movement of said device, a cutter for severing the binder wire in said groove from the remainder of the wire, a lever for operating said cutter, and means connecting said lever to said operating device for operating the lever by the driver-operating movement of said device.

169. In a shoe machine, wipers formed to embrace an upper around an end of a last and movable to wipe the marginal portion of the upper inwardly into lasted relation to an insole on the last, said wipers having a groove extending along their wiping edges to receive a binder wire for holding the upper in lasted position, means for feeding a binder wire along said groove from the forward end of one wiper to the forward end of the other wiper while the edges of the wipers are in contact with the upper, a member arranged to be interposed between the end of said binder wire and the upper to guide the wire as it is fed along the groove in the wipers, and means for moving said member along the groove in the opposite direction from the wire into position to guide the wire and for thereafter withdrawing it from the groove.

170. In a shoe machine, wipers formed to embrace an upper around an end of a last and movable to wipe the marginal portion of the upper inwardly into lasted relation to an insole on the last, said wipers having a groove extending along their wiping edges to receive a binder wire for holding the upper in lasted position, means for feeding a binder wire along said groove from the forward end of one wiper to the forward end of the other wiper while the edges of the wipers are in contact with the upper, a member arranged to be interposed between the end of said binder wire and the upper to guide the wire as it is fed along the groove in the wipers, and means for moving said member part way along the groove in the wipers in the opposite direction from the binder wire to meet the end of the binder wire and for then withdrawing it from the groove during the further feeding movement of the wire.

171. In a shoe machine, wipers formed to embrace an upper around an end of a last and movable to wipe the marginal portion of the upper inwardly into lasted relation to an insole on the last, said wipers having a groove extending along their wiping edges to receive a binder wire for holding the upper in lasted position, means for feeding a binder wire along said groove from the forward end of one wiper to the forward end of the other wiper while the edges of the wipers are in contact with the upper, and means for feeding a guide wire part way along said groove in the wipers in the opposite direction from the binder wire to serve as a shield between the end of the binder wire and the upper during the latter portion of the feeding movement of the binder wire and for thereafter withdrawing said guide wire from the groove.

172. In a shoe machine, wipers formed to embrace an upper around an end of a last and movable to wipe the marginal portion of the upper inwardly into lasted relation to an insole on the last, wiper holders supporting said wipers and movable to close them inwardly widthwise of the last, said wipers having a groove extending along their wiping edges to receive a binder wire for holding the upper in lasted position, mechanism supported on one of said wiper holders for feeding a binder wire along said groove from the forward end of one wiper to the forward end of the other wiper while the edges of the wipers are in contact with the upper, and mechanism supported on the other wiper holder for feeding a guide wire part way along said groove in the opposite direction from the binder wire to serve as a shield between the end of the binder wire and the upper and for then withdrawing said guide wire from the groove during the latter portion of the feeding movement of the binder wire.

173. In a shoe machine, wipers formed to embrace an upper around an end of a last and movable to wipe the marginal portion of the upper inwardly into lasted relation to an insole on the last, said wipers having a groove extending along their wiping edges to receive a binder wire for holding the upper in lasted position, means for feeding a binder wire along said groove from the forward end of one wiper to the forward end of the other wiper while the edges of the wipers are in contact with the upper, a feed wheel having a guide wire normally wound in a helical coil thereon, means for turning said feed wheel to feed the guide wire along said groove in the wipers in the opposite direction from the binder wire into position to serve as a shield between the end of the binder wire and the upper and for thereafter turning it reversely to withdraw the guide wire from the groove, and means for imparting an axial movement progressively in one direction to said feed wheel as it is turned to feed the guide wire along said groove and an axial movement in the opposite direction as it is turned to withdraw the wire from the groove.

174. In a shoe machine, wipers formed to embrace an upper around an end of a last and movable to wipe the marginal portion of the upper inwardly into lasted relation to an insole on the last, said wipers having a groove extending along their wiping edges to receive a binder wire for holding the upper in lasted position, means for feeding a binder wire along said groove from the forward end of one wiper to the forward end of the other wiper while the edges of the wipers are in contact with the upper, a feed wheel having a guide wire normally wound in a helical coil thereon, means for turning said feed wheel to feed the guide wire along said groove in the wipers in the opposite direction from the binder wire into position to serve as a shield between the end of the binder wire and the upper and for thereafter turning it reversely to withdraw the guide wire from the groove, and a threaded member for controlling said feed wheel to impart thereto axial movements in opposite directions in response to its turning movements in opposite directions.

175. In a shoe machine, the combination with means for shaping the toe end of an upper over a last and over an insole on the last, of a device arranged to position the last heightwise by engagement with the forepart of the insole, a support for said device, and a plurality of pins arranged to extend through the insole into holes in the forepart of the last to position the last lengthwise and laterally, said device being removable from its support independently of said pins.

176. In a shoe machine, the combination with means for shaping the toe end of an upper over a last and over an insole on the last, of a plate arranged to position the last heightwise by engagement with the forepart of the insole, a support for said plate, a plurality of pins arranged to extend through said plate and through the insole into holes in the forepart of the last to position the last lengthwise and laterally, said plate being movable relatively to the pins away from its support to permit a different plate to be substituted therefor, and retaining means arranged to hold the plate normally in assembled relation to the pins but movable to release it.

ARTHUR F. PYM.